(12) United States Patent
Oiki et al.

(10) Patent No.: US 9,393,869 B2
(45) Date of Patent: Jul. 19, 2016

(54) VEHICLE ACCELERATION SUPPRESSION DEVICE AND VEHICLE ACCELERATION SUPPRESSION METHOD

(71) Applicant: NISSAN MOTOR CO., LTD., Yokohama-shi, Kanagawa (JP)

(72) Inventors: Daisuke Oiki, Zama (JP); Takuya Inoue, Kawasaki (JP); Takeshi Sugano, Yokohama (JP); Toshimichi Gokan, Machida (JP); Yasuhisa Hayakawa, Yokohama (JP); Osamu Fukata, Sagamihara (JP); Daisuke Tanaka, Hadano (JP); Akira Morimoto, Sagamihara (JP)

(73) Assignee: NISSAN MOTOR CO., LTD., Yokohama-Shi, Kanagawa (JP)

(*) Notice: Subject to any disclaimer, the term of this patent is extended or adjusted under 35 U.S.C. 154(b) by 0 days.

(21) Appl. No.: 14/438,808

(22) PCT Filed: Nov. 22, 2013

(86) PCT No.: PCT/JP2013/006882
§ 371 (c)(1),
(2) Date: Apr. 27, 2015

(87) PCT Pub. No.: WO2014/083824
PCT Pub. Date: Jun. 5, 2014

(65) Prior Publication Data
US 2015/0291030 A1    Oct. 15, 2015

(30) Foreign Application Priority Data
Nov. 27, 2012    (JP) .................................. 2012-259211

(51) Int. Cl.
*B60K 31/00*    (2006.01)
*B60W 50/12*    (2012.01)
(Continued)

(52) U.S. Cl.
CPC ............. *B60K 31/0058* (2013.01); *B60K 28/00* (2013.01); *B60W 30/06* (2013.01);
(Continued)

(58) Field of Classification Search
None
See application file for complete search history.

(56) References Cited

U.S. PATENT DOCUMENTS

2005/0075777 A1* 4/2005 Kim ...................... B60W 10/06
                                                                    701/70
2005/0137766 A1   6/2005 Miyakoshi et al.
(Continued)

FOREIGN PATENT DOCUMENTS

| JP | 2003137001 A  |   | 5/2003 |
|----|---------------|---|--------|
| JP | 2007055535 A  |   | 3/2007 |
| JP | 2010-195118 A |   | 9/2010 |
| JP | 2012087692 A  |   | 5/2012 |
| JP | 2012162122 A  | * | 8/2012 |
| WO | 2013061378 A1 |   | 5/2013 |

OTHER PUBLICATIONS

JP 2012162122 A English machine translation.*

*Primary Examiner* — Rami Khatib
*Assistant Examiner* — Navid Ziaeianmehdizadeh
(74) *Attorney, Agent, or Firm* — Young Basile Hanlon & MacFarlane P.C.

(57) ABSTRACT

A total certainty factor indicating a total degree of certainty of the parking frame certainty degree and the parking frame entering certainty degree is calculated based on a parking frame certainty degree indicating the degree of certainty that a parking frame is present in a travel direction of a vehicle, and a parking frame entering certainty degree indicating the degree of certainty that the vehicle enters the parking frame. When the total certainty factor is low, acceleration of the vehicle controlled according to an operation amount of an accelerator pedal for instructing a driving force by operation of a driver is suppressed with a low suppression degree, as compared with a case where the total certainty factor is high. Further, the acceleration of the vehicle is suppressed with a lower suppression degree as the vehicle speed of the vehicle is higher.

5 Claims, 20 Drawing Sheets

(51) Int. Cl.
*B60W 50/10* (2012.01)
*B60K 28/00* (2006.01)
*B60W 30/14* (2006.01)
*G06K 9/00* (2006.01)
*B60W 40/107* (2012.01)
*B60W 30/06* (2006.01)

(52) U.S. Cl.
CPC .......... *B60W 30/146* (2013.01); *B60W 40/107* (2013.01); *B60W 50/10* (2013.01); *B60W 50/12* (2013.01); *G06K 9/00812* (2013.01); *B60K 2031/0091* (2013.01); *B60W 2520/10* (2013.01); *B60W 2540/10* (2013.01); *B60W 2720/10* (2013.01); *B60W 2720/106* (2013.01)

(56) References Cited

U.S. PATENT DOCUMENTS

| | | | |
|---|---|---|---|
| 2012/0143456 A1* | 6/2012 | Ueda | B60W 10/08 701/93 |
| 2013/0006493 A1* | 1/2013 | Takagi | F02D 41/021 701/102 |
| 2013/0060442 A1* | 3/2013 | Kaster | B60T 7/042 701/82 |
| 2013/0166173 A1 | 6/2013 | Ideshio et al. | |
| 2015/0274179 A1* | 10/2015 | Inoue | B60W 50/087 701/70 |

* cited by examiner

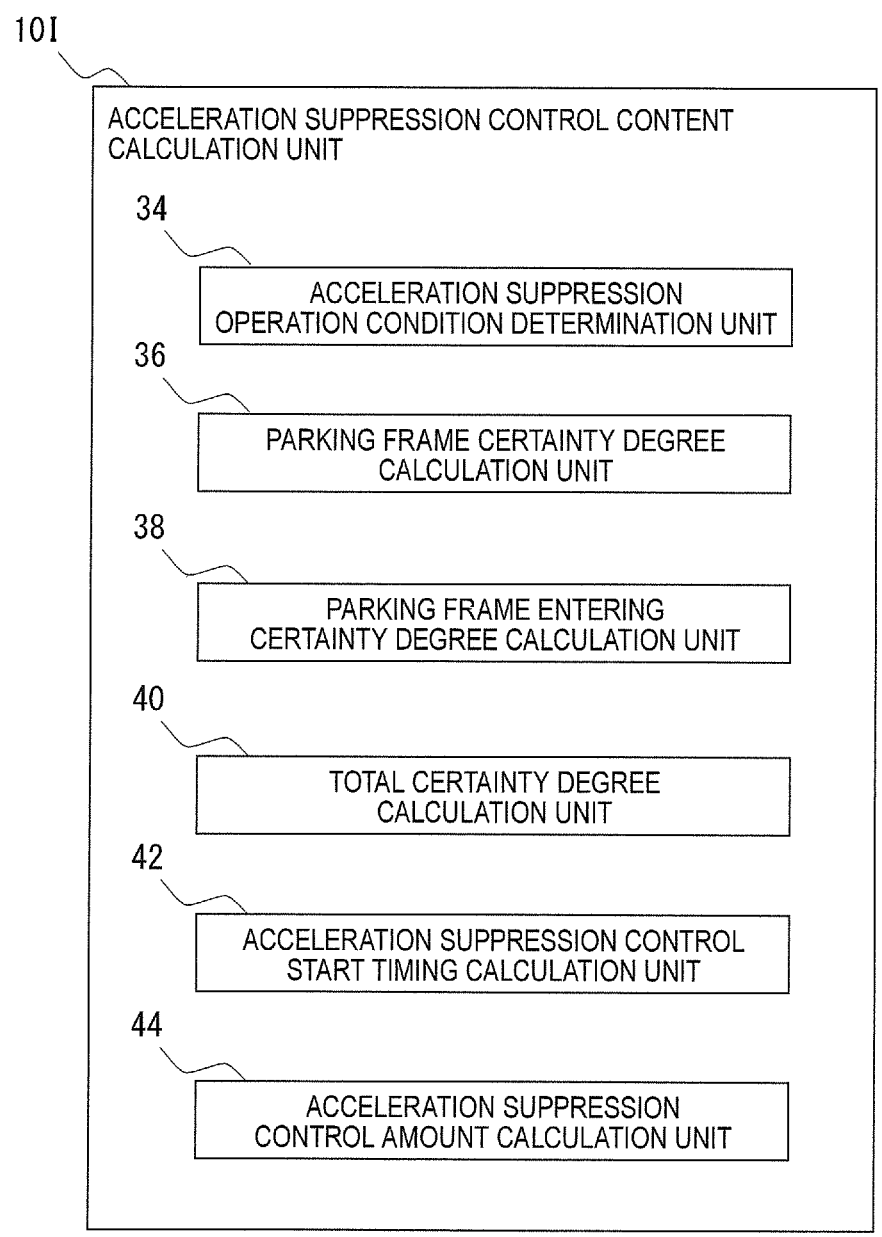

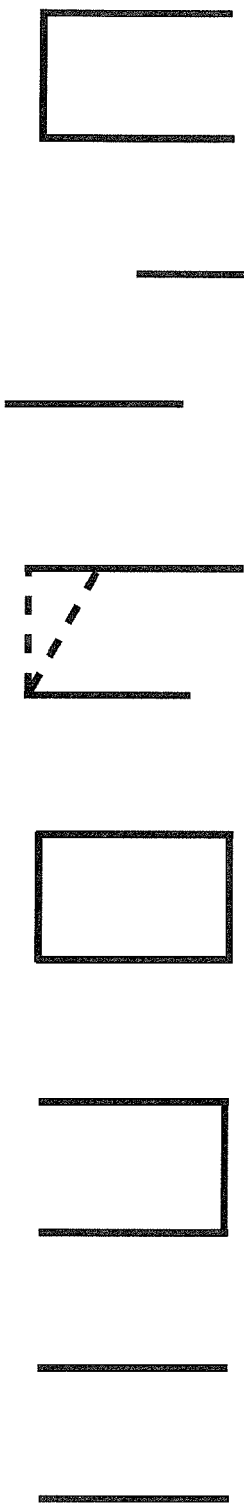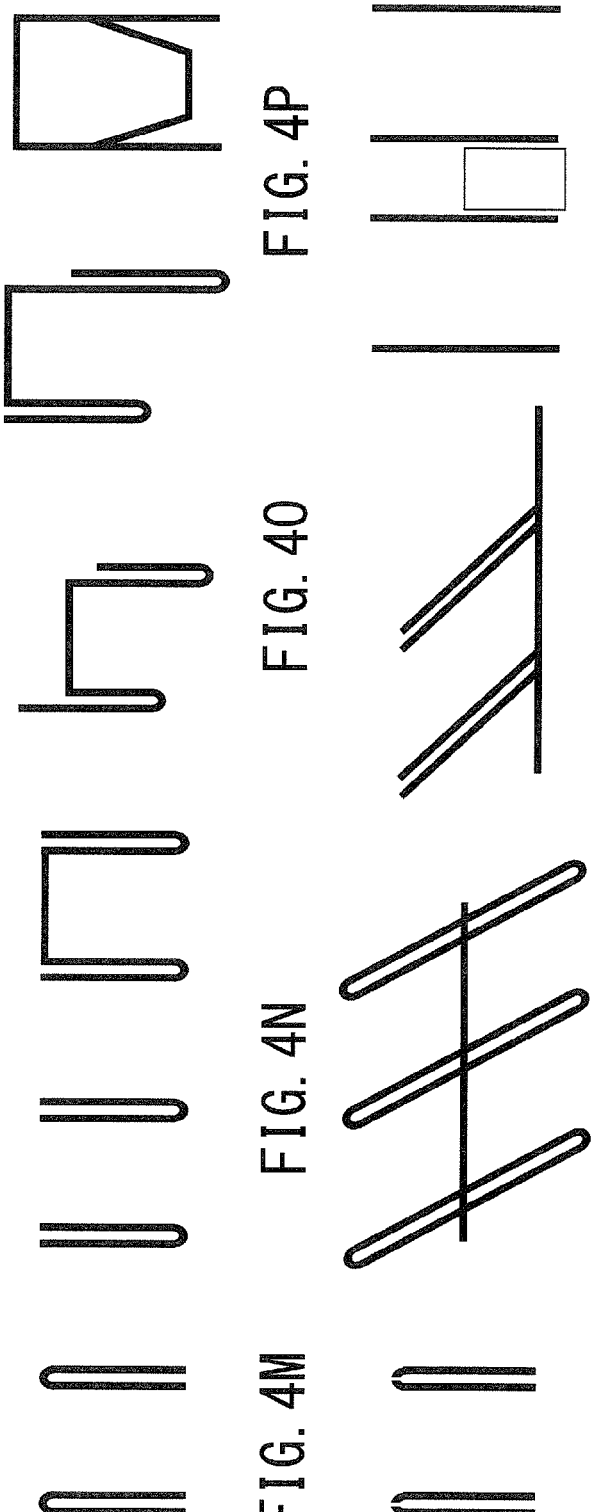
FIG. 4A FIG. 4B FIG. 4C FIG. 4D FIG. 4E FIG. 4F
FIG. 4G FIG. 4H FIG. 4I FIG. 4J FIG. 4K FIG. 4L
FIG. 4M FIG. 4N FIG. 4O FIG. 4P

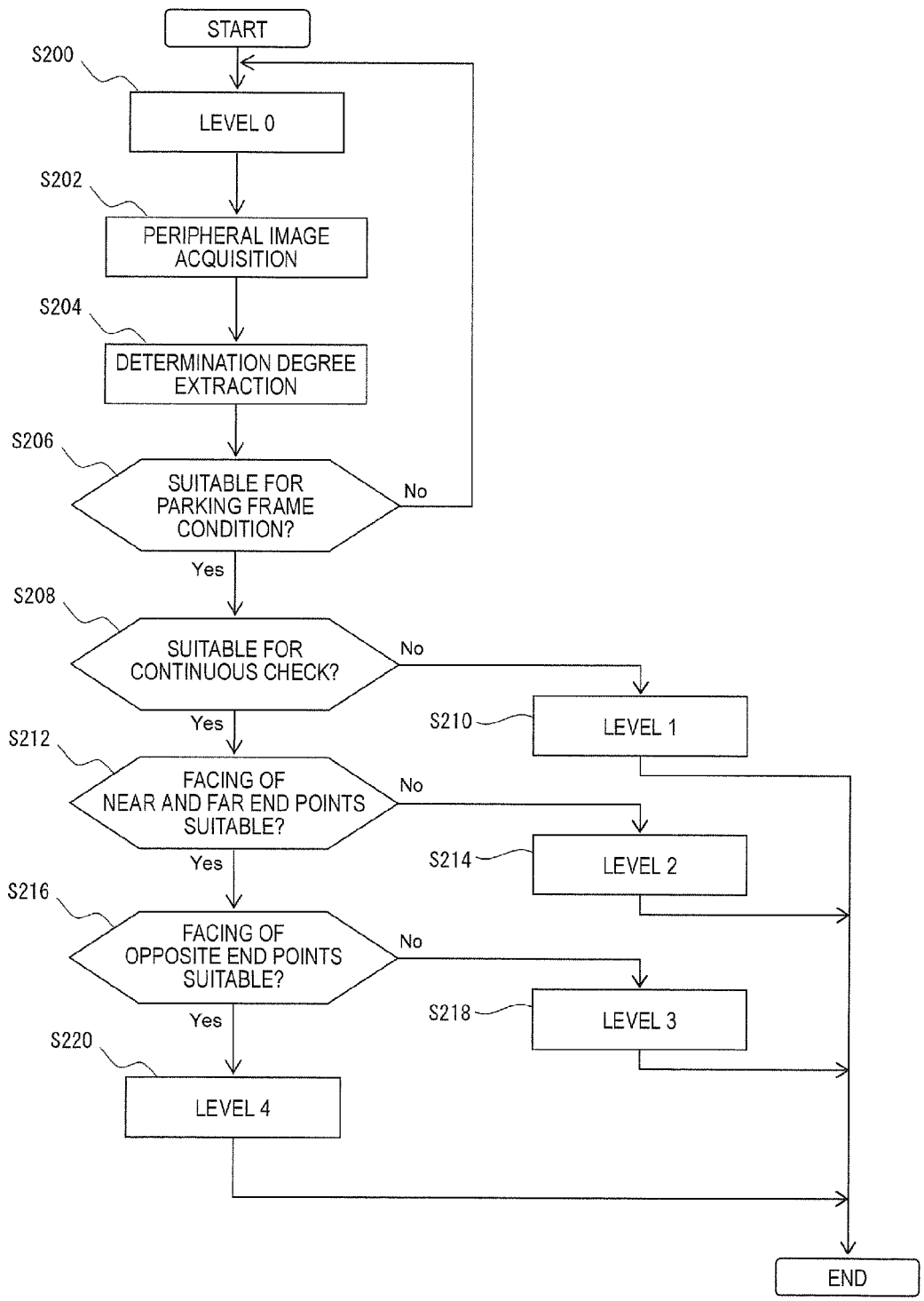

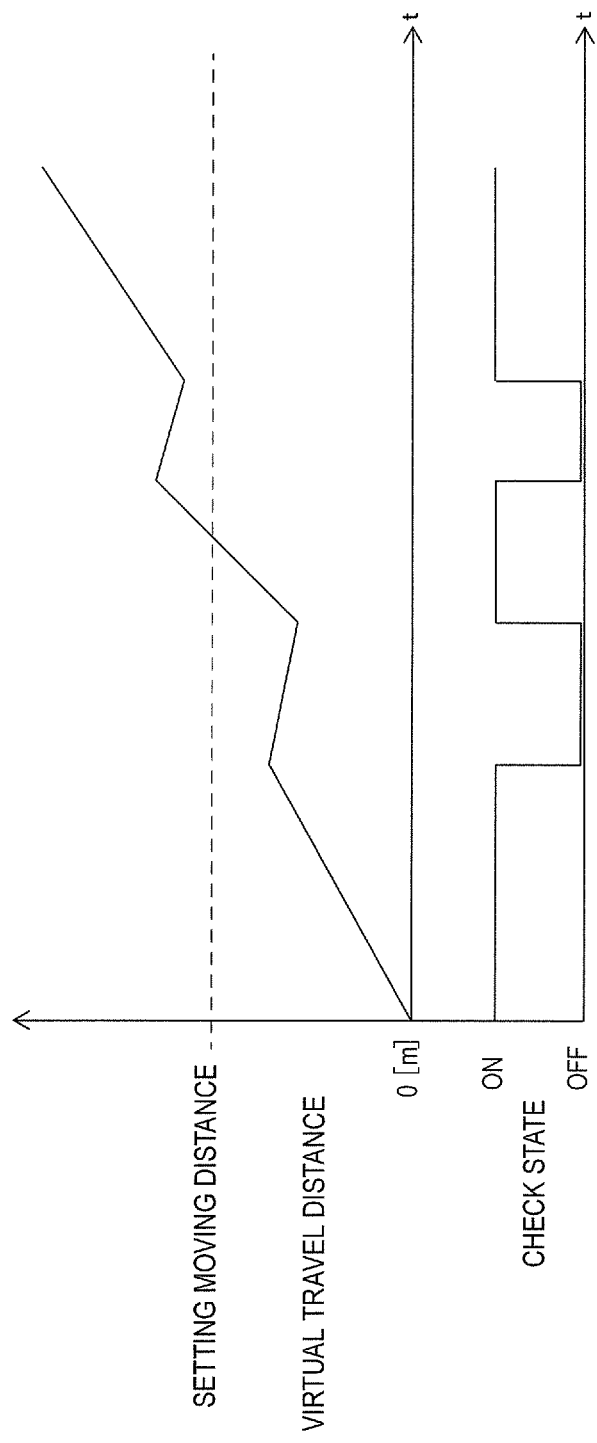

FIG. 13

| ENTERING CERTAINTY DEGREE \ FRAME CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW LEVEL | — | EXTREMELY LOW | LOW | LOW | LOW |
| HIGH LEVEL | — | EXTREMELY LOW | LOW | HIGH | EXTREMELY HIGH |

FIG. 14

| ACCELERATION SUPPRESSION CONDITION \ TOTAL CERTAINTY DEGREE | EXTREMELY LOW | LOW | HIGH | EXTREMELY HIGH |
|---|---|---|---|---|
| SUPPRESSION CONTROL START TIMING (OPENING DEGREE OF ACCELERATOR PEDAL) | 80% | 80% | 50% | 50% |
| SUPPRESSION AMOUNT | SMALL | MEDIUM | MEDIUM | LARGE |
| ALARM SOUND | NO | YES | YES | YES |

| ACCELERATION SUPPRESSION CONDITION / PARKING FRAME ENTERING CERTAINTY DEGREE | LOW | HIGH |
|---|---|---|
| SUPPRESSION CONTROL START TIMING (OPENING DEGREE OF ACCELERATOR PEDAL) | 80% | 50% |
| SUPPRESSION AMOUNT | SMALL | LARGE |
| ALARM SOUND | NO | YES |

FIG. 18

| ENTERING CERTAINTY DEGREE \ FRAME CERTAINTY DEGREE | LEVEL 0 | LEVEL 1 | | LEVEL 2 TO 4 | |
|---|---|---|---|---|---|
| LEVEL 0 | – | – | | – | |
| LOW LEVEL | – | SINGLE LINE | DOUBLE LINE | SINGLE LINE | DOUBLE LINE |
| | | – | EXTREMELY LOW | EXTREMELY LOW | EXTREMELY HIGH |
| HIGH LEVEL | – | EXTREMELY LOW | | EXTREMELY HIGH | |

FIG. 19

| ACCELERATION SUPPRESSION CONDITION \ TOTAL CERTAINTY DEGREE | EXTREMELY LOW | EXTREMELY HIGH |
|---|---|---|
| SUPPRESSION CONTROL START TIMING (OPENING DEGREE OF ACCELERATOR PEDAL) | 80% | 50% |
| MAINTENANCE TIME | 0.25[sec] | 0.65[sec] |
| SUPPRESSION AMOUNT | SMALL | LARGE |

| ENTERING CERTAINTY DEGREE \ FRAME CERTAINTY DEGREE | LEVEL 0 | LEVEL 1 | LEVEL 2 | LEVEL 3 | LEVEL 4 |
|---|---|---|---|---|---|
| LEVEL 0 | – | – | – | – | – |
| LOW ADVANCE LEVEL | – | EXTREMELY LOW | LOW | LOW | LOW |
| HIGH ADVANCE LEVEL | – | EXTREMELY LOW | LOW | HIGH | EXTREMELY HIGH |
| LOW RETREAT LEVEL | – | EXTREMELY LOW | LOW | LOW | HIGH |
| HIGH RETREAT LEVEL | – | LOW | HIGH | HIGH | EXTREMELY HIGH |

FIG. 22

| TOTAL CERTAINTY DEGREE / ACCELERATION SUPPRESSION CONDITION | EXTREMELY LOW | LOW | HIGH AND EXTREMELY HIGH |
|---|---|---|---|
| SUPPRESSION CONTROL START TIMING (OPENING DEGREE OF ACCELERATOR PEDAL) | 80% | 50% | 50% |
| SUPPRESSION AMOUNT | MEDIUM | MEDIUM | LARGE |
| ALARM SOUND | YES | YES | YES |

FIG. 23

| ENTERING CERTAINTY DEGREE / TRAVEL STATE | LEVEL 0 | LOW | HIGH |
|---|---|---|---|
| ADVANCE | — | EXTREMELY LOW | EXTREMELY HIGH |
| RETREAT | — | LOW | EXTREMELY HIGH |

FIG. 24

| FRAME CERTAINTY DEGREE / ENTERING CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW LEVEL IN NON-TURNING STATE | — | EXTREMELY LOW | LOW | LOW | LOW |
| HIGH LEVEL IN NON-TURNING STATE | — | EXTREMELY LOW | LOW | HIGH | EXTREMELY HIGH |
| LOW LEVEL IN TURNING STATE | — | EXTREMELY LOW | LOW | LOW | HIGH |
| HIGH LEVEL IN TURNING STATE | — | LOW | HIGH | HIGH | EXTREMELY HIGH |

FIG. 25

| ENTERING CERTAINTY DEGREE / TRAVEL STATE | LEVEL 0 | LOW | HIGH |
|---|---|---|---|
| NON-TURNING | — | LOW | HIGH |
| TURNING | — | HIGH | EXTREMELY HIGH |

FIG. 26

| ACCELERATION SUPPRESSION CONDITION \ ENTERING CERTAINTY DEGREE | LOW | HIGH |
|---|---|---|
| SUPPRESSION CONTROL START TIMING (OPENING DEGREE OF ACCELERATOR PEDAL) | 50% | 50% |
| SUPPRESSION AMOUNT | MEDIUM | LARGE |
| ALARM SOUND | YES | YES |

FIG. 27

| CONTROL CONTENT \ VEHICLE SPEED | 0[km/h] | 0~15[km/h] | 15~20[km/h] | GREATER THAN 20 km/h |
|---|---|---|---|---|
| CONTROL START | ○ | ○ | REGULATION OF CONTROL START CONDITION | REGULATION OF CONTROL START CONDITION |
| CONTROL CONTINUATION | ○ | ○ | ○ | ALLEVIATION OF CONTROL TERMINATION CONDITION |
| CERTAINTY DEGREE | — | — | MAINTENANCE OF CERTAINTY DEGREE DURING CONTROL  DECREASE OF CERTAINTY DEGREE LEVEL DURING NON-CONTROL | UNIFORM DECREASE OF CERTAINTY DEGREE LEVEL |

VEHICLE ACCELERATION SUPPRESSION DEVICE AND VEHICLE ACCELERATION SUPPRESSION METHOD

CROSS-REFERENCE TO RELATED APPLICATION

This application claims priority from Japanese Patent Application No. 2012-259211, filed Nov. 27, 2012, which is incorporated herein in its entirety by reference.

TECHNICAL FIELD

The present disclosure relates to a technology that suppresses acceleration of a vehicle for drive assist at the time of parking the vehicle.

BACKGROUND

As a technology that controls the speed of a vehicle or the like, for example, there is a safety device disclosed in JP 2003-137001 A.

In the safety device disclosed in JP 2003-137001 A, it is detected that a current position of a vehicle (automobile) is a position that is deviated from a road (public road or the like) based on map data of a navigation device and information indicating the current position of the vehicle. In addition, when an accelerator operation is in a direction where the travel speed of the vehicle increases and it is determined that a travel speed of the vehicle is greater than a predetermined value, a throttle is controlled in a deceleration direction regardless of the accelerator operation from a driver.

Since an object of the technology disclosed in JP 2003-137001 A is to prevent a driver's unintended vehicle acceleration even though an operational error of an accelerator occurs, the determination of whether or not the operation of the accelerator is the operational error matters. Further, in the technology disclosed in JP 2003-137001 A, a condition where the vehicle is disposed at the position deviated from the road, and a condition where the accelerator operation is performed in a state where it is detected that the travel speed is equal to or greater than the predetermined value are used as conditions where it is determined that there is a possibility that the operational error of the accelerator occurs.

However, in the above-described determination conditions, if the vehicle enters a parking lot from the road, the control of the throttle in the deceleration direction is operated by the vehicle speed. Thus, in the parking lot, operability in traveling or the like until the vehicle moves to the vicinity of a parking space deteriorates.

SUMMARY

In order to solve the above problem, an object of the present disclosure is to provide a vehicle acceleration suppression device and a vehicle acceleration suppression method capable of suppressing deterioration of operability in parking the vehicle and suppressing acceleration due to an operational error of an accelerator.

In order to solve the above problem, according to an aspect of the disclosure, a parking frame entering certainty degree indicating the degree of certainty that a vehicle enters a parking frame is calculated based on a peripheral environment and a travel state of the vehicle. Further, as a detected vehicle speed is high, acceleration of the vehicle is suppressed at a low suppression degree.

According to the aspect of the disclosure, in a state where the parking frame entering certainty degree is low, it is possible to decrease the suppression degree of the acceleration to reduce deterioration of operability, and in a state where the parking frame entering certainty degree is high, it is possible to increase the suppression degree of the acceleration to increase an acceleration suppression effect of the vehicle.

Thus, it is possible to suppress deterioration of operability in parking the vehicle, and to suppress acceleration due to an operational error of an accelerator.

BRIEF DESCRIPTION OF THE DRAWINGS

FIG. 3 is a block diagram illustrating a configuration of an acceleration suppression control content calculation unit;

FIG. 4A to FIG. 4P are diagrams illustrating a pattern of a parking frame which is a calculation object of a parking frame certainty degree in a parking frame certainty degree calculation unit;

FIG. 8 is a flowchart illustrating a process of calculating a parking frame certainty degree by a parking frame certainty degree calculation unit;

FIG. 10 is a diagram illustrating content of a process performed by a parking frame certainty degree calculation unit;

FIG. 13 is a diagram illustrating a total certainty degree calculation map;

FIG. 14 is a diagram illustrating an acceleration suppression condition calculation map;

FIG. 18 is a diagram illustrating a modification example of the first embodiment of the disclosure;

FIG. 19 is diagram illustrating a modification example of the first embodiment of the disclosure;

FIG. 22 is a diagram illustrating an acceleration suppression condition calculation map for retreating;

FIG. 23 is a diagram illustrating a modification example of the second embodiment of the disclosure;

FIG. 24 is a diagram illustrating a total certainty degree calculation map used in a third embodiment of the disclosure;

FIG. 25 is a diagram illustrating a modification example of the third embodiment of the disclosure;

FIG. 26 is a diagram illustrating a modification example of the third embodiment of the disclosure; and FIG. 27 is a diagram illustrating a map used in a process performed by an acceleration suppression control content calculation unit in a fourth embodiment of the disclosure.

DETAILED DESCRIPTION OF THE EMBODIMENTS

Embodiments of the disclosure will now be described with reference to the drawings.

First Embodiment

Hereinafter, a first embodiment of the disclosure (hereinafter, referred to as the present embodiment) will be described with reference to the accompanying drawings.
(Configuration)

First, a configuration of a vehicle that includes a vehicle acceleration suppression device in the present embodiment will be described with reference to FIG. 1.

Figure 1:
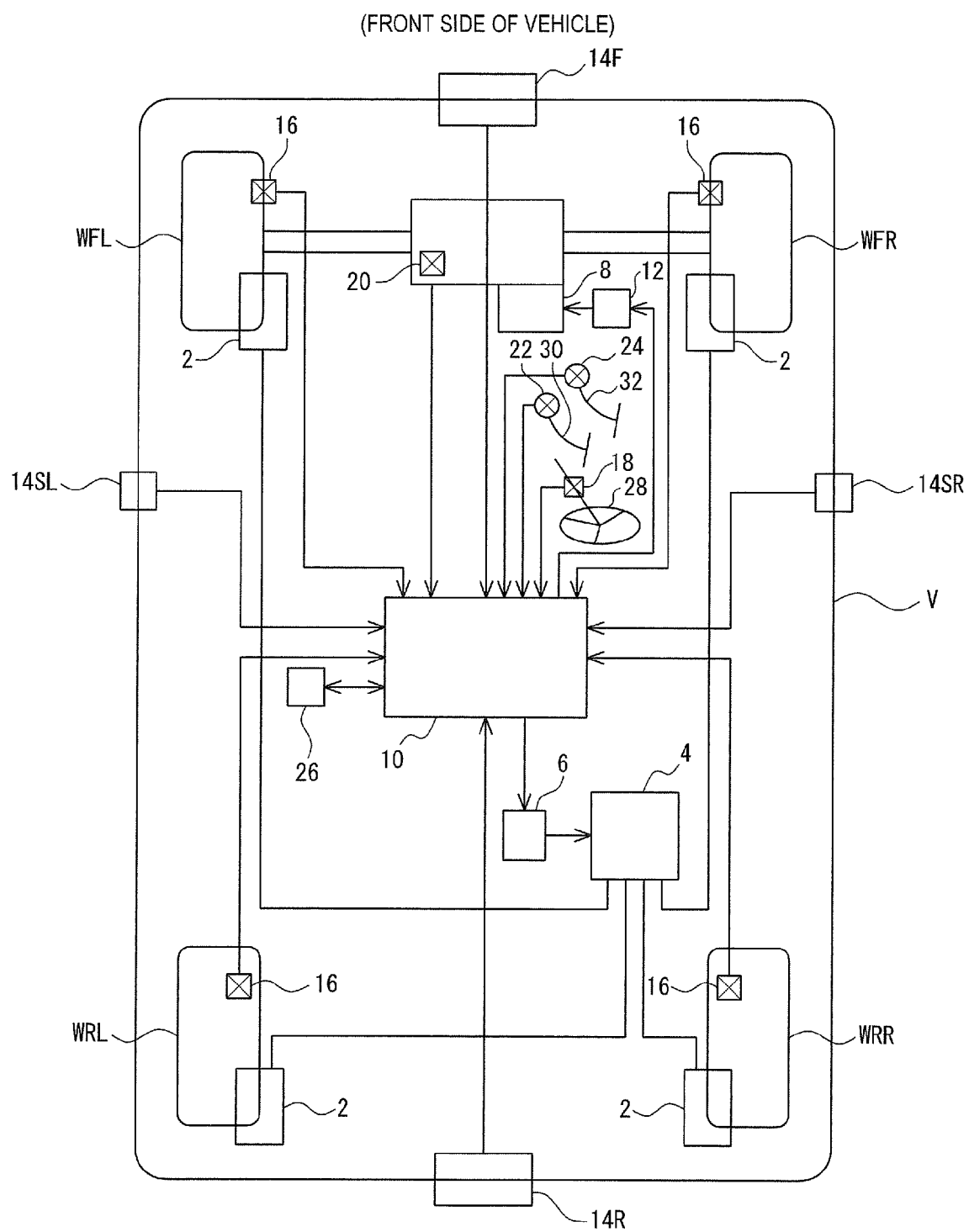
FIG. 1 is a conceptual diagram illustrating a configuration of a vehicle that includes a vehicle acceleration suppression device in a first embodiment of the disclosure.

FIG. 1 is a diagram illustrating the configuration of the vehicle that includes the vehicle acceleration suppression device in the present embodiment.

As illustrated in FIG. 1, a vehicle V includes vehicle wheels W (right front wheel WFR, left front wheel WFL, right rear wheel WRR, and left rear wheel WRL), a brake gear 2, a fluid pressure circuit 4, and a brake controller 6. In addition, the vehicle V includes an engine 8 and an engine controller 12.

The brake gear 2 is formed using a wheel cylinder, for example, and is individually provided to each vehicle wheel W. The brake gear 2 is not limited to a device that gives a braking force by fluid pressure, and may be formed using an electric brake gear or the like.

The fluid pressure circuit 4 is a circuit that includes a pipeline connected to each brake gear 2.

The brake controller 6 is configured to control a braking force generated by each brake gear 2 to a value in a braking force instruction value, based on the braking force instruction value received from a travel controller 10 which is a higher controller, through the fluid pressure circuit 4. Namely, the brake controller 6 forms a deceleration control device. Description relating to the travel controller 10 will be made later.

Accordingly, the brake gear 2, the fluid pressure circuit 4, and the brake controller 6 form a brake system that generates a braking force.

The engine 8 forms a drive source of the vehicle V. The engine controller 12 is configured to control torque (driving force) generated by the engine 8 based on a target throttle valve opening degree signal (acceleration instruction value) received from the travel controller 10. Namely, the engine controller 12 forms an acceleration control device. The target throttle valve opening degree signal will be described later.

Accordingly, the engine 8 and the engine controller 12 form a drive system which generates the driving force. The drive source of the vehicle V is not limited to the engine 8, and may be formed using an electric motor. Further, the drive source of the vehicle V may be by a combination of the engine 8 and the electric motor.

Figure 2:
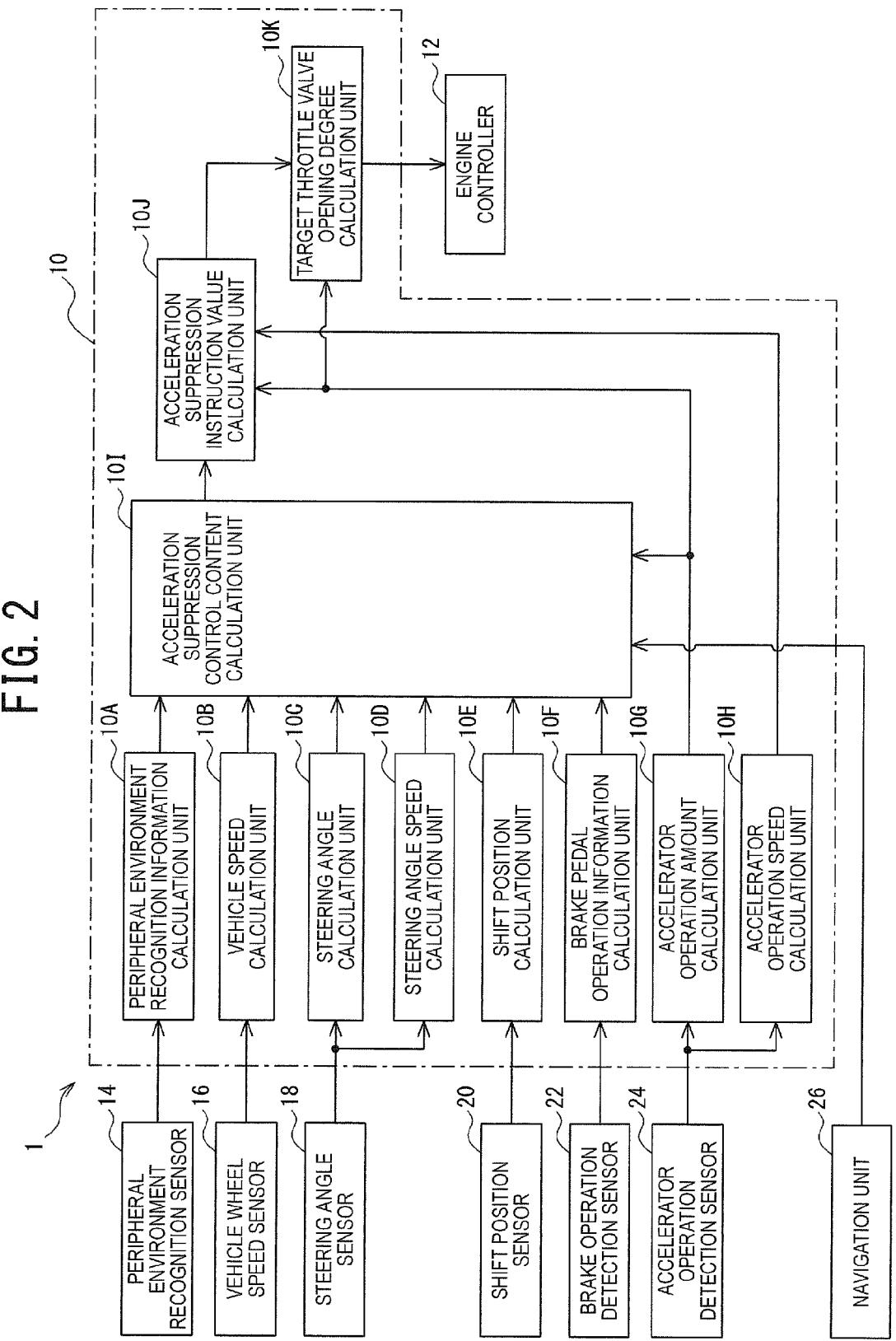
FIG. 2 is a block diagram illustrating a schematic configuration of the vehicle acceleration suppression device in the first embodiment of the disclosure.

Next, a schematic configuration of the vehicle acceleration suppression device 1 will be described with reference to FIG. 2, while referring to FIG. 1. FIG. 2 is a block diagram illustrating a schematic configuration of the vehicle acceleration suppression device 1 in the present embodiment.

The vehicle acceleration suppression device 1 includes a peripheral environment recognition sensor 14, a vehicle wheel speed sensor 16, a steering angle sensor 18, a shift position sensor 20, a brake operation detection sensor 22, and an accelerator operation detection sensor 24, as illustrated in FIG. 1 and FIG. 2. In addition, the vehicle acceleration suppression device 1 includes a navigation unit 26, and the travel controller 10.

The peripheral environment recognition sensor 14 captures a peripheral image of the vehicle V, and generates, based on each captured image, an information signal including an individual image corresponding to plural imaging directions (also referred to as an "individual image signal" in the following description). Further, the generated individual image signal is output to the travel controller 10.

In the present embodiment, as an example, a case where the peripheral environment recognition sensor 14 is formed using a front camera 14F, a right side camera 14SR, a left side camera 14SL, and a rear camera 14R will be described. Here, the front camera 14F is a camera that images a front side of the vehicle V in a vehicle longitudinal direction, and the right side camera 14SR is a camera that images a right lateral side of the vehicle V. Further, the left side camera 14SL is a camera that images a left lateral side of the vehicle V, and the rear camera 14R is a camera that images a rear side of the vehicle longitudinal direction of the vehicle V.

The vehicle wheel speed sensor 16 is formed using a pulse generator such as a rotary encoder that measures a wheel speed pulse, for example. Further, the vehicle wheel speed sensor 16 detects a rotational speed of each vehicle wheel W, and outputs an information signal including the detected rotational speed (also referred to as a "wheel speed signal" in the following description) to the travel controller 10.

The steering angle sensor 18 is provided in a steering column (not illustrated) that rotatably supports a steering wheel 28, for example. Further, the steering angle sensor 18 detects a current steering angle which is a current rotation angle (steering operation amount) of the steering wheel 28 which is a steering operator. In addition, the steering angle sensor 18 outputs an information signal including the detected current steering angle (also referred to as a "current steering angle signal" in the following description) to the travel controller 10. An information signal including a turning angle of the steering wheel may be detected as the information indicating the steering angle.

The steering operator is not limited to the steering wheel 28 rotated by a driver, and may be a lever through which the driver performs an inclination operation by a hand, for example. In this case, an inclination angle of the lever with respect to a neutral position is output as an information signal corresponding to the current steering angle signal.

The shift position sensor 20 detects a current position of a member that changes a shift position (for example, "P", "D", "R" or the like) of the vehicle V, such as a shift knob or a shift lever. Further, the shift position sensor 20 outputs an information signal including the detected current position (also referred to as a "shift position signal" in the following description) to the travel controller 10.

The brake operation detection sensor 22 detects an opening degree with respect to a brake pedal 30 which is a braking force instruction operator. Further, the brake operation detection sensor 22 outputs an information signal including the detected opening degree of the brake pedal 30 (also referred to as a "brake opening degree signal" in the following description) to the travel controller 10.

Here, the braking force instruction operator may be operated by the driver of the vehicle V, and has a configuration in which the braking force of the vehicle V is instructed by change in the opening degree. The braking force instruction operator is not limited to the brake pedal 30 that is stepped by a foot of the driver, and may be a lever operated by a hand of the driver, for example.

The accelerator operation detection sensor 24 is configured to detect an opening degree with respect to an accelerator pedal 32 which is a driving force instruction element. Further, the accelerator operation detection sensor 24 outputs an information signal including the detected opening degree of the accelerator pedal 32 (also referred to as an "accelerator pedal opening degree signal" in the following description) to the travel controller 10.

Here, the driving force instruction element may be operated by the driver of the vehicle V, and has a configuration in which the driving force of the vehicle V is instructed by change in the opening degree. The driving force instruction element is not limited to the accelerator pedal 32 that is stepped by a foot of the driver, and may be a lever operated by a hand of the driver, for example.

The navigation unit 26 is a device that includes a global positioning system (GPS) receiver, a map database, and an information presentation unit having a display monitor or the like, and performs route finding, route guidance or the like.

The navigation unit 26 is capable of obtaining road information such as the type or width of a road on which the vehicle V is traveling based on a current position of the vehicle V acquired using the GPS receiver and road information stored in the map database.

Further, the navigation unit 26 is configured to output an information signal including the current position of the vehicle V acquired using the GPS receiver (also referred to as a "vehicle position signal" in the following description) to the travel controller 10. In addition, the navigation unit 26 is configured to output an information including the type, width or the like of the road on which the vehicle V is traveling (also referred to as a "traveling road information signal" in the following description) to the travel controller 10.

An information presentation unit is configured to output an alarm or other presentations in a control signal from the travel controller 10 using sound or images. Further, the information presentation unit includes a speaker that performs information provision to the driver using a buzzer or sound, and a display unit that performs information provision by display of images or texts, for example. In addition, the display unit may use a display monitor of the navigation unit 26, for example.

The travel controller 10 is an electronic control unit configured with a central processing unit (CPU) and CPU peripheral components such as a read only memory (ROM) and a random access memory (RAM). Further, the travel controller 10 includes a parking operation assist unit that performs a drive assist process for parking.

In the process of the travel controller 10, the parking operation assist unit functionally includes processes of a peripheral environment recognition information calculation unit 10A, a vehicle speed calculation unit 10B, a steering angle calculation unit 10C, and a steering angle speed calculation unit 10D, as illustrated in FIG. 2. In addition, the parking operation assist unit functionally includes processes of a shift position calculation unit 10E, a brake pedal operation information calculation unit 10F, an accelerator operation amount calculation unit 10G, an accelerator operation speed calculation unit 10H, and an acceleration suppression control content calculation unit 10I. Furthermore, the parking operation assist unit functionally includes processes of an acceleration suppression instruction value calculation unit 10J, and a target throttle valve opening degree calculation unit 10K. These functions may be configured by one, two or more programs.

The peripheral environment recognition information calculation unit 10A forms a peripheral image (overlooking image) of the vehicle V seen from an upper side of the vehicle V based on an individual image signal received from the peripheral environment recognition sensor 14. Further, the peripheral environment recognition information calculation unit 10A is configured to output an information signal including the formed overlooking image (also referred to as an "overlooking image signal" in the following description) to the acceleration suppression control content calculation unit 10I.

Here, the overlooking image is formed by synthesizing images captured by the respective cameras (front camera 14F, right side camera 14SR, left side camera 14SL, and rear camera 14R), for example. Further, the overlooking image is configured to include an image indicating a road sign such as a line of a parking frame (also referred to as a "parking frame line" in the following description) displayed on a road surface, for example.

The vehicle speed calculation unit 10B calculates a speed (vehicle speed) of the vehicle V from a rotational speed of the vehicle wheel W based on a vehicle wheel speed signal received from the vehicle wheel speed sensor 16. Further, the vehicle speed calculation unit 10B is configured to output an information signal including the calculated speed (also referred to as a "vehicle speed calculation value signal" in the following description) to the acceleration suppression control content calculation unit 10I.

The steering angle calculation unit 10C is configured to calculate an operation amount (rotation angle) with respect to the neutral position of the steering wheel 28 from the current rotation angle of the steering wheel 28 based on a current steering angle signal received from the steering angle sensor 18. Further, the steering angle calculation unit 10C is configured to output an information signal including the calculated operation amount with respect to the neutral position (also referred to as a "steering angle signal" in the following description) to the acceleration suppression control content calculation unit 10I.

The steering angle speed calculation unit 10D is configured to perform differential processing with respect to the current steering angle included in the current steering angle signal received from the steering angle sensor 18, to calculate a steering angle speed of the steering wheel 28. Further, the steering angle speed calculation unit 10D is configured to output an information signal including the calculated steering angle speed (also referred to as a "steering angle speed signal" in the following description) to the acceleration suppression control content calculation unit 10I.

The shift position calculation unit 10E is configured to determine a current shift position based on a shift position signal received from the shift position sensor 20. Further, the shift position calculation unit 10E is configured to output an information signal including the calculated current shift position (also referred to as a "current shift position signal" in the following description) to the acceleration suppression control content calculation unit 10I.

The brake pedal operation information calculation unit 10F is configured to calculate a depression amount of the brake pedal 30 with reference to a state where the depression amount is "0", based on a brake opening degree signal received from the brake operation detection sensor 22. Further, the brake pedal operation information calculation unit 10F is configured to output an information signal including the calculated depression amount of the brake pedal 30 (also referred to as a "braking-side depression amount signal" in the following description) to the acceleration suppression control content calculation unit 10I.

The accelerator operation amount calculation unit 10G is configured to calculate a depression amount of the accelerator pedal 32 with reference to a state where the depression amount is "0", based on an accelerator pedal opening degree signal received from the accelerator operation detection sensor 24. Further, the accelerator operation amount calculation unit 10G is configured to output an information signal including the calculated depression amount of the accelerator pedal 32 (also referred to as a "driving-side depression amount signal" in the following description) to the acceleration suppression control content calculation unit 10I, the acceleration suppression instruction value calculation unit 10J, and the target throttle valve opening degree calculation unit 10K.

The accelerator operation speed calculation unit 10H is configured to perform differential processing with respect to the opening degree of the accelerator pedal 32 included in the accelerator pedal opening degree signal received from the accelerator operation detection sensor 24, to calculate an operation speed of the accelerator pedal 32. Further, the accelerator operation speed calculation unit 10H is configured to output an information signal including the calculated operation speed of the accelerator pedal 32 (also referred to as an "accelerator operation speed signal" in the following description) to the acceleration suppression instruction value calculation unit 10J.

The acceleration suppression control content calculation unit 10I is configured to receive inputs of the above-described various information signals (overlooking image signal, vehicle speed calculation value signal, steering angle signal, steering angle speed signal, current shift position signal, braking-side depression amount signal, driving-side depression amount signal, vehicle position signal, and travel road information signal). Further, an acceleration suppression operation condition determination result, an acceleration suppression control start timing, and an acceleration suppression control amount which will be described later are calculated based on the received various information signals. Further, the acceleration suppression control content calculation unit 10I outputs an information signal including the calculated parameters to the acceleration suppression instruction value calculation unit 10J.

A detailed configuration of the acceleration suppression control content calculation unit 10I and the process performed by the acceleration suppression control content calculation unit 10I will be described later.

The acceleration suppression instruction value calculation unit 10J is configured to receive inputs of the above-described driving-side depression amount signal and the accelerator operation speed signal, and inputs of an acceleration suppression operation condition determination result signal, an acceleration suppression control start timing signal, and an acceleration suppression control amount signal which will be described later. Further, the acceleration suppression instruction value calculation unit 10J is configured to calculate an acceleration suppression instruction value which is an instruction value for suppressing an acceleration instruction value depending on the depression amount (driving force operation amount) of the accelerator pedal 32. Further, the acceleration suppression instruction value calculation unit 10J is configured to output an information signal including the calculated acceleration suppression instruction value (also referred to as an "acceleration suppression instruction value signal" in the following description) to the target throttle valve opening degree calculation unit 10K.

Further, the acceleration suppression instruction value calculation unit 10J is configured to calculate a normal acceleration instruction value which is an instruction value used in a normal acceleration control in content of the received acceleration suppression operation condition determination result signal. Further, the acceleration suppression instruction value calculation unit 10J is configured to output an information signal including the calculated normal acceleration instruction value (also referred to as a "normal acceleration instruction value signal" in the following description) to the target throttle valve opening degree calculation unit 10K.

The process performed by the acceleration suppression instruction value calculation unit 10J will be described later.

The target throttle valve opening degree calculation unit 10K is configured to receive an input of the driving-side depression amount signal, and an input of the acceleration suppression instruction value signal or the normal acceleration instruction value signal. Further, the target throttle valve opening degree calculation unit 10K is configured to calculate an opening degree of a target throttle valve which is an opening degree of a throttle valve depending on the depression amount of the accelerator pedal 32 or the acceleration suppression instruction value based on the depression amount of the accelerator pedal 32, and based on the acceleration suppression instruction value or the normal acceleration instruction value. Further, the target throttle valve opening degree calculation unit 10K is configured to output an information signal including the calculated opening degree of the target throttle valve (also referred to as a "target throttle valve opening degree signal" in the following description) to the engine controller 12.

Further, when the acceleration suppression instruction value includes an acceleration suppression control start timing instruction value which will be described later, the target throttle valve opening degree calculation unit 10K is configured to output the target throttle valve opening degree signal to the engine controller 12 based on the acceleration suppression control start timing which will be described later.

The process performed by the target throttle valve opening degree calculation unit 10K will be described later.

(Configuration of the Acceleration Suppression Control Content Calculation Unit 10I)

Next, a detailed configuration of the acceleration suppression control content calculation unit 10I will be described with reference to FIG. 3 and FIG. 4A to FIG. 4P, while referring to FIG. 1 and FIG. 2.

FIG. 3 is a block diagram illustrating the configuration of the acceleration suppression control content calculation unit 10I. As illustrated in FIG. 3, the acceleration suppression control content calculation unit 10I includes an acceleration suppression operation condition determination unit 34, a parking frame certainty degree calculation unit 36, a parking frame entering certainty degree calculation unit 38, and a total certainty degree calculation unit 40. In addition, the acceleration suppression control content calculation unit 10I includes an acceleration suppression control start timing calculation unit 42 and an acceleration suppression control amount calculation unit 44.

The acceleration suppression operation condition determination unit 34 is configured to determine whether or not an operation condition for an acceleration suppression control is established, and outputs an information signal including the determination result (also referred to as an "acceleration suppression operation condition determination result signal" in the following description) to the acceleration suppression instruction value calculation unit 10J. Here, the acceleration suppression control is a control for suppressing the acceleration instruction value for accelerating the vehicle V according to the depression amount of the accelerator pedal 32.

The process of determining whether or not the operation condition for the acceleration suppression control is established by the acceleration suppression operation condition determination unit 34 will be described later.

The parking frame certainty degree calculation unit 36 is configured to calculate a parking frame certainty degree indicating the degree of certainty that a parking frame is present in a travel direction of the vehicle V. Further, the parking frame certainty degree calculation unit 36 is configured to output an information signal including the calculated parking frame certainty degree (also referred to as a "parking frame certainty degree signal" in the following description) to the total certainty degree calculation unit 40.

Here, the parking frame certainty degree calculation unit 36 is configured to calculate the parking frame certainty degree with reference to a variety of information included in the overlooking image signal, the vehicle speed calculation value signal, the current shift position signal, the vehicle position signal, and the travel road information signal.

Further, the parking frame which is a calculation target of the certainty degree in the parking frame certainty degree calculation unit 36 includes plural patterns as illustrated in FIG. 4A to FIG. 4P, for example. FIG. 4A to FIG. 4P are diagrams illustrating patterns of the parking frame which is the calculation target of the parking frame certainty degree in the parking frame certainty degree calculation unit 36.

The process of calculating the parking frame certainty degree by the parking frame certainty degree calculation unit 36 will be described later.

The parking frame entering certainty degree calculation unit 38 is configured to calculate a parking frame entering certainty degree indicating the degree of certainty that the vehicle V enters the parking frame. Further, the parking frame entering certainty degree calculation unit 38 outputs an information signal including the calculated parking frame entering certainty degree (also referred to as a "parking frame entering certainty degree signal" in the following description) to the total certainty degree calculation unit 40.

Here, the parking frame entering certainty degree calculation unit 38 is configured to calculate the parking frame entering certainty degree with reference to a variety of information included in the overlooking image signal, the vehicle speed calculation value signal, the current shift position signal, and the steering angle signal.

The process of calculating the parking frame entering certainty degree by the parking frame entering certainty degree calculation unit 38 will be described later.

The total certainty degree calculation unit 40 is configured to receive inputs of the parking frame certainty degree signal and the parking frame entering certainty degree signal, and calculates a total certainty factor indicating a total degree of certainty of the parking frame certainty degree and the parking frame entering certainty degree. Further, the total certainty degree calculation unit 40 is configured to output an information signal including the calculated total certainty degree (also referred to as a "total certainty degree signal" in the following description) to the acceleration suppression control start timing calculation unit 42 and the acceleration suppression control amount calculation unit 44.

The process of calculating the total certainty degree by the total certainty degree calculation unit 40 will be described later.

The acceleration suppression control start timing calculation unit 42 is configured to calculate an acceleration suppression control start timing which is a timing when the acceleration suppression control is started. Further, the acceleration suppression control start timing calculation unit 42 is configured to output an information signal including the calculated acceleration suppression control start timing (also referred to as an "acceleration suppression control start timing signal" in the following description) to the acceleration suppression instruction value calculation unit 10J.

Here, the acceleration suppression control start timing calculation unit 42 is configured to calculate the acceleration suppression control start timing with reference to a variety of information included in the total certainty degree signal, the braking-side depression amount signal, the vehicle speed calculation value signal, the current shift position signal, and the steering angle signal.

The process of calculating the acceleration suppression control start timing by the acceleration suppression control start timing calculation unit 42 will be described later.

The acceleration suppression control amount calculation unit 44 is configured to calculate an acceleration suppression control amount which is a control amount for suppressing the acceleration instruction value depending on the depression amount of the accelerator pedal 32. Further, the acceleration suppression control amount calculation unit 44 is configured to output an information signal including the calculated acceleration suppression control amount (also referred to as an "acceleration suppression control amount signal" in the following description) to the acceleration suppression instruction value calculation unit 10J.

Here, the acceleration suppression control amount calculation unit 44 is configured to calculate the acceleration suppression control amount with reference to a variety of information included in the total certainty degree signal, the braking-side depression amount signal, the vehicle speed calculation value signal, the current shift position signal, and the steering angle signal.

The process of calculating the acceleration suppression control amount by the acceleration suppression control amount calculation unit 44 will be described later.

(Process Performed by the Acceleration Suppression Control Content Calculation Unit 10I)

Next, the process performed by the acceleration suppression control content calculation unit 10I will be described with reference to FIG. 5 to FIG. 14, while referring to FIG. 1 to FIG. 4P.

The process of determining whether or not the operation condition for the acceleration suppression control (also referred to as an "acceleration suppression operation condition" in the following description) is established by the acceleration suppression operation condition determination unit 34 will be described using FIG. 5 and FIG. 7, while referring to FIG. 1 to FIG. 4P.

Figure 5:
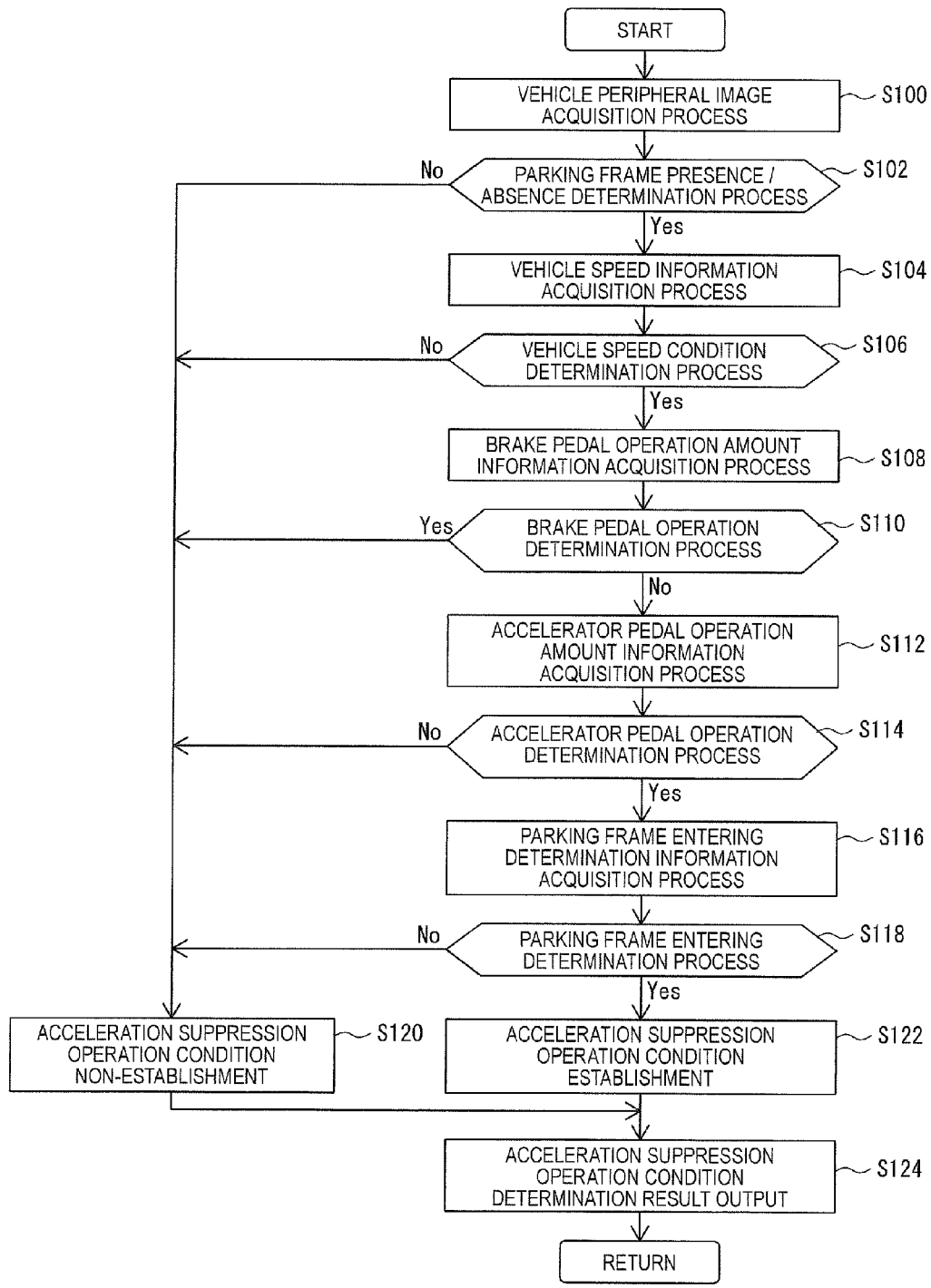
FIG. 5 is a flowchart illustrating a process of determining whether or not an acceleration suppression operation condition is established by an acceleration suppression operation condition determination unit.

FIG. 5 is a flowchart illustrating the process of determining whether or not the acceleration suppression operation condition is established by the acceleration suppression operation condition determination unit 34. The acceleration suppression operation condition determination unit 34 performs the following process for each predetermined sampling time (for example, 10 msec).

As illustrated in FIG. 5, if the acceleration suppression operation condition determination unit 34 starts the process (START), first, in step S100, a process of acquiring a peripheral image of the vehicle V ("vehicle peripheral image acquisition process" in the figure) is performed. After the process of acquiring the peripheral image of the vehicle V is performed in step S100, the process performed by the acceleration suppression operation condition determination unit 34 progresses to step S102. The peripheral image of the vehicle V is acquired with reference to a peripheral overlooking image of the vehicle V included in an overlooking image signal received from the peripheral environment recognition information calculation unit 10A.

In step S102, a process of determining the presence or absence of a parking frame ("parking frame presence/absence determination process" in the figure) is performed based on the image acquired in step S100.

The process of determining the presence or absence of the parking frame is performed by determining whether or not a white line (parking frame line) or the like for specifying the parking frame is present in a predetermined distance or area with reference to the vehicle V, for example. Further, as a process of recognizing the parking frame line from the image acquired in step S100, for example, various known methods such as edge detection may be used.

Figure 6A:
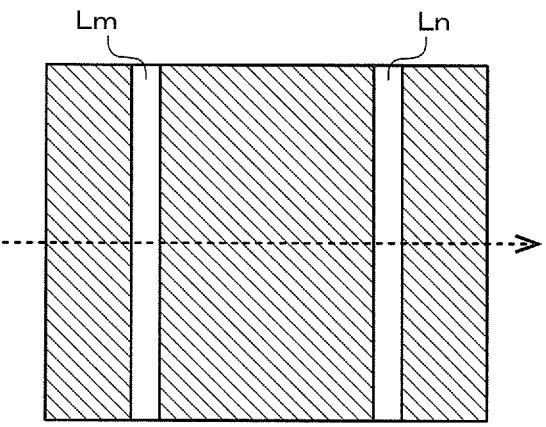
FIG. 6A to FIG. 6C are diagrams schematically illustrating a parking frame line recognition method due to edge detection.
Figure 6B:
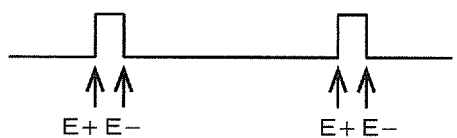
Figure 6C:
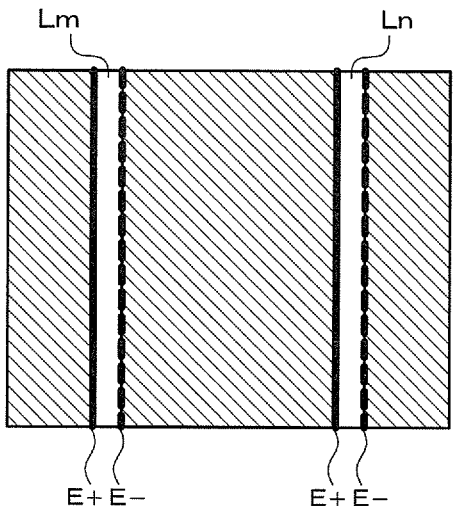

Hereinafter, a parking frame line recognition method due to edge detection will be described with reference to FIG. 6A to FIG. 6C. FIG. 6A to FIG. 6C are schematic diagrams schematically illustrating the parking frame line recognition method due to edge detection.

As illustrated in FIG. 6A, when detecting parking frame lines Lm and Ln, in an area indicating a captured image, scanning is performed in a lateral direction. In image scanning, for example, a black-and-white image obtained by digitizing the captured image, or the like is used. FIG. 6A is a diagram illustrating the captured image.

Since the parking frame line is displayed with white color or the like which is sufficiently brighter than a road surface, the luminance thereof is higher than that of the road surface. Thus, as illustrated in FIG. 6B, in a boundary portion where the road surface transits to the parking frame line, a positive edge where the luminance rapidly increases is detected. FIG. 6B is a graph illustrating a luminance change of pixels of an image when scanning is performed from the left side to the right side, and FIG. 6C is a diagram illustrating a captured image, similarly to FIG. 6A. Further, in FIG. 6B, the positive edge is represented as sign "$E_+$", and in FIG. 6C, the positive edge is indicated by a thick solid line with sign "$E_+$".

Further, in a boundary portion where the parking frame line transits to the road surface, a negative edge where the luminance rapidly decreases is detected. In FIG. 6B, the negative edge is represented as sign "$E_-$", and in FIG. 6C, the negative edge is indicated by a thick dotted line with sign "$E_-$".

Further, in the process of recognizing the parking frame line, one pair of adjacent edges is detected in the order of the positive edge ($E_+$) and the negative edge ($E_-$) with respect to the scanning direction, and thus, it is determined that the parking frame line is present.

As the process of determining the presence or absence of the parking frame, a process performed when the parking frame certainty degree calculation unit 36 calculates the parking frame certainty degree may be used.

In step S102, when it is determined that the parking frame is present ("Yes" in the figure), the process performed by the acceleration suppression operation condition determination unit 34 progresses to step S104.

On the other hand, in step S102, when it is determined that the parking frame is not present ("No" in the figure), the process performed by the acceleration suppression operation condition determination unit 34 progresses to step S120.

In step S104, a process of acquiring the vehicle speed of the vehicle V ("vehicle speed information acquisition process" in the figure) is performed with reference to a vehicle speed calculation value signal received from the vehicle speed calculation unit 10B. After the process of acquiring the vehicle speed of the vehicle V is performed in step S104, the process performed by the acceleration suppression operation condition determination unit 34 progresses to step S106.

In step S106, a process ("vehicle speed condition determination process" in the figure) of determining whether or not a condition where the vehicle speed of the vehicle V is less than a predetermined vehicle speed threshold value is established based on the vehicle speed acquired in step S104 is performed.

In the present embodiment, as an example, a case where the vehicle speed threshold value is set to 15 km/h will be described. Further, the vehicle speed threshold value is not limited to 15 km/h, and for example, may be changed according to specification of the vehicle V such as braking performance of the vehicle V. Further, for example, the vehicle speed threshold value may be changed by traffic laws or the like of a place (nation or the like) where the vehicle V is traveling.

In step S106, when it is determined that the condition where the vehicle speed of the vehicle V is less than the vehicle speed threshold value is established ("Yes" in the figure), the process performed by the acceleration suppression operation condition determination unit 34 progresses to step S108.

On the other hand, in step S106, when it is determined that the condition where the vehicle speed of the vehicle V is less than the vehicle speed threshold value is not established ("No" in the figure), the process performed by the acceleration suppression operation condition determination unit 34 progresses to step S120.

In step S108, a process of acquiring information on a depression amount (operation amount) of the brake pedal 30 ("brake pedal operation amount information acquisition process" in the figure) is performed with reference to a braking-side depression amount signal received from the brake pedal operation information calculation unit 10F. After the process of obtaining the information on the depression amount (operation amount) of the brake pedal 30 is performed in step S108, the process performed by the acceleration suppression operation condition determination unit 34 progresses to step S110.

In step S110, a process of determining whether or not the brake pedal 30 is operated ("brake pedal operation determination process" in the figure) based on the depression amount of the brake pedal 30 acquired in step S108 is performed.

In step S110, when it is determined that the brake pedal 30 is not operated ("No" in the figure), the process performed by the acceleration suppression operation condition determination unit 34 progresses to step S112.

On the other hand, in step S110, when it is determined that the brake pedal 30 is operated ("Yes" in the figure), the process performed by the acceleration suppression operation condition determination unit 34 progresses to step S120.

In step S112, a process of acquiring information on a depression amount (operation amount) of the accelerator pedal 32 ("accelerator pedal operation amount information acquisition process" in the figure) is performed with reference to a driving-side depression amount signal received from the accelerator operation amount calculation unit 10G. After the process of acquiring information on the depression amount (operation amount) of the accelerator pedal 32 is performed in step S112, the process performed by the acceleration suppression operation condition determination unit 34 progresses to step S114.

In step S114, a process of determining whether or not a condition where the depression amount (operation amount) of the accelerator pedal 32 is equal to or greater than a predetermined accelerator operation amount threshold value is established ("accelerator pedal operation determination process" in the figure) is performed. Here, the process of step S114 is performed based on the depression amount of the accelerator pedal 32 acquired in step S112.

In the present embodiment, as an example, a case where the accelerator operation amount threshold value is set to an operation amount corresponding to 3% of the opening degree of the accelerator pedal 32 will be described. Further, the accelerator operation amount threshold value is not limited to the operation amount corresponding to 3% of the opening degree of the accelerator pedal 32, and for example, may be changed by specification of the vehicle V such as braking performance of the vehicle V.

In step S114, when it is determined that the condition where the depression amount (operation amount) of the accelerator pedal 32 is equal to or greater than the accelerator operation amount threshold value is established ("Yes" in the figure), the process performed by the acceleration suppression operation condition determination unit 34 progresses to step S116.

On the other hand, in step S114, when it is determined that the condition where the depression amount (operation amount) of the accelerator pedal 32 is equal to or greater than the accelerator operation amount threshold value is not established ("No" in the figure), the process performed by the acceleration suppression operation condition determination unit 34 progresses to step S120.

In step S116, a process of acquiring information for determining whether or not the vehicle V enters the parking frame ("parking frame entering determination information acquisition process" in the figure) is performed. Here, in the present embodiment, as an example, a case where it is determined whether or not the vehicle V enters the parking frame based on a steering angle of the steering wheel 28, an angle formed by the vehicle V and the parking frame, and a distance between the vehicle V and the parking frame will be described. After the process of acquiring information for determining whether or not the vehicle V enters the parking frame is performed in step S116, the process performed by the acceleration suppression operation condition determination unit 34 progresses to step S118.

Here, a specific example performed in step S116 will be described. In step S116, a rotation angle (steering angle) of the steering wheel 28 is acquired with reference to a steering angle signal received from the steering angle calculation unit 10C. In addition, an angle cc formed by the vehicle V and a parking frame L0, and a distance D between the vehicle V and the parking frame L0 are acquired based on a peripheral overlooking image of the vehicle V included in an overlooking image signal received from the peripheral environment recognition information calculation unit 10A.

Figure 7:
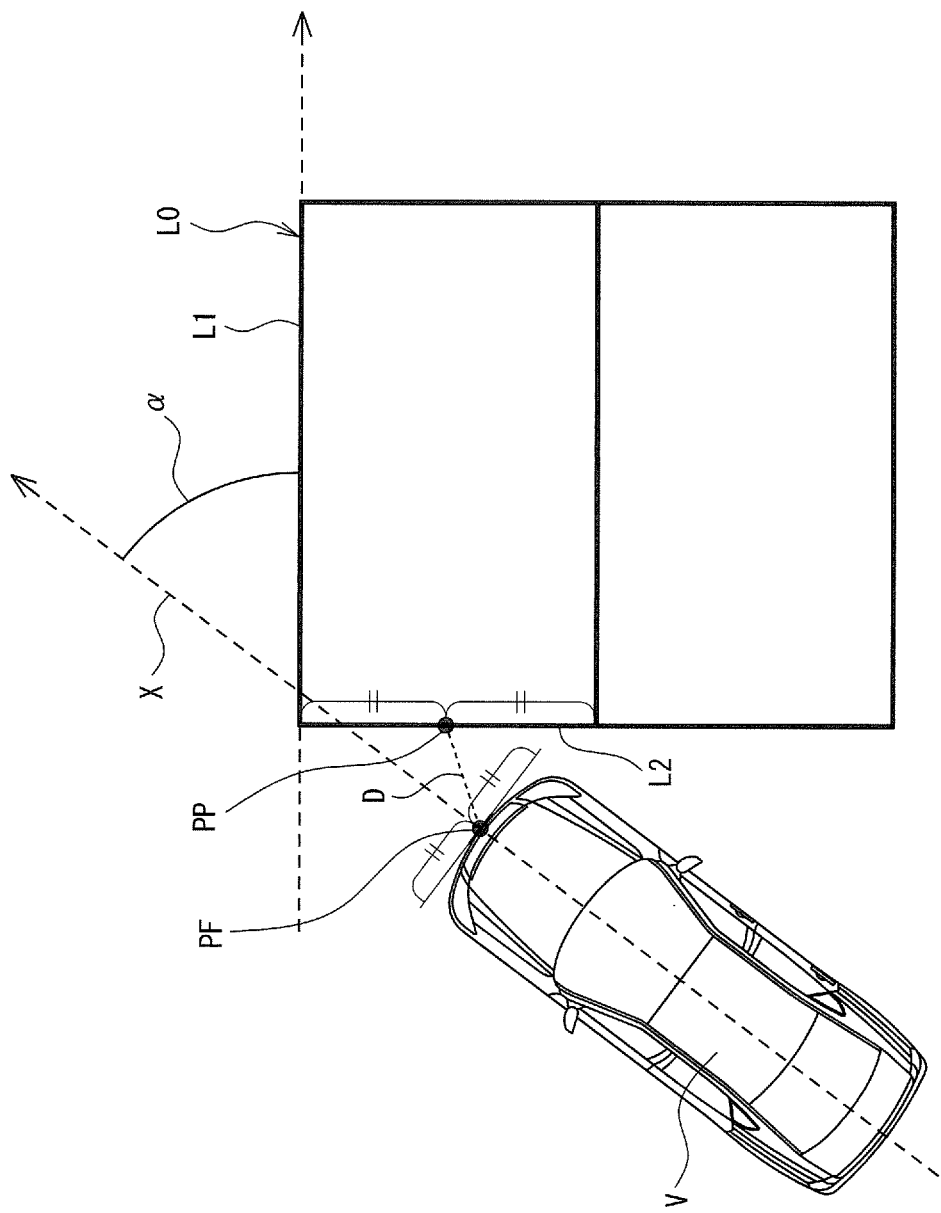
FIG. 7 is a diagram illustrating a vehicle, a parking frame, and a distance between the vehicle and the parking frame.

Here, the angle cc is set as an absolute value of an intersection angle between a straight line X and a frame line L1 and a line on a parking frame L0 side, as illustrated in FIG. 7, for example. FIG. 7 is a diagram illustrating the vehicle V, the parking frame L0, and the distance D between the vehicle V and the parking frame L0.

Further, the straight line X is a straight line (straight line extending in a travel direction) in a longitudinal direction of the vehicle V, which passes through the center of the vehicle V, and the frame line L1 is a part of space line of the parking frame L0, which is parallel to or approximately parallel to the longitudinal direction of the vehicle V when parking is completed at the parking frame L0. In addition, the line on the parking frame L0 side is a line on the parking frame L0 side formed by an extended line of L1.

Further, the distance D is a distance between a center point PF on a front end surface of the vehicle V and a center point PP of an entrance L2 of the parking frame L0, as illustrated in FIG. 7, for example. Here, the distance D becomes a negative value after the front end surface of the vehicle V passes through the entrance L2 of the parking frame L0. The distance D may be set to zero after the front end surface of the vehicle V passes through the entrance L2 of the parking frame L0.

Here, the location of the vehicle V for specifying the distance D is not limited to the center point PF, and for example, may be a predetermined location of the vehicle V and a predetermined location of the entrance L2. In this case, the distance D is a distance between the predetermined location of the vehicle V and the predetermined position of the entrance L2.

As described above, in step S116, as the information for determining whether or not the vehicle V enters the parking frame L0, the steering angle, the angle cc between the vehicle V and the parking frame L0, and the distance D between the vehicle V and the parking frame L0 are acquired.

In step S118, a process of determining whether or not the vehicle V enters the parking frame ("parking frame entering determination process" in the figure) is performed based on the information acquired in step S116.

In step S118, when it is determined that the vehicle V does not enter the parking frame ("No" in the figure), the process performed by the acceleration suppression operation condition determination unit 34 progresses to step S120.

On the other hand, in step S118, when it is determined that the vehicle V enters the parking frame ("Yes" in the figure), the process performed by the acceleration suppression operation condition determination unit 34 progresses to step S122.

Here, a specific example of the process performed in step S118 will be described. In step S118, for example, when all of the following three conditions (A1 to A3) are satisfied, it is determined that the vehicle V enters the parking frame.

Condition A1

A time elapsed after the value of the steering angle detected in step S116 is equal to or greater than a predetermined setting steering angle value (for example, 45 deg) is within a predetermined setting time (for example, 20 sec).

Condition A2

The angle α between the vehicle V and the parking frame L0 is equal to or smaller than a predetermined setting angle (for example, 40 deg).

Condition A3

The distance D between the vehicle V and the parking frame L0 is equal to or shorter than a predetermined setting distance (for example, 3 m).

As the process of determining whether or not the vehicle V enters the parking frame, a process performed when the parking frame entering certainty degree is calculated by the parking frame entering certainty degree calculation unit 38 may be used.

Further, the process used for determination of whether or not the vehicle V enters the parking frame is not limited to the process using the plural conditions as described above, and a determination process in one or more conditions among the above-described three conditions may be used. Further, the process of determining whether or not the vehicle V enters the parking frame may be used using the vehicle speed of the vehicle V.

In step S120, a process of generating the acceleration suppression operation condition determination result signal as an information signal including the determination result that the acceleration suppression control operation condition is not established ("acceleration suppression operation condition non-establishment" in the figure) is performed. After the process of generating the acceleration suppression operation condition determination result signal including the determination result that the acceleration suppression control operation condition is not established is performed in step S120, the process performed by the acceleration suppression operation condition determination unit 34 progresses to step S124.

In step S122, a process of generating the acceleration suppression operation condition determination result signal as an information signal including the determination result that the acceleration suppression control operation condition is established ("acceleration suppression operation condition establishment" in the figure) is performed. After the process of generating the acceleration suppression operation condition determination result signal including the determination result that the acceleration suppression control operation condition is established is performed in step S122, the process performed by the acceleration suppression operation condition determination unit 34 progresses to step S124.

In step S124, a process of outputting the acceleration suppression operation condition determination result signal generated in step S120 or step S122 to the acceleration suppression instruction value calculation unit 10J ("acceleration suppression operation condition determining result output" in the figure) is performed. After the process of outputting the acceleration suppression operation condition determination result signal to the acceleration suppression instruction value calculation unit 10J is performed in step S124, the process performed by the acceleration suppression operation condition determination unit 34 returns to the process of step S100 (RETURN).

The process of calculating the parking frame certainty degree by the parking frame certainty degree calculation unit 36 will be described with reference to FIG. 8 to FIG. 10, while referring to FIG. 1 to FIG. 7.

FIG. 8 is a flowchart illustrating the process of calculating the parking frame certainty degree by the parking frame certainty degree calculation unit 36. The parking frame certainty degree calculation unit 36 performs the following processes for each predetermined sampling time (for example, 10 msec).

As illustrated in FIG. 8, if the parking frame certainty degree calculation unit 36 starts the process (START), first, in step S200, a process of calculating (setting) the level of the parking frame certainty degree as a lowest value (level 0) ("level 0" in the figure) is performed. After the process of calculating the parking frame certainty degree to the level 0 is performed in step S200, the process performed by the parking frame certainty degree calculation unit 36 progresses to step S202.

In step S202, a process of acquiring a peripheral overlooking image of the vehicle V included in an overlooking image signal received from the peripheral environment recognition information calculation unit 10A ("peripheral image acquisition" in the figure) is performed. After the process of acquiring the peripheral overlooking image of the vehicle V is performed in step S202, the process performed by the parking frame certainty degree calculation unit 36 progresses to step S204.

In step S204, a process of extracting a determination factor used for calculating the parking frame certainty degree from the overlooking image acquired in step S202 ("determination factor extraction" in the figure) is performed. After the process of extracting the determination factor from the overlooking image is performed in step S204, the process performed by the parking frame certainty degree calculation unit 36 progresses to step S206.

Here, the determination factor represents a line (white line or the like) marked on a road surface, such as a parking frame line, and for example, when state of the line satisfies all the following three conditions (B1 to B3), the line is extracted as the determination factor.

Condition B1

When a broken portion is present in the line marked on the road surface, the broken portion is a portion where the marked line is blurred (for example, a portion of which clarity is lower than that of the line and higher than that of the road surface).

Condition B2

The width of the line marked on the road surface is equal to or greater than a predetermined setting width (for example, 10 cm). The setting width is not limited to 10 cm, and for example, may be changed according to a traffic law or the like of a place (nation or the like) where the vehicle V is traveling.

Condition B3

The length of the line marked on the road surface is equal to or greater than a predetermined setting mark line length (for example, 2.5 m). The setting mark line length is not limited to 2.5 m, and for example, may be changed according to a traffic law of a place (nation or the like) where the vehicle V is traveling.

In step S206, a process of determining whether or not the determination factor extracted in step S204 is suitable for a condition of a line for forming the parking frame line ("suitable for parking frame condition?" in the figure) is performed.

In step S206, when it is determined whether or not the determination factor extracted in step S204 is not suitable for the condition of the line for forming the parking frame line ("No" in the figure), the process performed by the parking frame certainty degree calculation unit 36 progresses to step S200.

On the other hand, in step S206, when it is determined whether or not the determination factor extracted in step S204 is suitable for the condition of the line for forming the parking frame line ("Yes" in the figure), the process performed by the parking frame certainty degree calculation unit 36 progresses to step S208. The process performed in step S206 is performed with reference to the overlooking image signal received from the peripheral environment recognition information calculation unit 10A, for example.

Here, a specific example of the process performed in step S206 will be described with reference to FIG. 9A to FIG. 9D. FIG. 9A to FIG. 9D are diagrams illustrating content of the process performed by the parking frame certainty degree calculation unit 36. In FIG. 9A to FIG. 9D, an area indicating an image captured by the front camera 14F among the overlooking images is represented as sign "PE".

In step S206, first, adjacent two lines displayed on the same screen is specified as one set (also referred to as "pairing" in the following description) from the lines marked on the road surface which is the determination factor extracted in step S204. When three or more lines are displayed on the same screen, two or more sets are respectively specified by adjacent two lines, with respect to the three or more lines.

Next, when all of the following four conditions (C1 to C4) are satisfied with respect to two lines which are paired, it is determined that the determination factor extracted in step S204 is suitable for the condition of the line for forming the parking frame line.

Condition C1

Figure 9A:
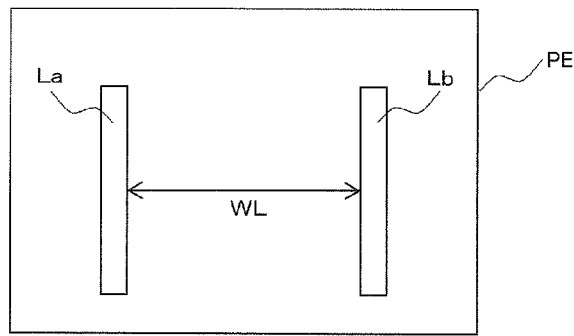
FIG. 9A to FIG. 9D are diagrams illustrating content of a process performed by a parking frame certainty degree calculation unit.

As illustrated in FIG. 9A, a width WL between two lines which are paired (represented as sign "La" and sign "Lb" in the figure) is equal to or greater than a predetermined setting pairing width (for example, 2.5 m). The setting pairing width is not limited to 2.5 m, and for example, may be changed according to a traffic law or the like of a place (nation or the like) where the vehicle V is traveling.

Condition C2

Figure 9B:
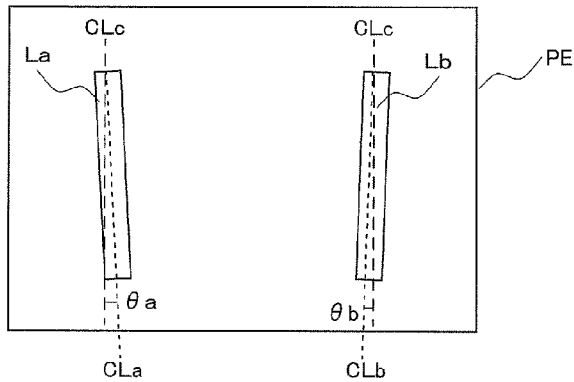

As illustrated in FIG. 9B, an angle (parallelism) formed by a line La and a line Lb is equal to or smaller than a predetermined setting angle (for example, 3°). The setting angle is not limited to 3°, and for example, may be changed according to recognition performance or the like of the peripheral environment recognition sensor 14.

In FIG. 9B, a reference line (line extending in a vertical direction in the area PE) is indicated by a dashed line with sign "CLc", a central axis line of the line La is indicated by a dotted line with sign "CLa", and a central axis line of the line Lb is indicated by a dotted line with sign "CLb". Further, an inclination angle of the central axis line CLa with respect to the reference line CLc is represented as sign "θa", and an inclination angle of the central axis line CLb with respect to the reference line CLc is represented as sign "θb". Accordingly, if a conditional expression of |θa−θb|≤3° is established, Condition C2 is satisfied.

Condition C3

Figure 9C:
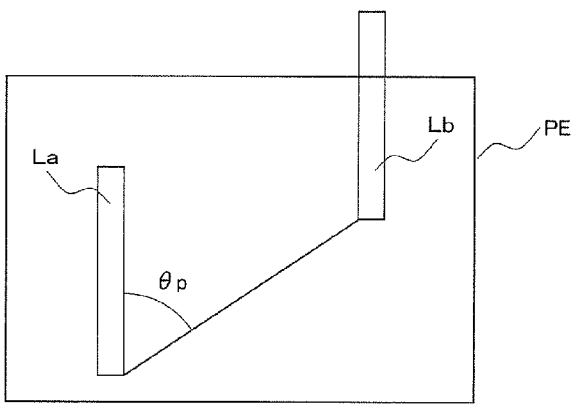

As illustrated in FIG. 9C, an angle θ formed by a straight line that connects an end portion (end portion on a lower side in the figure) of a line La on a vehicle V side and an end portion of a line Lb on the vehicle V side, and the line L close to the vehicle V is equal to or greater than a predetermined setting deviation angle (for example, 45°). The setting deviation angle is not limited to 45°, and for example, may be changed according to recognition performance or the like of the peripheral environment recognition sensor 14.

Condition C4

Figure 9D:
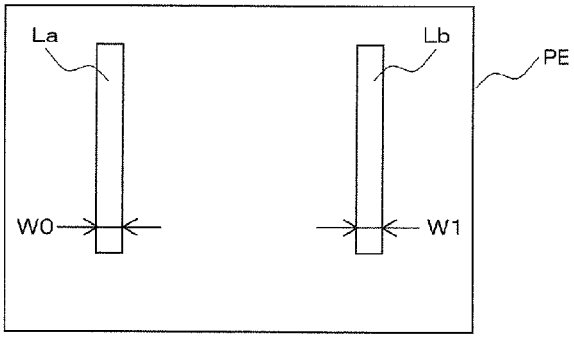

As illustrated in FIG. 9D, an absolute value (|W0−W1|) of a difference between a width W0 of the line La and a width W1 of the line Lb is equal to or smaller than a predetermined setting line width (for example, 10 cm). The setting line width is not limited to 10 cm, and for example, may be changed according to recognition performance or the like of the peripheral environment recognition sensor 14.

In a process of determining whether or not the above-described four conditions (C1 to C4) are satisfied, when the length of at least one of the lines La and Lb is cut at a position of about 2 m, for example, the process is continued using a line of about 4 m obtained by extending a virtual line of about 2 m from the cut line.

In step S208, a process of determining whether or not the process of step S206 is continuously checked until a moving distance of the vehicle V after the process of step S206 is started reaches a predetermined setting moving distance ("suitable for continuous check?" in the figure) is performed. The setting moving distance is set within a range of 1 m to 2.5 m, for example, according to specification of the vehicle V. Further, the process of step S208 is performed with reference to the overlooking image signal received from the peripheral environment recognition information calculation unit 10A and the vehicle speed calculation value signal received from the vehicle speed calculation unit 10B, for example.

In step S208, when it is determined that the process of step S206 is not continuously checked ("No" in the figure), the process performed by the parking frame certainty degree calculation unit 36 progresses to step S210. On the other hand, in step S208, when it is determined that the process of step S206 is continuously checked ("Yes" in the figure), the process performed by the parking frame certainty degree calculation unit 36 progresses to step S212.

Here, in the process performed in step S208, for example, as illustrated in FIG. 10, the moving distance of the vehicle V is virtually calculated according to a state where the process of step S206 is checked and a state where the process of step S206 is not checked. FIG. 10 is a diagram illustrating content of the process performed by the parking frame certainty degree calculation unit 36. Further, in FIG. 10, in an area of "check state", the state where the process of step S206 is checked is represented as "ON", and the state where the process of step S206 is not checked is represented as "OFF". In addition, in FIG. 10, the virtually calculated moving distance of the vehicle V is represented as a "virtual travel distance".

As illustrated in FIG. 10, in the "ON" state where the process of step S206 is checked, the virtual travel distance increases. On the other hand, in the "OFF" state where the process of step S206 is checked, the virtual travel distance decreases.

In the present embodiment, as an example, a case where an inclination (increase gain) when the virtual travel distance increases is set to be greater than an inclination (decrease gain) when the virtual travel distance decreases will be described. That is, if the state where the "check state" is "ON" and the state where the "check state" is "OFF" are maintained for the same time, the virtual travel distance increases.

Further, when the virtual travel distance reaches the setting moving distance without returning to an initial value ("0 m" in the figure), it is determined that the process of step S206 is continuously checked.

In step S210, a process of calculating the level of the parking frame certainty degree as a level (level 1) which is higher than the lowest value (level 0) by one step ("level 1" in the figure) is performed. After the process of calculating the parking frame certainty degree as the level 1 is performed in step S210, the process performed by the parking frame certainty degree calculation unit 36 is terminated (END).

In step S212, with respect to the lines La and Lb where the process of step S206 is continuously checked, end points (end points on a near side or end points on a far side) positioned on the same side with reference to the vehicle V are respectively detected. Further, a process of determining whether or not the end points positioned on the same side face each other along a direction of the width WL ("facing of near and far end points suitable?" in the figure) is performed. The process of step S212 is performed with respect to the overlooking image signal received from the peripheral environment recognition information calculation unit 1 OA and the vehicle speed calculation value signal received from the vehicle speed calculation unit 10B.

In step S212, when it is determined that the end points positioned on the same side do not face each other along the direction of the width WL ("No" in the figure), the process performed by the parking frame certainty degree calculation unit 36 progresses to step S214.

On the other hand, in step S212, when it is determined that the end points positioned on the same side face each other along the direction of the width WL ("Yes" in the figure), the process performed by the parking frame certainty degree calculation unit 36 progresses to step S216.

In step S214, a process of calculating the level of the parking frame certainty degree as a level (level 2) which is higher than the lowest value (level 0) by two steps ("level 2" in the figure) is performed. After the process of calculating the parking frame certainty degree as the level 2 is performed in step S214, the process performed by the parking frame certainty degree calculation unit 36 is terminated (END).

In step S216, with respect to the lines La and Lb where it is determined in the process of step S212 that the end points positioned on the same side face each other along the direction of the width WL, end points positioned on the other side are detected. That is, when the end points on the near side (one side) are detected with respect to the lines La and Lb in the process of step S212, in step S216, the end points on the far side (the other side) are detected with respect to the lines La and Lb. Further, a process of determining whether or not the end points positioned on the other side face each other along the direction of the width WL ("facing of opposite end points suitable?" in the figure) is performed. The process of step S216 is performed with respect to the overlooking image signal received from the peripheral environment recognition information calculation unit 10A and the vehicle speed calculation value signal received from the vehicle speed calculation unit 10B.

When detecting the end points of the lines La and Lb, an end point of a straight line such as an end point of a line illustrated in FIG. 4A, a U-shaped end point such as an upper end point of a line illustrated in FIG. 4G, and an intersection between a double line and a lateral line illustrated in FIG. 4O are collectively processed as an end point of one straight line. Similarly, an end point of a double line such as an upper end point of a line illustrated in FIG. 4H, and an end point where a gap portion is formed in a U-shaped curve such as an upper end point of a line illustrated in FIG. 4M are collectively processed as an end point of one straight line.

Further, when detecting the end points of the lines La and Lb, an intersection between a double line which is obliquely extended in a vertical direction and one straight line extended in a lateral direction illustrated in FIG. 4N is not processed (recognized) as an end point. This is because when detecting an end point, lateral scanning is performed in an area where a captured image is displayed to detect the end point. Further, for example, since an area indicated by a white frame rectangle in FIG. 4P represents an object on a road such as a pillar, an end point of an object is not detected, either.

In step S216, when it is determined that the end points positioned on the other side do not face each other along the direction of the width WL ("No" in the figure), the process performed by the parking frame certainty degree calculation unit 36 progresses to step S218.

On the other hand, in step S216, when it is determined that the end points positioned on the other side face each other along the direction of the width WL ("Yes" in the figure), the process performed by the parking frame certainty degree calculation unit 36 progresses to step S220.

In step S218, a process of calculating the level of the parking frame certainty degree as a level (level 3) which is higher than the lowest value (level 0) by three steps ("level 3" in the figure) is performed. After the process of calculating the parking frame certainty degree as the level 3 is performed in step S218, the process performed by the parking frame certainty degree calculation unit 36 is terminated (END).

In step S220, a process of calculating the level of the parking frame certainty degree as a level (level 4) which is higher than the lowest value (level 0) by four steps ("level 4" in the figure) is performed. After the process of calculating the parking frame certainty degree as the level 4 is performed in step S220, the process performed by the parking frame certainty degree calculation unit 36 is terminated (END).

Accordingly, in the process of calculating the parking frame certainty degree as the level 3, the parking frame certainty degree is calculated with respect to patterns of FIG. 4D, FIG. 4E, FIG. 4J, and FIG. 4K among the parking frames illustrated in FIG. 4A to FIG. 4P. Further, in the process of calculating the parking frame certainty degree as the level 4, the parking frame certainty degree is calculated with respect to the other patterns excluding FIG. 4D, FIG. 4E, FIG. 4J, and FIG. 4K among the parking frames illustrated in FIG. 4A to FIG. 4P.

Particularly, when the pattern illustrated in FIG. 4A which is a parking frame having a high possibility of being marked on a public road is specified, or when a parking frame other than the pattern illustrated in FIG. 4A cannot be specified, the parking frame certainty degree may be limited as follows according to the width of the parking frame.

Specifically, for example, when the width of the parking frame is equal to or smaller than 2.6 m, the parking frame certainty degree maintains the initially calculated level, but when the width of the parking frame exceeds 2.6 m, the parking frame certainty degree is limited so as not to be calculated as the level 3 or higher. Thus, a configuration in which opposite broken lines marked on the public road are not easily detected as the parking frame line is obtained.

The process in which the parking frame entering certainty degree calculation unit 38 calculates the parking frame entering certainty degree will be described with reference to FIG. 11 and FIG. 12, while referring to FIG. 1 to FIG. 10.

Figure 11:
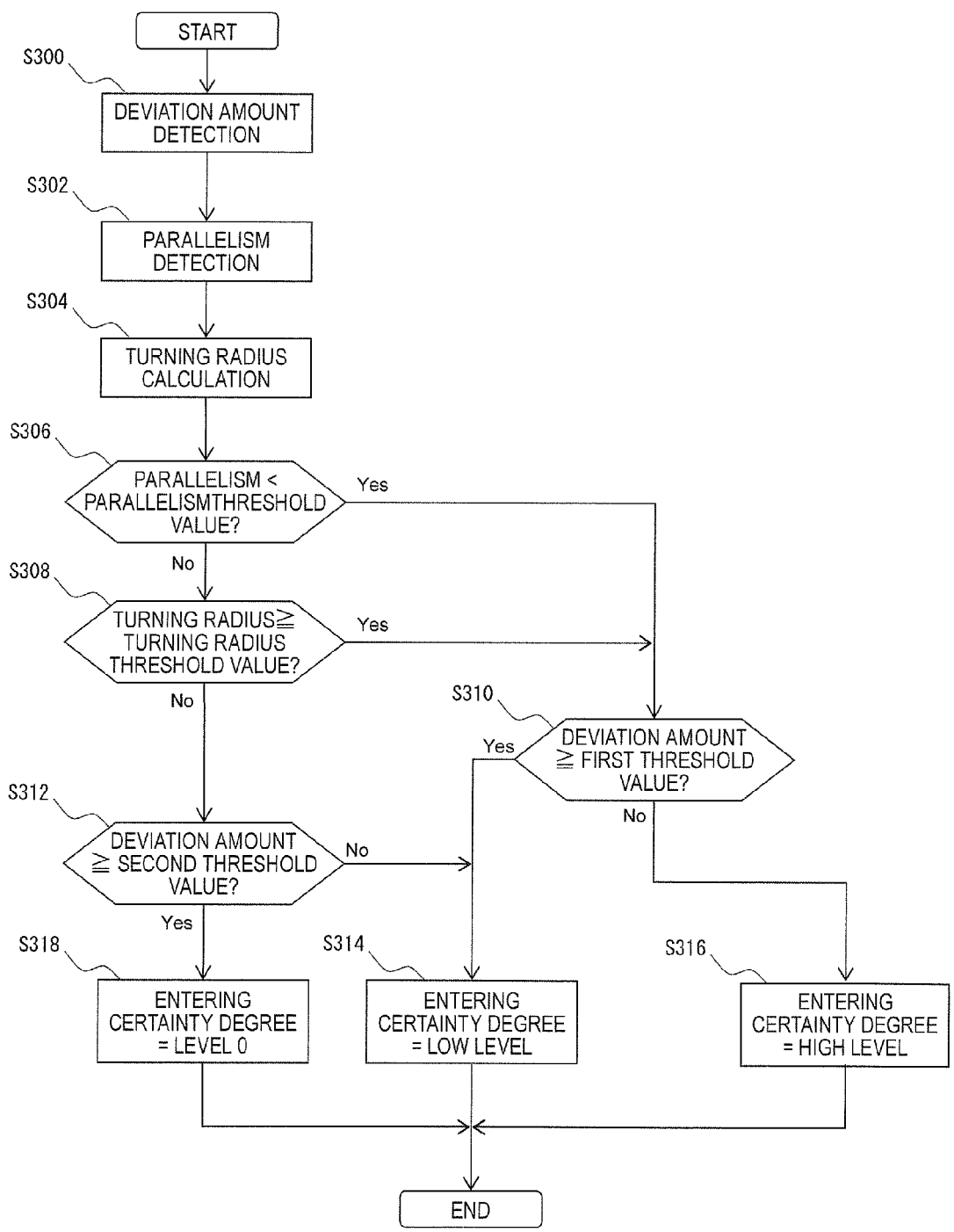
FIG. 11 is a flowchart illustrating a process of calculating a parking frame entering certainty degree by a parking frame entering certainty degree calculation unit.

FIG. 11 is a flowchart illustrating the process of calculating the parking frame entering certainty degree by the parking frame entering certainty degree calculation unit 38. The parking frame entering certainty degree calculation unit 38 performs the following process for each predetermined sampling time (for example, 10 msec).

As illustrated in FIG. 11, if the parking frame entering certainty degree calculation unit 38 starts the process (START), first, in step S300, a process of detecting a deviation amount between a rear wheel expected locus of the vehicle V and the parking frame ("deviation amount detection" in the figure) is performed. After the process of detecting the deviation amount between the rear wheel expected locus of the vehicle V and the parking frame is performed in step S300, the process performed by the parking frame entering certainty degree calculation unit 38 progresses to step S302. In the present embodiment, as an example, a case where the unit of the deviation amount detected in step S300 is set to cm will be described. Further, in the present embodiment, as an example, a case where the width of the parking frame is set to 2.5 m will be described.

Figure 12:
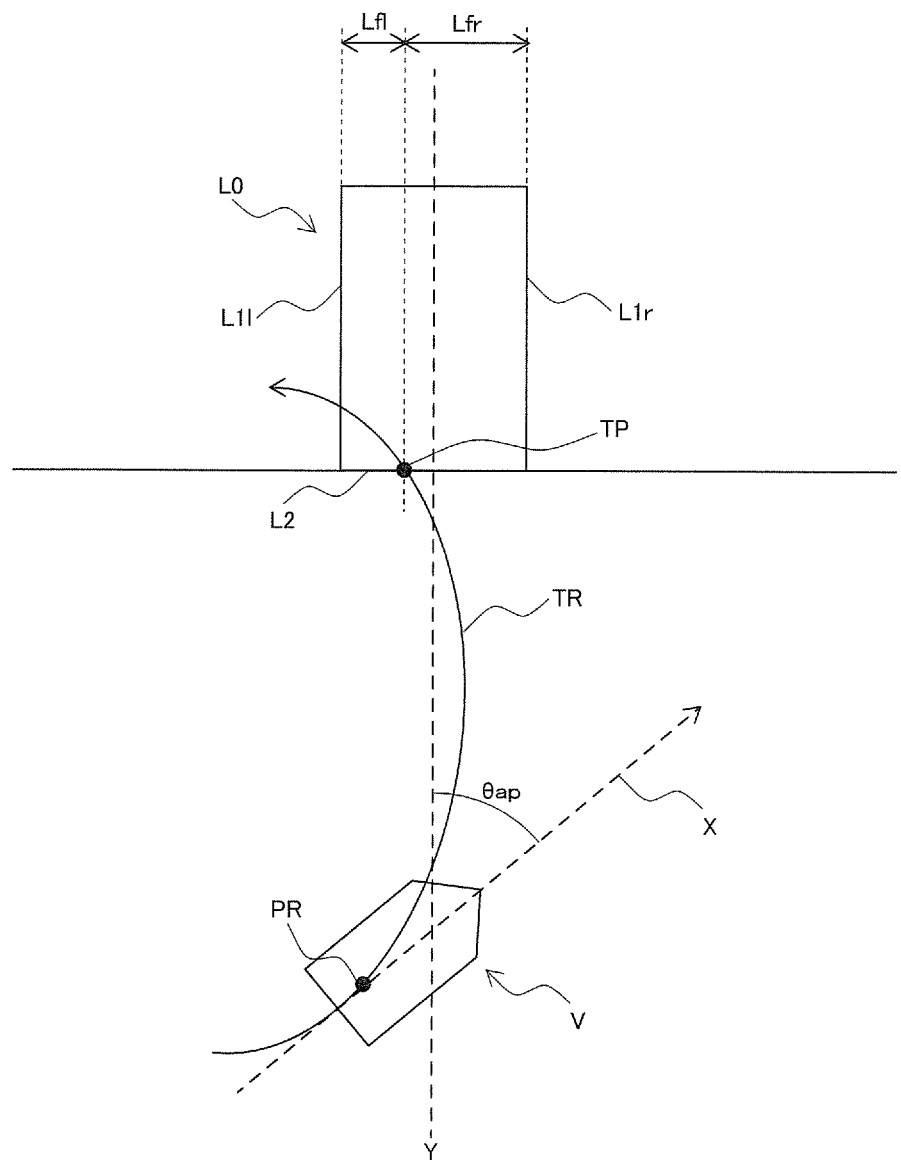
FIG. 12 is a diagram illustrating content of a process of detecting a deviation amount between a rear-wheel expected locus and a parking frame of the vehicle.

Here, in the process performed in step S300, for example, as illustrated in FIG. 12, a rear wheel expected locus TR of the vehicle V is calculated, and an intersection TP between the calculated rear wheel expected locus TR and an entrance L2 of a parking frame L0 is calculated. Further, a distance Lfl between a left side frame line L11 of the parking frame L0 and the intersection TP, and a distance Lfr between a right side frame line L1r of the parking frame L0 and the intersection TP are calculated, and the distance Lfl is compared with the distance Lfr. Further, a longer distance among the distance Lfl and the distance Lfr is detected as a deviation amount between the rear wheel expected locus TR of the vehicle V and the parking frame L0. FIG. 12 is a diagram illustrating content of the process of detecting the deviation amount between the rear wheel expected locus TR of the vehicle V and the parking frame L0.

Further, when calculating the rear wheel expected locus TR of the vehicle V, a center point PR between the right rear wheel WRR and the left rear wheel WRL in the vehicle width direction in the vehicle V is set as a reference point of the vehicle V. Further, a virtual moving path of the center point PR is calculated using images captured by the front camera 14F and the left side camera 14SL among the overlooking images, the vehicle speed of the vehicle V, and the rotation angle (steering angle) of the steering wheel 28, to thereby calculate the rear wheel expected locus TR.

In step S302, for example, a process of detecting a parallelism between a straight line X and a length direction (for example, retreating direction) of the parking frame L0 ("parallelism detection" in the figure) is performed using the image captured by the front camera 14F among the overlooking images. After the process of detecting the parallelism between the straight line X and the length direction of the parking frame L0 is performed in step S302, the process performed by the parking frame entering certainty degree calculation unit 38 progresses to step S304.

Here, the parallelism detected in step S302 is detected as an angle θap formed by a center line Y of the parking frame L0 and the straight line X, as illustrated in FIG. 12.

In step S302, when the vehicle V moves to the parking frame L0 during retreating, for example, the process of detecting the parallelism between the straight line X and the length direction of the parking frame L0 is performed using the image captured by the rear camera 14R among the overlooking images. Here, the moving direction (advancing or retreating) of the vehicle V is detected with reference to a current shift position signal, for example.

In step S304, a process of calculating a vehicle speed of the vehicle V and a turning radius of the vehicle V using the rotation angle (steering angle) of the steering wheel 28 ("turning radius calculation" in the figure) is performed. After the process of calculating the turning radius of the vehicle V is performed in step S304, the process performed by the parking frame entering certainty degree calculation unit 38 progresses to step S306.

In step S306, a process of determining whether or not the parallelism (θap) detected in step S302 is smaller than a predetermined parallelism threshold value (for example, 15°) ("parallelism<parallelism threshold value?" in the figure) is performed.

In step S306, when it is determined that the parallelism (θap) detected in step S302 is equal to or greater than the parallelism threshold value ("No" in the figure), the process performed by the parking frame entering certainty degree calculation unit 38 progresses to step S308.

On the other hand, in step S306, when it is determined that the parallelism (θap) detected in step S302 is smaller than the parallelism threshold value ("Yes" in the figure), the process performed by the parking frame entering certainty degree calculation unit 38 progresses to step S310.

In step S308, a process of determining whether or not the turning radius detected in step S304 is equal to or greater than a preset turning radius threshold value (for example, 100 [R]) ("turning radius>=turning radius threshold value?" in the figure) is performed.

In step S308, when it is determined that the turning radius detected in step S304 is smaller than the turning radius threshold value ("No" in the figure), the process performed by the parking frame entering certainty degree calculation unit 38 progresses to step S312.

On the other hand, in step S308, when it is determined that the turning radius detected in step S304 is equal to or greater than the turning radius threshold value ("Yes" in the figure), the process performed by the parking frame entering certainty degree calculation unit 38 progresses to step S310.

In step S310, a process of determining whether or not the deviation amount detected in step S300 is equal to or greater than a predetermined first threshold value (for example, 75 cm) ("deviation amount>=first threshold value?" in the figure) is performed. The first threshold value is not limited to 75 cm, and for example, may be changed according to specification of the vehicle V.

In step S310, when it is determined that the deviation amount detected in step S300 is equal to or greater than the first threshold value ("Yes" in the figure), the process performed by the parking frame entering certainty degree calculation unit 38 progresses to step S314.

On the other hand, in step S310, when it is determined that the deviation amount detected in step S300 is smaller than the first threshold value ("No" in the figure), the process performed by the parking frame entering certainty degree calculation unit 38 progresses to step S316.

In step S312, a process of determining whether or not the deviation amount detected in step S300 is equal to or greater than a predetermined second threshold value (for example, 150 cm) ("deviation amount>=second threshold value?" in the figure) is performed. Here, the second threshold value is set to a value larger than the above-described first threshold value. The second threshold value is not limited to 150 cm, and for example, may be changed according to specification of the vehicle V.

In step S312, when it is determined that the deviation amount detected in step S300 is equal to or greater than the second threshold value ("Yes" in the figure), the process performed by the parking frame entering certainty degree calculation unit 38 progresses to step S318.

On the other hand, in step S312, when it is determined that the deviation amount detected in step S300 is smaller than the second threshold value ("No" in the figure), the process performed by the parking frame entering certainty degree calculation unit 38 progresses to step S314.

In step S314, a process of calculating (setting) the parking frame entering certainty degree as a low level ("entering certainty factor=low level" in the figure) is performed. After the process of calculating the parking frame entering certainty degree as the low level is performed in step S314, the process performed by the parking frame entering certainty degree calculation unit 38 is terminated (END).

In step S316, a process of calculating the parking frame entering certainty degree as a high level ("entering certainty degree=high level" in the figure) is performed. After the process of calculating the parking frame entering certainty degree as the high level is performed in step S316, the process performed by the parking frame entering certainty degree calculation unit 38 is terminated (END).

In step S318, a process of calculating the level of the parking frame entering certainty degree as a lowest value (level 0) ("entering certainty degree=level 0" in the figure) is performed. After the process of calculating the parking frame entering certainty degree as the level 0 is performed in step S318, the process performed by the parking frame entering certainty degree calculation unit 38 is terminated (END).

As described above, the parking frame entering certainty degree calculation unit 38 performs the process of calculating the parking frame entering certainty degree as any level among the "level 0" which is the lowest value, a "low level" which is a level higher than the level 0, and a "high level" which is a level higher than the low level.

When the vehicle V has a configuration in which a device (parking assist device) that assists a steering operation to the parking frame L0 for a driver is provided, for example, a configuration in which the level of the parking frame entering certainty degree easily increases when the parking assist device is in an ON state may be used.

Here, as the parking assist device, for example, there is a device that displays on a monitor a peripheral situation using an overlooking image or the like in order to perform parking, and a device that sets a target parking position on a screen in order to guide a course for parking. Such devices are used by operating a switch that switches a screen for monitor-displaying the peripheral situation using the overlooking image or the like, or a switch that switches a screen for setting the target parking position on the screen. Further, a configuration in which when the switches are operated, the parking assist device enters the ON state is used.

As a specific example of the configuration in which the level of the parking frame entering certainty degree easily increases, a configuration in which even if the parking frame entering certainty degree is calculated as the "level 0" in the process of step S318, when the parking assist device is in the ON state, the parking frame entering certainty degree is corrected to the "low level" may be used. Further, for example, a configuration in which even if the parking frame entering certainty degree is calculated as the "low level" in the process of step S314, when the parking assist device is in the ON state, the parking frame entering certainty degree is corrected to the "high level" may be used. As the configuration in which the level of the parking frame entering certainty degree easily increases, for example, a configuration in which the parking frame entering certainty degree is calculated as a predetermined level (for example, "high level") regardless of an actual entering situation to the parking frame may be used.

The process of calculating the total certainty degree by the total certainty degree calculation unit 40 will be described with reference to FIG. 13, while referring to FIG. 1 to FIG. 12.

The total certainty degree calculation unit 40 receives inputs of a parking frame certainty degree signal and a parking frame entering certainty degree signal, and makes a parking frame certainty degree included in the parking frame certainty degree signal, and a parking frame entering certainty degree included in the parking frame entering certainty degree signal suitable for a total certainty degree calculation map illustrated in FIG. 13. Further, a total certainty degree is calculated based on the parking frame certainty degree and the parking frame entering certainty degree.

FIG. 13 is a diagram illustrating the total certainty degree calculation map. Further, in FIG. 13, the parking frame certainty degree is represented as a "frame certainty degree", and the parking frame entering certainty degree is represented as an "entering certainty degree". Further, the total certainty degree calculation map illustrated in FIG. 13 is a map used when the vehicle V is advancing.

As an example of the process of calculating the total certainty degree by the total certainty degree calculation unit 40, when the parking frame certainty degree is "level 3" and the parking frame entering certainty degree is "high level", as illustrated in FIG. 13, the total certainty degree is calculated as "high".

In the present embodiment, as an example, a case where if the total certainty degree calculation unit 40 performs the process of calculating the total certainty degree, a process of storing the calculated total certainty degree in a storing unit where data is not erased even when an ignition switch is in an OFF state will be described. Here, as the storing unit where the data is not erased even when the ignition switch is in the OFF state, a ROM or the like may be used.

Accordingly, in the present embodiment, at a time point when the ignition switch is in the OFF state after the parking of the vehicle V is completed and then enters an ON state when the vehicle V is restarted, the total certainty degree that is immediately previously calculated is stored. Thus, it is possible to start the control based on the immediately previously calculated total certainty degree from the time point when the ignition switch enters the ON state when the vehicle V is restarted.

The process of calculating the acceleration suppression control start timing by the acceleration suppression control start timing calculation unit 42 will be described with reference to FIG. 14, while referring to FIG. 1 to FIG. 13.

The acceleration suppression control start timing calculation unit 42 receives an input of the total certainty degree signal, and makes the total certainty degree included in the total certainty degree signal suitable for an acceleration suppression condition calculation map illustrated in FIG. 14. Further, the acceleration suppression control start timing calculation unit 42 calculates the acceleration suppression control start timing based on the total certainty degree.

FIG. 14 is a diagram illustrating the acceleration suppression condition calculation map. Further, in FIG. 14, the acceleration suppression control start timing is represented as "suppression control start timing (opening degree of an accelerator pedal)" in an area of "acceleration suppression condition".

As an example of the process performed by the acceleration suppression control start timing calculation unit 42, when the total certainty degree is "high", as illustrated in FIG. 14, the acceleration suppression control start timing is set to a timing when the opening degree of the accelerator pedal 32 increases to reach "50%". The opening degree of the accelerator pedal 32 is set so that a state where the accelerator pedal 32 is depressed (operated) to a maximum value corresponds to 100%.

The acceleration suppression control start timing illustrated in FIG. 14 is exemplary, and for example, may be changed according to specification of the vehicle V such as braking performance of the vehicle V. Further, for example, the acceleration suppression control start timing may be changed according to a traffic law or the like of a place (nation or the like) where the vehicle V is traveling.

The process of calculating the acceleration suppression control amount by the acceleration suppression control amount calculation unit 44 will be described with reference to FIG. 1 to FIG. 14.

The acceleration suppression control amount calculation unit 44 receives an input of the total certainty degree signal, and makes the total certainty degree included in the total certainty degree signal suitable for the acceleration suppression condition calculation map illustrated in FIG. 14. The acceleration suppression control amount is calculated based on the total certainty degree. In FIG. 14, the acceleration suppression control amount is represented as "suppression amount" in a unit of "acceleration suppression condition".

As an example of the process performed by the acceleration suppression control amount calculation unit 44, when the total certainty degree is "high", as illustrated in FIG. 14, the acceleration suppression control amount is set as a control amount in which an actual opening degree of the accelerator pedal 32 is suppressed to an opening degree of a throttle valve of a "medium" level. In the present embodiment, as an example, the opening degree of the throttle valve of the "medium" level is set as an opening degree of a throttle valve in which the actual opening degree of the accelerator pedal 32 is suppressed to 25%. Similarly, an opening degree of a throttle valve of a "low" level is set as an opening degree of a throttle valve in which the actual opening degree of the accelerator pedal 32 is suppressed to 50%, and an opening degree of a throttle valve of a "high" level is set as an opening degree of a throttle valve in which the actual opening degree of the accelerator pedal 32 is suppressed to 10%.

The acceleration suppression control amount illustrated in FIG. 14 is exemplary, and for example, may be changed according to specification of the vehicle V such as braking performance of the vehicle V. Further, for example, the acceleration suppression control amount may be changed according to a traffic law or the like of a place (nation or the like) where the vehicle V is traveling.

Further, the acceleration suppression control amount calculation unit 44 makes the total certainty degree suitable for the acceleration suppression condition calculation map, and sets the presence or absence of a control for outputting alarm sound. When the alarm sound is to be output, for example, character information on the content that the acceleration suppression control is operated or visual information such as a sign or light emission may be displayed on a display monitor provided in the navigation unit 26.

(Process Performed by Acceleration Suppression Instruction Value Calculation Unit 10J)

Next, the process of performing the acceleration suppression instruction value calculation unit 10J will be described with reference to FIG. 15, while referring to FIG. 1 to FIG. 14.

Figure 15:
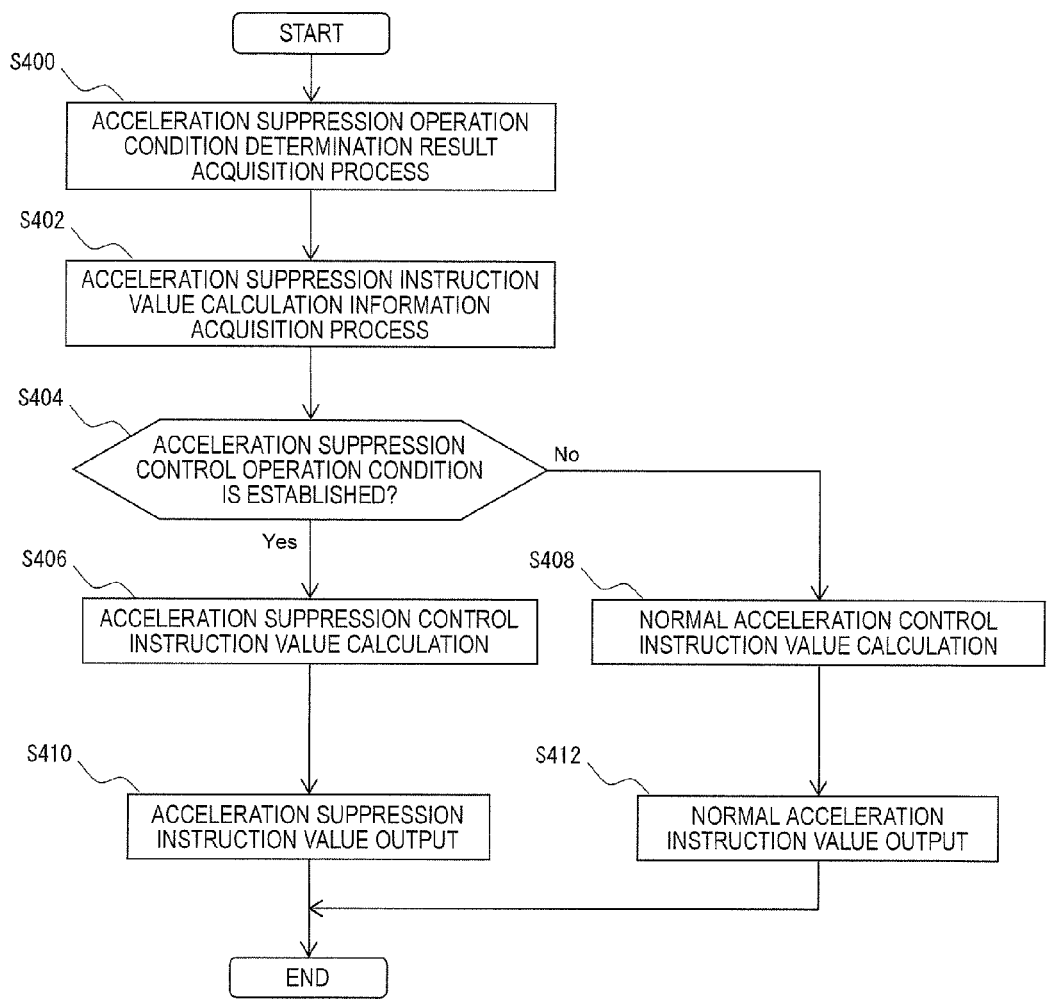
FIG. 15 is a flowchart illustrating a process performed by an acceleration suppression instruction value calculation unit.

FIG. 15 is a flowchart illustrating the process performed by the acceleration suppression instruction value calculation unit 10J. The acceleration suppression instruction value calculation unit 10J performs the following process for each predetermined sampling time (for example, 10 msec).

As illustrated in FIG. 15, if the acceleration suppression instruction value calculation unit 10J starts the process (START), first, in step S400, the acceleration suppression operation condition determination result signal received from the acceleration suppression control content calculation unit 10I is referenced. Further, a process of acquiring an acceleration suppression operation condition determination result ("acceleration suppression operation condition determination result acquisition process" in the figure) is performed. After the process of acquiring the acceleration suppression operation condition determination result is performed in step S400, the process performed by the acceleration suppression instruction value calculation unit 10J progresses to step S402.

In step S402, a process of acquiring information for calculating an acceleration suppression instruction value, in addition to the acceleration suppression operation condition determination result acquired in step S400 ("acceleration suppression instruction value calculation information acquisition process" in the figure) is performed. After the process of acquiring the information for calculating the acceleration suppression instruction value is performed in step S402, the process performed by the acceleration suppression instruction value calculation unit 10J progresses to step S404.

The information for calculating the acceleration suppression instruction value refers to information included in the above-described acceleration suppression control start timing signal, acceleration suppression control amount signal, driving-side depression amount signal, and accelerator operation speed signal, for example.

In step S404, a process of determining whether or not the acceleration suppression operation condition determination result acquired in step S400 is a determination result that the acceleration suppression control operation condition is established ("acceleration suppression control operation condition is established?" in the figure) is performed.

In step S404, when it is determined that the determination result is the determination result that the acceleration suppression control operation condition is established ("Yes" in the figure), the process performed by the acceleration suppression instruction value calculation unit 10J progresses to step S406.

On the other hand, when it is determined that the determination result is the determination result that the acceleration suppression control operation condition is not established ("No" in the figure) in step S404, the process performed by the acceleration suppression instruction value calculation unit 10J progresses to step S408.

In step S406, a process of calculating an acceleration suppression instruction value which is an acceleration instruction value for performing the acceleration suppression control ("acceleration suppression control instruction value calculation" in the figure) is performed based on the information for calculating the acceleration suppression instruction value acquired in step S402. After the process of calculating the acceleration suppression instruction value is performed in step S406, the process performed by the acceleration suppression instruction value calculation unit 10J progresses to step S410.

Here, in the process of calculating the acceleration suppression instruction value, the depression amount of the accelerator pedal 32 included in the driving-side depression amount signal, and the accelerator suppression control amount included in the acceleration suppression control amount signal are referenced. Further, an acceleration suppression control amount instruction value for setting the opening degree of the throttle valve to a suppression degree (see FIG. 14) depending on the acceleration suppression control amount with respect to the actual opening degree of the accelerator pedal 32 is calculated.

Further, in the process of calculating the acceleration suppression instruction value, the depression amount of the accelerator pedal 32 included in the driving-side depression amount signal, and the acceleration suppression control start timing included in the acceleration suppression control start timing signal are referenced. Further, an acceleration suppression control start timing instruction value for setting the acceleration suppression control start timing as a timing (see FIG. 14) depending on the actual opening degree of the accelerator pedal 32 is calculated.

In addition, in the process of calculating the acceleration suppression instruction value, an instruction value including the acceleration suppression control amount instruction value and the acceleration suppression control start timing instruction value calculated as described above is calculated as the acceleration suppression instruction value.

In step S408, a process of calculating a normal acceleration instruction value which is an acceleration instruction value used in a driving force control in which the acceleration suppression control is not performed, that is, a normal acceleration control ("normal acceleration control instruction value calculation" in the figure), is performed. After the process of calculating the normal acceleration instruction value in step S408 is performed, the process performed by the acceleration suppression instruction value calculation unit 10J progresses to step S412.

Here, in the process of calculating the normal acceleration instruction value, an instruction value for calculating the opening degree of the throttle valve is calculated as the normal acceleration instruction value based on the depression amount of the accelerator pedal 32 included in the driving-side depression amount signal.

In step S410, a process of outputting an acceleration suppression instruction value signal including the acceleration suppression instruction value calculated in step S406 to the target throttle valve opening degree calculation unit 10K ("acceleration suppression instruction value output" in the figure) is performed. After the process of outputting the acceleration suppression instruction value signal is performed in step S410, the process performed by the acceleration suppression instruction value calculation unit 10J is terminated (END).

In step S412, a process of outputting a normal acceleration instruction value signal including the normal acceleration instruction value calculated in step S408 to the target throttle valve opening degree calculation unit 10K ("normal acceleration instruction value output" in the figure) is performed. After the process of outputting the normal acceleration instruction value signal is performed in step S412, the process performed by the acceleration suppression instruction value calculation unit 10J is terminated (END).

(Process Performed by the Target Throttle Valve Opening Degree Calculation Unit 10K)

Next, the process of the target throttle valve opening degree calculation unit 10K will be described with reference to FIG. 16, while referring to FIG. 1 to FIG. 15.

Figures 16, 17:
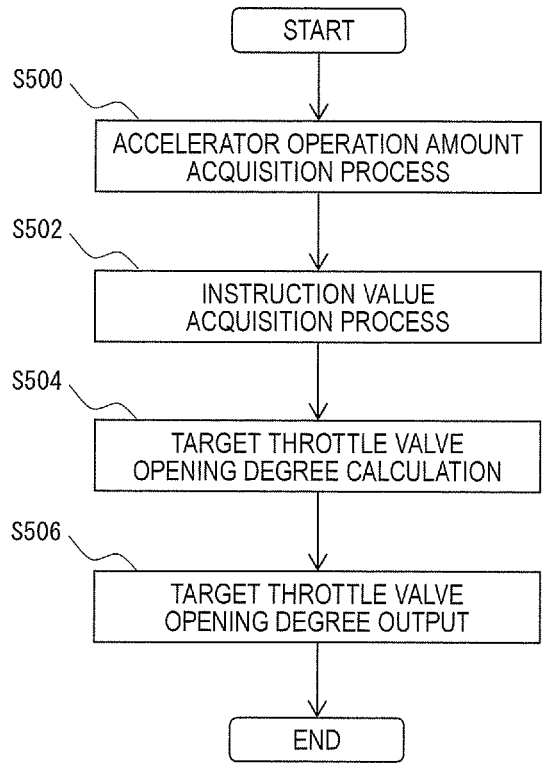
FIG. 16 is a flowchart illustrating a process performed by a target throttle valve opening degree calculation unit.
FIG. 17 is a diagram illustrating a modification example of the first embodiment of the disclosure.

FIG. 16 is a flowchart illustrating the process performed by the target throttle valve opening degree calculation unit 10K. The target throttle valve opening degree calculation unit 10K performs the following process for each predetermined sampling time (for example, 10 msec).

As illustrated in FIG. 16, if the target throttle valve opening degree calculation unit 10K starts the process (START), first, in step S500, the driving-side depression amount signal received from the accelerator operation amount calculation unit 10G is referenced. Further, a process of acquiring the depression amount (operation amount) of the accelerator pedal 32 included in the driving-side depression amount signal ("accelerator operation amount acquisition process" in the figure) is performed. After the process of acquiring the depression amount (operation amount) of the accelerator pedal 32 is performed in step S500, the process performed by the target throttle valve opening degree calculation unit 10K progresses to step S502.

In step S502, a process of acquiring the acceleration suppression instruction value (see step S406) or the normal acceleration instruction value (see step S408) ("instruction value acquisition process" in the figure) is performed based on the information signal received from the acceleration suppression instruction value calculation unit 10J. After the process of acquiring the acceleration suppression instruction value or the normal acceleration instruction value is performed in step S502, the process performed by the target throttle valve opening degree calculation unit 10K progresses to step S504.

In step S504, a process of calculating the opening degree of the target throttle valve ("target throttle valve opening degree calculation" in the figure) is performed based on the depression amount of the accelerator pedal 32 acquired in step S500 and the instruction value acquired in step S502. After the opening degree of the target throttle valve is calculated in step S504, the process performed by the target throttle valve opening degree calculation unit 10K progresses to step S506.

Here, in step S504, when the instruction value acquired in step S502 is the normal acceleration instruction value (when the acceleration suppression operation condition is not established), the opening degree of the throttle valve depending on the depression amount of the accelerator pedal 32 is calculated as the opening degree of the target throttle valve.

On the other hand, when the instruction value acquired in step S502 is the acceleration suppression instruction value (when the acceleration suppression operation condition is established), the opening degree of the throttle valve depending on the acceleration suppression control amount instruction value is calculated as the opening degree of the target throttle valve.

The opening degree of the target throttle valve is calculated using the following Expression (1), for example.

$$\theta^* = \theta1 - \Delta\theta \tag{1}$$

In Expression (1), the opening degree of the target throttle valve is represented as "$\theta^*$", the opening degree of the throttle valve depending on the depression amount of the accelerator pedal 32 is represented as "$\theta1$", and the acceleration suppression control amount is represented as "$\Delta\theta$".

In step S506, the target throttle valve opening degree signal including the opening degree $\theta^*$ of the target throttle valve calculated in step S504 is output to the engine controller 12 ("target throttle valve opening degree output" in the figure). After the process of outputting the target throttle valve opening degree signal to the engine controller 12 is performed in step S506, the process performed by the target throttle valve opening degree calculation unit 10K is terminated (END).

Here, in step S506, when the instruction value acquired in step S502 is the acceleration suppression instruction value, the target throttle valve opening degree signal is output at a timing when the opening degree (depression amount) of the accelerator pedal 32 reaches the opening degree depending on the acceleration suppression control start timing.

(Operation)

Next, an example of the process performed using the vehicle acceleration suppression device 1 of the present embodiment will be described with reference to FIG. 1 to FIG. 16.

In the example of the operation described below, an example in which the vehicle V that travels in a parking lot enters the parking frame L0 selected by the driver will be described.

In a state where the vehicle speed of the vehicle V that travels in the parking lot is equal to or greater than the vehicle speed threshold value 15 km/h, since the acceleration suppression control operation condition is not established, the normal acceleration control in which an acceleration intention of the driver is reflected is performed in the vehicle V, without operating the acceleration suppression control.

When the vehicle speed is less than the vehicle speed threshold value, the parking frame L0 is detected, the brake pedal 30 is not operated, and the depression amount of the accelerator pedal 32 is equal to or greater than the accelerator operation amount threshold value, it is determined whether or not the vehicle V enters the parking frame L0.

Further, during traveling of the vehicle V, the parking frame certainty degree calculation unit 36 calculates the parking frame certainty degree, and the parking frame entering certainty degree calculation unit 38 calculates the parking frame entering certainty degree. Further, the total certainty degree calculation unit 40 calculates the total certainty degree based on the parking frame certainty degree and the parking frame entering certainty degree.

Further, during traveling of the vehicle V, the acceleration suppression control start timing calculation unit 42 calculates the acceleration suppression control start timing, and the acceleration suppression control amount calculation unit 44 calculates the acceleration suppression control amount, based on the total certainty degree calculated by the total certainty degree calculation unit 40.

Further, if it is determined that the vehicle V enters the parking frame L0 and it is determined that the acceleration suppression control operation condition is established, the acceleration suppression instruction value calculation unit 10J outputs the acceleration suppression instruction value signal to the target throttle valve opening degree calculation unit 10K. Further, the target throttle valve opening degree calculation unit 10K outputs the target throttle valve opening degree signal to the engine controller 12.

Thus, if the driver operates the accelerator pedal 32 in a state where the acceleration suppression control operation condition is established, the opening degree of the throttle valve depending on the depression amount of the accelerator pedal 32 is suppressed to the opening degree depending on the acceleration suppression control amount instruction value. In addition, a starting timing when the opening degree of the throttle valve depending on the depression amount of the accelerator pedal 32 is suppressed is set to a timing depending on the acceleration suppression control start timing instruction value.

Accordingly, in a situation where a braking operation is an appropriate driving operation, for example, in a state where the vehicle V approaches a position suitable for parking in the parking frame L0, even though the accelerator pedal 32 is operated due to an operational error or the like, it is possible to suppress the opening degree of the throttle valve according to the total certainty degree. That is, in a state where the total certainty degree is low, since the acceleration suppression amount (suppression degree of opening degree of a throttle valve) is small, it is possible to reduce deterioration of operability, and in a state where the total certainty degree is high, since the acceleration suppression amount is large, it is possible to increase the acceleration suppression effect of the vehicle V.

As described above, in the present embodiment, in parking the vehicle, it is possible to suppress deterioration of operability in the parking lot before the vehicle V enters the parking frame L0, and to suppress acceleration of the vehicle V due to the operational error of the accelerator pedal 32.

Further, in the present embodiment, as the total certainty degree increases, the acceleration suppression control amount increases. Thus, the acceleration of the vehicle V is suppressed to enhance safety. Further, as the total certainty degree decreases, the acceleration suppression control start timing is delayed to suppress deterioration of operability. Thus, under the following situations, it is possible to enhance safety and suppress deterioration of operability.

For example, in a situation where the vehicle V waiting in the vicinity of a place where the parking frame L0 for parallel parking is marked beside a travel lane on a road starts movement, it is necessary to allow a certain degree of acceleration.

Further, in the following situation, it is also necessary to allow a certain degree of acceleration. This is a state where other vehicles are present on both sides (right and left parking frames) of the parking frame L0 where the vehicle V is to be parked, the vehicle V enters some space on an opposite side (side separated from each parking frame) from the front side thereof, and then, the vehicle V enters the parking frame L0 where the vehicle V is to be parked from the rear side thereof to perform parking.

In these situations, by controlling the acceleration suppression control start timing and the acceleration suppression control amount based on the total certainty degree, it is possible to suppress the acceleration of the vehicle V to enhance safety. In addition, by allowing the acceleration of the vehicle V, it is possible to suppress deterioration of operability.

Further, in the present embodiment, when the parking frame certainty degree is low, the acceleration suppression control amount is calculated to be smaller than a case where the parking frame certainty degree is high. Thus, as described below, in a situation where a current position of the vehicle V is a position (for example, parking lot) which is not a public road, it is possible to suppress deterioration of operability.

In a situation where the current position of the vehicle V is the position which is not the public road, for example, a line in the image captured by the peripheral environment recognition sensor 14 is detected, but when the detected line cannot be specified as the parking frame line, the parking frame certainty degree is calculated as a low level. The case where the detected line cannot be specified as the parking frame line refers to a case where one line in the image captured by the peripheral environment recognition sensor 14 is detected and an end portion thereof is detected but a line is not detected on a front side (side close to the vehicle V) of the one detected line, for example.

Further, for example, when the line detected in the image captured by the peripheral environment recognition sensor 14 is a line of which an edge is blurred or a line which is blurred and is unclear, it is determined that the current position of the vehicle V is the position which is not the public road, and the parking frame certainty degree is calculated as a low level. This is because in many cases a line marked on a public road is generally regularly maintained by a public organization or the like, and thus, it may be estimated that a period when the edge is blurred or the line is blurred and is unclear is short.

The above-described acceleration suppression instruction value calculation unit 10J and target throttle valve opening degree calculation unit 10K correspond to an acceleration controller.

Further, the above-described peripheral environment recognition information calculation unit 10A corresponds to a peripheral environment recognizer.

Further, the above-described vehicle speed calculation unit 10B, steering angle calculation unit 10C, steering angle speed calculation unit 10D, brake pedal operation information calculation unit 10F, accelerator operation amount calculation unit 10G, and accelerator operation speed calculation unit 10H correspond to a vehicle travel state detector.

Further, the above-described acceleration suppression control start timing calculation unit 42, acceleration suppression control amount calculation unit 44, acceleration suppression instruction value calculation unit 10J, and target throttle valve opening degree calculation unit 10K correspond to an acceleration controller.

Further, the above-described opening degree of the throttle valve corresponds to the acceleration instruction value.

In addition, the above-described navigation unit 26 corresponds to a vehicle current position detector and a vehicle travel lane type detector.

As described above, when the parking frame entering certainty degree is low, the vehicle acceleration suppression method executed by the operation of the vehicle acceleration suppression device 1 of the present embodiment is a method for suppressing the acceleration instruction value depending on the operation amount of the accelerator pedal 32 with a low suppression degree, as compared with a case where the parking frame entering certainty degree is high. Here, the parking frame entering certainty degree represents the degree of certainty that the vehicle V enters the parking frame L0, and is set based on the peripheral environment of the vehicle V and the travel state of the vehicle V.

Further, as described above, when the total certainty degree is low, the vehicle acceleration suppression method executed by the operation of the vehicle acceleration suppression device 1 of the present embodiment is a method for suppressing the acceleration instruction value depending on the operation amount of the accelerator pedal 32 with a low suppression degree, as compared with a case where the total certainty degree is high. Here, the total certainty degree represents a total certainty degree of the parking frame certainty degree and the parking frame entering certainty degree. Further, the parking frame certainty degree represents the degree of certainty that the parking frame L0 is present in a travel direction of the vehicle V, and is set based on the peripheral environment of the vehicle V.

Effects of First Embodiment

According to the present embodiment, the following effects can be achieved.

(1) The parking frame entering certainty degree calculation unit 38 is configured to calculate the parking frame entering certainty degree based on the peripheral overlooking image (environment) of the vehicle V, the vehicle speed of the vehicle V, and the rotation angle (travel state) of the steering wheel 28. In addition, when the parking frame entering certainty degree calculated by the parking frame entering certainty degree calculation unit 38 is low, the suppression degree of the acceleration instruction value becomes lower than a case where the parking frame entering certainty degree is high. That is, when the parking frame entering certainty degree calculated by the parking frame entering certainty degree calculation unit 38 is high, the suppression degree of the acceleration instruction value becomes higher than a case where the parking frame entering certainty degree is low.

Thus, in a state where the parking frame entering certainty degree is low, it is possible to reduce deterioration of operability by decreasing the suppression degree of the acceleration instruction value, and in a state where the parking frame entering certainty degree is high, it is possible to enhance the acceleration suppression effect of the vehicle V by increasing the suppression degree of the acceleration instruction value.

As a result, it is possible to suppress deterioration of operability of the vehicle V in parking the vehicle, and to suppress acceleration of the vehicle V due to an operational error of the accelerator pedal 32.

(2) The parking frame certainty degree calculation unit 36 is configured to calculate the parking frame certainty degree based on the peripheral overlooking image (environment) of the vehicle V and the vehicle speed (travel state) of the vehicle V. In addition, the total certainty degree calculation unit 40 is configured to calculate the total certainty degree based on the parking frame certainty degree calculated by the parking frame certainty degree calculation unit 36 and the parking frame entering certainty degree calculated by the parking frame entering certainty degree calculation unit 38. Further, when the total certainty degree calculated by the total certainty degree calculation unit 40 is low, the suppression degree of the acceleration instruction value becomes lower than a case where the total certainty degree is high.

Thus, in addition to the degree of certainty that the vehicle V enters the parking frame L0, it is possible to control the suppression degree of the acceleration instruction value according to the degree of certainty that the parking frame L0 is present in the travel direction of the vehicle V.

As a result, in addition to the above-described effects (1), it is possible to suppress deterioration of operability of the vehicle V in parking the vehicle, and to suppress acceleration of the vehicle V due to an operational error of the accelerator pedal 32.

(3) The acceleration suppression control start timing calculation unit 42, the acceleration suppression instruction value calculation unit 10J, and the target throttle valve opening degree calculation unit 10K are configured to make the acceleration suppression control start timing earlier to increase the suppression degree of the acceleration instruction value.

As a result, it is possible to control the start timing for suppressing the opening degree of the throttle valve depending on the depression amount of the accelerator pedal 32, and to control the suppression degree of the acceleration instruction value.

(4) The acceleration suppression control amount calculation unit 44, the acceleration suppression instruction value calculation unit 10J, and the target throttle valve opening degree calculation unit 10K are configured to increase the acceleration suppression control amount to increase the suppression degree of the acceleration instruction value.

As a result, it is possible to control the suppression amount of the opening degree of the throttle valve depending on the depression amount of the accelerator pedal 32, and to control the suppression degree of the acceleration instruction value.

(5) In the vehicle acceleration suppression method of the present embodiment, the parking frame entering certainty degree is calculated based on the peripheral overlooking image (environment) of the vehicle V and the vehicle speed (travel state) of the vehicle V. In addition, when the parking frame entering certainty degree is low, if it is detected that the vehicle V enters the parking frame L0, the acceleration instruction value is suppressed with a lower suppression degree than a case where the parking frame entering certainty degree is high.

Thus, in a state where the parking frame entering certainty degree is low, it is possible to reduce deterioration of operability by decreasing the suppression degree of the acceleration instruction value, and in a state where the parking frame entering certainty degree is high, it is possible to enhance the acceleration suppression effect of the vehicle V by increasing the suppression degree of the acceleration instruction value.

As a result, it is possible to suppress deterioration of operability of the vehicle V in parking the vehicle, and to suppress acceleration of the vehicle V due to an operational error of the accelerator pedal 32.

(6) In the vehicle acceleration suppression method of the present embodiment, the parking frame certainty degree is calculated based on the peripheral overlooking image (environment) of the vehicle V and the vehicle speed (travel state) of the vehicle V. In addition, the total certainty degree is calculated based on the calculated parking frame certainty degree and the parking frame entering certainty degree, and when the total certainty degree is low, the acceleration instruction value is suppressed with a lower suppression degree than a case where the total certainty degree is high.

Thus, it is possible to control the suppression degree of the acceleration instruction value according to the degree of certainty that the vehicle V enters the parking frame L0 and the degree of certainty that the parking frame L0 is present in the travel direction of the vehicle V.

As a result, in addition to the above-described effect (5), it is possible to suppress deterioration of operability of the vehicle V in parking the vehicle, and to suppress acceleration of the vehicle V due to an operational error of the accelerator pedal 32.

(Modifications)

(1) In the present embodiment, the acceleration suppression control start timing and the acceleration suppression control amount are calculated based on the total certainty degree calculated by the total certainty degree calculation unit 40, but the present disclosure is not limited thereto. That is, the acceleration suppression control start timing and the acceleration suppression control amount may be calculated based on only the parking frame entering certainty degree calculated by the parking frame entering certainty degree calculation unit 38. In this case, the acceleration suppression control start timing and the acceleration suppression control amount are calculated by making the parking frame entering certainty degree suitable for an acceleration suppression condition calculation map illustrated in FIG. 17, for example. FIG. 17 is a diagram illustrating a modification example of the present embodiment.

(2) In the present embodiment, the parking frame certainty degree calculation unit 36 is configured to calculate the parking frame certainty degree based on the peripheral overlooking image (environment) of the vehicle V and the vehicle speed (travel state) of the vehicle V, but the configuration of the parking frame certainty degree calculation unit 36 is not limited thereto. That is, the parking frame certainty degree calculation unit 36 may be configured to calculate the parking frame certainty degree using the current position of the vehicle V included in the vehicle position signal, and the type (road type) of the road on which the vehicle V travels included in the travel road information signal, in addition to the peripheral overlooking image and the vehicle speed of the vehicle V.

In this case, for example, if it is detected that the current position of the vehicle V is on a public road based on the information included in the position signal and the travel road information signal, it is determined that the parking frame L0 is not present in the vicinity of the vehicle V, and the parking frame certainty degree is calculated as "level 0".

Thus, for example, when the vehicle V enters a parking frame which is not preferable for the operation of the acceleration suppression control, such as a parking frame arranged on a road edge on the public road, it is possible to suppress deterioration of operability of the vehicle V.

(3) In the present embodiment, if it is determined that the end points face each other along the direction of the width WL with respect to the line La and Lb, the parking frame certainty degree calculation unit 36 performs the process of calculating the parking frame certainty degree as the level 3 or the level 4 (see step S212). However, the process of calculating the parking frame certainty degree as the level 3 or the level 4 is not limited thereto. That is, when it is recognized that the shape of the end point of the line L is a shape that is not marked on the public road, such as a U-shape (see FIG. 4G to FIG. 4K, FIG. 4M, and FIG. 4N, for example), the parking frame certainty degree may be calculated as the level 3 or the level 4.

(4) In the present embodiment, the parking frame certainty degree calculation unit 36 is configured to calculate the parking frame certainty degree based on the peripheral overlooking image (environment) of the vehicle V and the vehicle speed (travel state) of the vehicle V, but the configuration of the parking frame certainty degree calculation unit 36 is not limited thereto. That is, in a configuration in which a device (parking assist device) that assists the steering operation to the parking frame L0 is provided for the driver, the vehicle V may have a configuration in which the level of the parking frame certainty degree easily increases when the parking assist device is in the ON state may be used. Here, the configuration in which the level of the parking frame certainty degree easily increases refers to a configuration in which the above-described setting moving distance is set to a distance shorter than a normal distance, for example.

Further, as the parking assist device, for example, there is a device that displays on a monitor a peripheral situation using an overlooking image or the like in order to perform parking, or a device that sets a target parking position on a screen in order to guide a course for parking. Such a device is used by operating a switch that switches a screen for monitor-displaying the peripheral situation using the overlooking image or the like, or a switch that switches a screen for setting the target parking position on the screen. Further, a configuration in which if the switch is operated so that the parking assist device enters the ON state, detection of the paring frame is easily performed so that the level of the parking frame certainty degree easily increases may be used.

Here, as a method for easily detecting the parking frame, for example, there is a method for correcting the setting value so that the conditions C1 to C4 of the above-described step S206 are established. Further, there is a method, other than the correction method, for setting the setting moving distance used when it is determined in step S206 that the continuous check state reaches the setting moving distance to be short. In addition, for example, there is a method for setting the condition of the end points when it is determined in step S212 that the parking frame certainty degree is the level 3 or the level 4 so that the number of the end points is smaller than the initial setting, for example.

As the method for easily detecting the parking frame, for example, a method for detecting the parking frame certainty degree as a set level in advance (for example, "level 4") regardless of the actual detection situation of the parking frame may be used.

(5) In the present embodiment, the acceleration suppression control amount and the acceleration suppression control start timing are changed based on the total certainty degree to change the suppression degree of the acceleration instruction value, but the present disclosure is not limited thereto. That is, only the acceleration suppression control start timing or only the acceleration suppression control amount is changed according to the total certainty degree to change the suppression degree of the acceleration instruction value. In this case, for example, as the total certainty degree increases, the acceleration suppression control amount may be set to be large, and the acceleration suppression control start timing may not be changed, so that the suppression degree of the acceleration instruction value may increase.

(6) In the present embodiment, the total certainty degree is calculated based on the calculated parking frame certainty degree and the parking frame entering certainty degree regardless of the number of space line detected when the level of the parking frame certainty degree is calculated, but the present disclosure is not limited thereto. That is, for example, the total certainty degree may be calculated according to the number of lines L detected when the above-described condition B is satisfied.

In this case, for example, the number of lines L detected when the condition B is satisfied in addition to the calculated parking frame certainty degree and parking frame entering certainty degree is made to be suitable for a total certainty degree calculation map illustrated in FIG. 18. Further, the total certainty degree is calculated based on the parking frame certainty degree and the parking frame entering certainty degree, and the type of the line L detected when the condition B is satisfied. FIG. 18 is a diagram illustrating the total certainty degree calculation map used in a modification example of the present embodiment. Further, in FIG. 18, similarly to FIG. 13, the parking frame certainty degree is represented as a "frame certainty degree", and the parking frame entering certainty degree is represented as an "entering certainty degree".

In the above-described case, as illustrated in FIG. 18, when the parking frame entering certainty degree is "low level" and the parking frame certainty degree is calculated as "level 1", and when the parking frame entering certainty degree is "low level" and the parking frame certainty degree is calculated as "level 2 to 4", the total certainty degree is calculated according to the type of the line L detected when the condition B is satisfied.

Specifically, when the parking frame entering certainty degree is "low level" and the parking frame certainty degree is calculated as "level 1", and when the type of the line L detected when the condition B is satisfied is a single line, the total certainty degree is calculated as a total certainty degree with which the acceleration suppression control is not performed, similarly to the case of "level 0". Further, when the parking frame entering certainty degree is "low level" and the parking frame certainty degree is calculated as "level 1", and when the type of the line L detected when the condition B is satisfied is a double line, the total certainty degree is calculated as "extremely low".

When the parking frame entering certainty degree is "low level" and the parking frame certainty degree is calculated as "level 2 to 4", and when the type of the line L detected when the condition B is satisfied is a single line, the total certainty degree is calculated as "extremely low". Further, when the parking frame entering certainty degree is "low level" and the parking frame certainty degree is calculated as "level 2 to 4", and when the type of the line L detected when the condition B is satisfied is a double line, the total certainty degree is calculated as "extremely high".

Here, when the total certainty degree is calculated using the total certainty degree calculation map illustrated in FIG. 18, for example, the calculated total certainty degree is made to be suitable for an acceleration suppression condition calculation map illustrated in FIG. 19 to calculate the acceleration suppression control start timing. FIG. 19 is a diagram illustrating the acceleration suppression condition calculation map used in a modification example of the present embodiment. Further, in FIG. 19, similarly to FIG. 14, in a unit of "acceleration suppression condition", the acceleration suppression control start timing is represented as "suppression control start timing (opening degree of an accelerator pedal)".

When calculating the acceleration suppression control start timing using the acceleration suppression condition calculation map illustrated in FIG. 19, when the total certainty degree is "extremely low", time measurement of the acceleration suppression control start timing is started at a time point when the opening degree of the accelerator pedal 32 increases to reach "80%". In addition, a time point when the measurement time when the opening degree of the accelerator pedal 32 is equal to or greater than "80%" reaches "0.25 sec" is set as the acceleration suppression control start timing. That is, when the total certainty degree is "extremely low", the acceleration suppression control is started from the time point when the measurement time when the opening degree of the accelerator pedal 32 is equal to or greater than "80%" reaches "0.25 sec".

Further, an acceleration suppression control amount when the total certainty degree is "extremely low" is set to be a control amount in which the opening degree of the throttle valve is suppressed to a "small" level. In FIG. 19, similarly to FIG. 14, in a unit of "acceleration suppression condition", the acceleration suppression control amount is represented as a "suppression amount".

On the other hand, when the total certainty degree is "extremely high", the time measurement of the acceleration suppression control start timing is started at a time point when the opening degree of the accelerator pedal 32 increases to reach "50%". In addition, a time point when the measurement time when the opening degree of the accelerator pedal 32 is equal to or greater than "50%" reaches "0.65 sec" is set as the acceleration suppression control start timing. That is, when the total certainty degree is "extremely high", the acceleration suppression control is started from the time point when the measurement time when the opening degree of the accelerator pedal 32 is equal to or greater than "50%" reaches "0.65 sec".

Further, an acceleration suppression control amount when the total certainty degree is "extremely high" is set to be a control amount in which the opening degree of the throttle valve is suppressed to a "high" level.

Here, an operation example when the acceleration suppression control start timing is calculated using the acceleration suppression condition calculation map illustrated in FIG. 19 will be described.

Figures 20, 21:
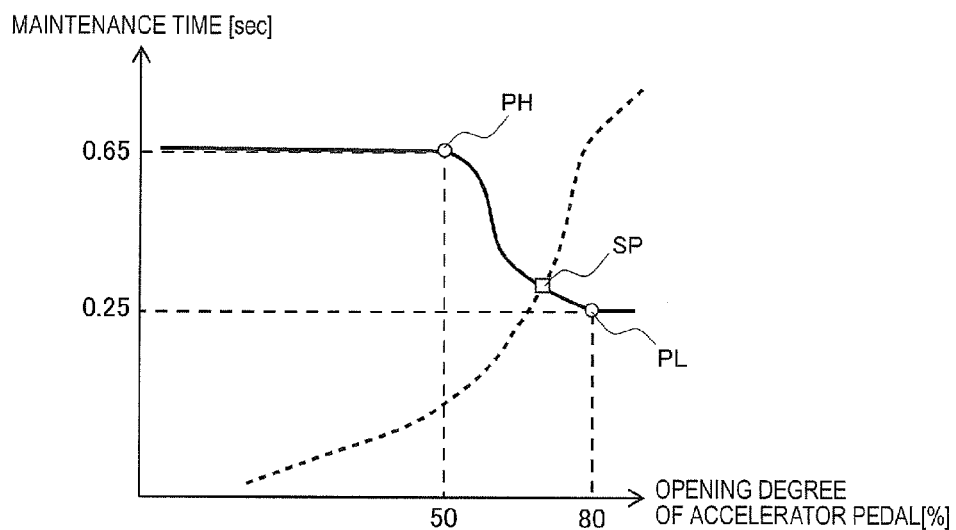
FIG. 20 is a diagram illustrating a modification example of the first embodiment of the disclosure.
FIG. 21 is diagram illustrating a total certainty degree calculation map used in a second embodiment of the disclosure.

When the acceleration suppression condition calculation map illustrated in FIG. 19 is used, the relationship between the acceleration suppression control start timing based on the total certainty degree and a maintenance time becomes a relationship illustrated in FIG. 20. FIG. 20 is a diagram illustrating the relationship between the acceleration suppression control start timing and the maintenance time. Further, in FIG. 20, the acceleration suppression control start timing is represented as "acceleration opening degree %" on a transverse axis, and the maintenance time is represented as "maintenance time (sec)" on a longitudinal axis.

As illustrated in FIG. 20, when the total certainty degree is calculated as "extremely low", a time point PL when the measurement time when the opening degree of the accelerator pedal is equal to or greater than 80% reaches "0.25 sec" is set as the acceleration suppression control start timing. Further, when the total certainty degree is calculated as "extremely high", a time point PH when the measurement time when the opening degree of the accelerator pedal is equal to or greater than 50% reaches "0.65 sec" is set as the acceleration suppression control start timing. In FIG. 20, a line continuously indicating control threshold values which serve as a setting reference of the acceleration suppression control start timing is indicated by a solid line.

However, when the images captured by the peripheral environment recognition sensor 14 while the vehicle V is traveling are changed, the type of the line L detected when the condition B is satisfied may be changed.

Here, for example, in a situation where the parking frame certainty degree is calculated as "level 2 to 4", a case where the type of the line L detected when the condition B is satisfied is changed from a single line to a double line may be considered.

In this case, at a time point when the type of the line L detected when the condition B is satisfied is changed from the single line to the double line, the total certainty degree is changed from "extremely low" to "extremely high".

At a time point when the type of the line L detected when the condition B is satisfied is the single line, the time point PL illustrated in FIG. 20 is set as the acceleration suppression control start timing, and the measurement of the maintenance time is not started until the acceleration opening degree reaches 80%.

However, if the total certainty degree is changed from "extremely low" to "extremely high", even though the opening degree of the accelerator pedal already reaches 50%, the measurement of the maintenance time is started from the time point when the total certainty degree is changed from "extremely low" to "extremely high". Further, in FIG. 20, the acceleration suppression control is started from a time point SP when the relationship between the measurement time and the opening degree of the accelerator pedal overlaps the line continuously indicating the control threshold values. In FIG. 20, the change in the opening degree of the accelerator pedal depending on the lapse of time is indicated by a broken line.

Accordingly, when the total certainty degree is changed from "extremely low" to "extremely high", the time when the acceleration suppression control is started is delayed as compared with a case where the total certainty degree is calculated as "extremely high" from the beginning.

Thus, for example, in a situation where the vehicle V travels on a rising slope when traveling a parking lot where plural parking frames are arranged, such as a parking tower to move to an upper floor parking lot from a lower floor parking lot, it is possible to suppress deterioration of operability. This is applied to a situation where the straight travel is changed to the turning travel before the vehicle V travels on the rising slope to decrease the vehicle speed, and the type of the line L detected when the condition B is satisfied is changed from the single line to the double line, so that the total certainty degree is changed from "extremely low" to "extremely high".

In this situation, even though the straight travel is changed to the turning travel before the vehicle V travels on the rising slope to decrease the vehicle speed and the total certainty degree is changed from "extremely low" to "extremely high", the time when the acceleration suppression control is started is delayed as compared with a case where the total certainty degree is calculated as "extremely high" from the beginning. Thus, as compared with a case where the total certainty degree is calculated as "extremely high" from the beginning, the timing when the acceleration suppression control is started is delayed to increase a possibility that the parking frame certainty degree is calculated as "level 0", and a time point when the vehicle travels on the rising slope is used as a time point when the acceleration suppression control is started.

Next, for example, in a situation where the parking frame certainty degree is calculated as "level 2 to 4", a case where the type of the line L detected when the condition B is satisfied is the single line and the parking frame entering certainty degree is changed from "low level" to "high level" may be considered.

In this case, at a time point when the parking frame entering certainty degree is changed from "low level" to "high level", the total certainty degree is changed from "extremely low" to "extremely high". Further, similarly to a case where the type of the line L detected when the condition B is satisfied is changed from the single line to the double line, the time when the acceleration suppression control is started is delayed as compared with a case where the total certainty degree is calculated as "extremely high" from the beginning.

Thus, for example, in a situation where the vehicle V turns left at an intersection after left turn, overtakes another vehicle which is a vehicle that is already parked, and then, enters a parking frame disposed at a road edge for parking, it is possible to reduce deterioration of operability. This is applied to a situation where when the vehicle V turns left at an intersection, overtakes another vehicle from a right side, and then moves left toward a road edge, the parking frame entering certainty degree is changed from "low level" to "high level", and the total certainty degree is changed from "extremely low" to "extremely high".

In this situation, when the vehicle speed decreased due to the left turn at the intersection is increased, even though the total certainty degree is changed from "extremely low" to "extremely high", the time when the acceleration suppression control is started is delayed as compared with a case where the total certainty degree is calculated as "extremely high" from the beginning". Thus, as compared with a case where the total certainty degree is calculated as "extremely high" from the beginning, the timing when the acceleration suppression control is started is delayed to increase a possibility that the vehicle speed is decelerated on a public road, and a time point when the parking is started during traveling is used as the time point when the acceleration suppression control is started.

(7) In the present embodiment, the acceleration of the vehicle V depending on the depression amount (driving force operation amount) of the accelerator pedal 32 is suppressed by controlling the acceleration instruction value, but the present disclosure is not limited thereto. That is, for example, the acceleration of the vehicle V depending on the driving force operation amount may be suppressed by setting the opening degree of the throttle valve depending on the depression amount (driving force operation amount) of the accelerator pedal 32 as an opening degree of a target throttle valve and generating a braking force by the above-described brake system.

(8) In the present embodiment, the parking frame certainty degree is calculated as the level 0 which is the lowest value and the levels (level 1 to level 4) which are higher than the lowest value by plural steps, but the steps of the parking frame certainty degree are not limited thereto. That is, the parking frame certainty degree may be calculated as only two steps of a level (for example, "level 0") which is the lowest value and a level (for example, "level 100") which is higher than the lowest value.

(9) In the present embodiment, the parking frame entering certainty degree is calculated as "level 0" which is the lowest value, "low level" which is the level higher than the level 0, and "high level" which is the level higher than the low level, but the steps of the parking frame entering certainty degree are not limited thereto. That is, the parking frame entering certainty degree may be calculated as only two steps of a level which is the lowest value (for example, "level 0") and a level which is higher than the lowest value (for example, "level 100").

(10) In the present embodiment, the total certainty degree is calculated as any one of the four-step levels ("extremely low", "low", "high", and "extremely high") according to the parking frame certainty degree calculated as any one of the five-step levels and the parking frame entering certainty degree calculated as any one of the three-step levels. However, the steps of the total certainty degree are not limited thereto. That is, the total certainty degree may be calculated as only two steps of a level (for example, "level 0") which is the lowest value and a level which is higher than the lowest value (for example, "level 100").

In this case, for example, when the parking frame certainty degree and the parking frame entering certainty degree are calculated as the level which is the lowest value, the total certainty degree is calculated as the level which is the lowest value. Further, for example, when the parking frame certainty degree and the parking frame entering certainty degree are calculated as the level which is higher than the lowest value, the total certainty degree is calculated as the level which is higher than the lowest value.

Second Embodiment

Hereinafter, a second embodiment of the disclosure (hereinafter, referred to as "the present embodiment") will be described with reference to the accompanying drawings.

(Configuration)

First, the configuration of a vehicle acceleration suppression device 1 of the present embodiment will be described with reference to FIG. 21 and FIG. 22, while referring to FIG. 1 to FIG. 20.

Since a vehicle acceleration suppression device 1 of the present embodiment is the same as the above-described first embodiment except for a process performed by the acceleration suppression control content calculation unit 10I, repetitive description may be omitted with respect to processes other than the process performed by the acceleration suppression control content calculation unit 10I.

Further, the vehicle acceleration suppression device 1 of the present embodiment is different from the above-described first embodiment in processes other than a process performed by the acceleration suppression operation condition determination unit 34 in the process performed by the acceleration suppression control content calculation unit 10I. Thus, in the following description, the same processes as those of the above-described first embodiment may not be described.

In the above-described process of step S208, the parking frame certainty degree calculation unit 36 of the present embodiment first determines whether or not the travel direction of the vehicle V is an advancing direction or a retreating direction, and sets a setting moving distance according to the determination result. Further, the parking frame certainty degree calculation unit 36 performs a process of determining whether or not the process of step S206 is continuously checked until the moving distance of the vehicle V reaches the setting moving distance after the process of step S206 is started, based on the setting moving distance set according to the travel direction of the vehicle V.

Here, the process of setting the setting moving distance according to the travel direction of the vehicle V is performed with reference to a current shift position signal received from the shift position calculation unit 10E, for example.

Further, in the present embodiment, for example, a case where the setting moving distance is set to 2.5 m when it is determined that the travel direction of the vehicle V is the advancing direction and is set to 1 m when it is determined that the travel direction of the vehicle V is the retreating direction will be described.

The setting moving distance is exemplary, and for example, may be changed according to specification of the vehicle V, such as braking performance of the vehicle V. Further, for example, the setting moving distance may be changed according to a traffic law or the like of a place (nation or the like) where the vehicle V is traveling.

Accordingly, in the present embodiment, in the process of step S208, when the travel direction of the vehicle V is the advancing direction, the level of the parking frame certainty degree is not easily calculated as "level 1", when compared with a case where the travel direction of the vehicle V is the retreating direction.

Further, the parking frame certainty degree calculation unit 36 of the present embodiment determines whether or not the travel direction of the vehicle V is the advancing direction or the retreating direction in the above-described process of step S212.

Further, when the travel direction of the vehicle V is the advancing direction, similarly to the above-described first embodiment, when it is determined that the end points positioned at the same side face each other along the direction of the width WL, the process performed by the parking frame certainty degree calculation unit 36 progresses to step S216.

On the other hand, when the travel direction of the vehicle V is the retreating direction, when it is recognized that the shape of the end point of one of the lines La and Lb is a U-shape (see FIG. 4G to FIG. 4K, FIG. 4M, and FIG. 4N, for example), the process performed by the parking frame certainty degree calculation unit 36 progresses to step S216. That is, when the travel direction of the vehicle V is the retreating direction, when it is recognized that the shape of the end point of one of the lines La and Lb is a shape that is not marked on a public road, the process performed by the parking frame certainty degree calculation unit 36 progresses to step S216.

Accordingly, in the present embodiment, in the process of step S212, when the travel direction of the vehicle V is the advancing direction, the level of the parking frame certainty degree is not easily calculated as "level 3", as compared with a case where the travel direction of the vehicle V is the retreating direction.

That is, in the present embodiment, when the travel direction of the vehicle V is the advancing direction, the level of the parking frame certainty degree does not easily increase, as compared with a case where the travel direction of the vehicle V is the retreating direction. Thus, in the present embodiment, when the travel direction of the vehicle V is the retreating direction, the suppression degree of the acceleration instruction value increases, as compared with a case where the travel direction of the vehicle V is the advancing direction.

Further, the parking frame entering certainty degree calculation unit 38 of the present embodiment first determines whether or not the travel direction of the vehicle V is the advancing direction or the retreating direction, in the above-described process of step S314.

Then, when the travel direction of the vehicle V is the advancing direction, a process of calculating the parking frame entering certainty degree as a low level during advancing is performed, and when the travel direction of the vehicle V is the retreating direction, a process of calculating the parking frame entering certainty degree as a low level during retreating is performed.

Further, the parking frame entering certainty degree calculation unit 38 first determines whether or not the travel direction of the vehicle V is the advancing direction or the retreating direction, in the above-described process of step S316.

Then, when the travel direction of the vehicle V is the advancing direction, a process of calculating the parking frame entering certainty degree as a high level during advancing is performed, and when the travel direction of the vehicle V is the retreating direction, a process of calculating the parking frame entering certainty degree as a high level during retreating is performed.

Further, a total certainty degree calculation unit 40 of the present embodiment receives an input of the parking frame certainty degree signal and the parking frame entering certainty degree signal, and makes the parking frame certainty degree included in the parking frame certainty degree signal and the parking frame entering certainty degree included in the parking frame entering certainty degree signal suitable for a total certainty degree calculation map illustrated in FIG. 21. Further, the total certainty degree calculation unit 40 calculates the total certainty degree based on the parking frame certainty degree and the parking frame entering certainty degree.

FIG. 21 is a diagram illustrating the total certainty degree calculation map used in the present embodiment. In FIG. 21, similarly to FIG. 13, the parking frame certainty degree is represented as a "frame certainty degree", and the parking frame entering certainty degree is represented as an "entering certainty degree".

Here, the total certainty degree calculation map used by the total certainty degree calculation unit 40 of the present embodiment is different from the total certainty degree calculation map used by the total certainty degree calculation unit 40 of the above-described first embodiment, in which the level of the total certainty degree is changed according to the determination result of the travel direction of the vehicle V. In FIG. 21, the total certainty degree when it is determined that the travel direction of the vehicle V is the advancing direction is represented as "low advance level" and "high advance level" in a unit of "entering certainty degree". In addition, in FIG. 21, the total certainty degree when it is determined that the travel direction of the vehicle V is the retreating direction is represented as "low retreat level" and "high retreat level" in a unit of "entering certainty degree".

The "low advance level" corresponds to the process of calculating the parking frame entering certainty degree as the low level during advancing in the above-described process of step S314. Further, the "low retreat level" corresponds to the process of calculating the parking frame entering certainty degree as the low level during retreating in the above-described process of step S314.

Similarly, the "high advance level" corresponds to the process of calculating the parking frame entering certainty degree as the high level during advancing in the above-described process of step S316. Further, the "high retreat level" corresponds to the process of calculating the parking frame entering certainty degree as the high level during retreating in the above-described process of step S316.

Further, the total certainty degree calculation unit 40 of the present embodiment calculates the total certainty degree when it is determined that the travel direction of the vehicle V is the retreating direction as a level which is equal to or higher than that of the total certainty degree when it is determined that the travel direction of the vehicle V is the advancing direction as illustrated in FIG. 21.

As an example of the process of calculating the total certainty degree by the total certainty degree calculation unit 40 of the present embodiment, when the parking frame certainty degree is "level 2" and the parking frame entering certainty degree is "high advance level", as illustrated in FIG. 21, the total certainty degree is calculated as "low". On the other hand, when the parking frame certainty degree is "level 2" and the parking frame entering certainty degree is "high retreat level", as illustrated in FIG. 21, the total certainty degree is calculated as "high".

Further, as an example of the process of calculating the total certainty degree by the total certainty degree calculation unit 40 of the present embodiment, a process of easily increasing the level of the parking frame certainty degree before advancing by considering that the vehicle V is already being parked even though the travel direction of the vehicle V is the advancing direction and by performing the same calculation as in retreating may be performed. This process is applied to a case where the vehicle V retreats after the parking frame certainty degree is calculated as "level 1" during advancing of the vehicle V and advances again during retreating within a predetermined distance (for example, 2.5 m).

As described above, in the present embodiment, when the travel direction of the vehicle V is the advancing direction, the level of the total certainty degree does not easily increase, as compared with a case where the travel direction of the vehicle V is the retreating direction. Thus, in the present embodiment, when the travel direction of the vehicle V is the retreating direction, the suppression degree of the acceleration instruction value increases, as compared with a case where the travel direction of the vehicle V is the advancing direction.

Further, when it is determined that the travel direction of the vehicle V is the retreating direction, the acceleration suppression control start timing calculation unit 42 of the present embodiment makes the total certainty degree included in the total certainty degree signal suitable for a retreat acceleration suppression condition calculation map illustrated in FIG. 22. Further, the acceleration suppression control start timing calculation unit 42 calculates the acceleration suppression control start timing based on the total certainty degree.

FIG. 22 is a diagram illustrating the retreat acceleration suppression condition calculation map. Further, in FIG. 22, similarly to FIG. 14, the acceleration suppression control start timing is represented as "suppression control start timing (acceleration opening degree)" in a unit of "acceleration suppression condition".

Here, in the retreat acceleration suppression condition calculation map used by the acceleration suppression control start timing calculation unit 42 of the present embodiment, the acceleration suppression control start timing with respect to the total certainty degree is set to be earlier than the acceleration suppression condition calculation map of the above-described first embodiment. Accordingly, in the retreat acceleration suppression condition calculation map used by the acceleration suppression control start timing calculation unit 42 of the present embodiment, when the travel direction of the vehicle V is the retreating direction, the suppression degree of the acceleration instruction value increases, as compared with a case where the travel direction of the vehicle V is the advancing direction.

As an example of the process performed by the acceleration suppression control start timing calculation unit 42 of the present embodiment, when the total certainty degree is "low", as illustrated in FIG. 22, the acceleration suppression control start timing is set to a timing when the opening degree of the accelerator pedal 32 increases to reach "50%". The acceleration suppression control start timing illustrated in FIG. 22 is exemplary, and may be changed according to specification or the like of the vehicle V, similarly to the acceleration suppression control start timing illustrated in FIG. 14.

Further, when it is determined that the travel direction of the vehicle V is the retreating direction, the acceleration suppression control amount calculation unit 44 of the present embodiment makes the total certainty degree included in the total certainty degree signal suitable for the retreat acceleration suppression condition calculation map illustrated in FIG. 22. Further, the acceleration suppression control amount calculation unit 44 calculates the acceleration suppression control amount based on the total certainty degree. In FIG. 22, the acceleration suppression control amount is represented as "suppression amount" in a unit of "acceleration suppression condition", similarly to FIG. 14.

Here, in retreat acceleration suppression condition calculation map used by the acceleration suppression control amount calculation unit 44, the acceleration suppression control amount with respect to the total certainty degree is set to be large, as compared with the acceleration suppression condition calculation map of the above-described first embodiment. Accordingly, in the retreat acceleration suppression condition calculation map used by the acceleration suppression control amount calculation unit 44 of the present embodiment, when the travel direction of the vehicle V is the retreating direction, the suppression degree of the acceleration instruction value increases, as compared with a case where the travel direction of the vehicle V is the advancing direction.

As an example of the process performed by the acceleration suppression control amount calculation unit 44 of the present embodiment, when the total certainty degree is "extremely low", as illustrated in FIG. 22, the acceleration suppression control amount is set as a control amount in which an actual opening degree of the accelerator pedal 32 is suppressed to an opening degree of a throttle valve of a "medium" level. The acceleration suppression control amount illustrated in FIG. 22 is exemplary, and may be changed according to specification or the like of the vehicle V, similarly to the acceleration suppression control amount illustrated in FIG. 14.

As described above, in the present embodiment, when the travel direction of the vehicle V is the advancing direction, as compared with a case where the travel direction of the vehicle V is the retreating direction, the acceleration suppression control start timing is set to be earlier, and the acceleration suppression control amount is set to be larger. Thus, in the present embodiment, when the travel direction of the vehicle V is the retreating direction, as compared with a case where the travel direction of the vehicle V is the advancing direction, the suppression degree of the acceleration instruction value increases.

(Operation)

Next, an example of the operation performed using the vehicle acceleration suppression device 1 of the present embodiment will be described with reference to FIG. 1 to FIG. 22. With respect to the same operation or the like as that of the above-described first embodiment, repetitive description may be omitted.

In the example of the operation described below, similarly to the above-described first embodiment, an example in which the vehicle V that travels in a parking lot enters a parking frame L0 selected by a driver will be described.

While the vehicle V is traveling, the parking frame certainty degree calculation unit 36 calculates the parking frame certainty degree, and the parking frame entering certainty degree calculation unit 38 calculates the parking frame entering certainty degree. Further, the total certainty degree calculation unit 40 calculates the total certainty degree based on the parking frame certainty degree and the parking frame entering certainty degree.

Further, while the vehicle V is traveling, the acceleration suppression control start timing calculation unit 42 calculates the acceleration suppression control start timing, and the acceleration suppression control amount calculation unit 44 calculates the acceleration suppression control amount, based on the total certainty degree calculated by the total certainty degree calculation unit 40.

Further, when it is determined that the vehicle V enters the parking frame L0 and it is determined that the acceleration suppression control operation condition is established, the acceleration suppression instruction value calculation unit 10J outputs the acceleration suppression instruction value signal to the target throttle valve opening degree calculation unit 10K. Further, the target throttle valve opening degree calculation unit 10K outputs the target throttle valve opening degree signal to the engine controller 12.

Here, in the present embodiment, in the process of calculating the parking frame certainty degree by the parking frame certainty degree calculation unit 36, when the travel direction of the vehicle V is the advancing direction, the level of the parking frame certainty degree does not easily increase, as compared with a case where the travel direction of the vehicle V is the retreating direction.

Thus, in a state where the acceleration suppression control operation condition is established, when the travel direction of the vehicle V is the retreating direction, the suppression degree of the acceleration instruction value increases, as compared with a case where the travel direction of the vehicle V is the advancing direction.

In addition, in the present embodiment, in the process of calculating the parking frame entering certainty degree by the parking frame entering certainty degree calculation unit 38, when the travel direction of the vehicle V is the advancing direction, the level of the parking frame entering certainty degree does not easily increase, as compared with a case where the travel direction of the vehicle V is the retreating direction.

Thus, in a state where the acceleration suppression control operation condition is established, when the travel direction of the vehicle V is the retreating direction, the suppression degree of the acceleration instruction value increases, as compared with a case where the travel direction of the vehicle V is the advancing direction.

In addition, in the present embodiment, in the process of calculating the total certainty degree by the total certainty degree calculation unit 40, when the travel direction of the vehicle V is the advancing direction, the level of the parking frame certainty degree does not easily increase, as compared with a case where the travel direction of the vehicle V is the retreating direction.

Thus, in a state where the acceleration suppression control operation condition is established, when the travel direction of the vehicle V is the retreating direction, the suppression degree of the acceleration instruction value increases, as compared with a case where the travel direction of the vehicle V is the advancing direction.

Further, in the present embodiment, in the process of calculating the acceleration suppression control start timing by the acceleration suppression control start timing calculation unit 42, when the travel direction of the vehicle V is the advancing direction, the level of the parking frame certainty degree does not easily increase, as compared with a case where the travel direction of the vehicle V is the retreating direction.

Thus, in a state where the acceleration suppression control operation condition is established, when the travel direction of the vehicle V is the retreating direction, the suppression degree of the acceleration instruction value increases, as compared with a case where the travel direction of the vehicle V is the advancing direction.

In addition, in the present embodiment, in the process of calculating the acceleration suppression control amount by the acceleration suppression control amount calculation unit 44, when the travel direction of the vehicle V is the advancing direction, the level of the parking frame certainty degree does not easily increase, as compared with a case where the travel direction of the vehicle V is the retreating direction.

Thus, in a state where the acceleration suppression control operation condition is established, when the travel direction of the vehicle V is the retreating direction, the suppression degree of the acceleration instruction value increases, as compared with a case where the travel direction of the vehicle V is the advancing direction.

The above-described shift position sensor 20 and shift position calculation unit 10E correspond to a vehicle travel direction detector.

Further, as described above, when the travel direction of the vehicle V is the advancing direction, the vehicle acceleration suppression control method of the present embodiment is a method for suppressing the acceleration instruction value depending on the operation amount of the accelerator pedal 32 with a low suppression degree, as compared with a case where the travel direction of the vehicle V is the retreating direction.

Effects of Second Embodiment

Hereinafter, effects of the present embodiment will be described.

In the present embodiment, the following effects can be achieved, in addition to the effects of the above-described first embodiment.

(1) The travel state of the vehicle is detected by the shift position sensor 20 and the shift position calculation unit 10E. In addition, when the travel direction of the vehicle V is the advancing direction, the acceleration suppression control start timing calculation unit 42, the acceleration suppression control amount calculation unit 44, the acceleration suppression instruction value calculation unit 10J, and the target throttle valve opening degree calculation unit 10K decrease the suppression degree of the acceleration instruction value, as compared with a case where the travel direction of the vehicle is the retreating direction. That is, when the travel direction of the vehicle V is the retreating direction, the acceleration suppression control start timing calculation unit 42, the acceleration suppression control amount calculation unit 44, the acceleration suppression instruction value calculation unit 10J, and the target throttle valve opening degree calculation unit 10K increase the suppression degree of the acceleration instruction value, as compared with a case where the travel direction of the vehicle V is the advancing direction.

Thus, when the travel direction of the vehicle V is the advancing direction in which the driver easily views the travel direction, the suppression degree of the acceleration instruction value decreases as compared with a case where the travel direction of the vehicle V is the retreating direction in which the driver does not view more easily than the advancing direction, to thereby make it possible to reduce deterioration of operability. Further, when the travel direction of the vehicle V is the retreating direction in which the driver does not view more easily than the advancing direction, the suppression degree of the acceleration instruction value increases as compared with a case where the travel direction of the vehicle V is the advancing direction where the driver easily views the travel direction, to thereby make it possible to enhance the acceleration suppression effect of the vehicle V.

As a result, it is possible to suppress deterioration of operability of the vehicle V in parking the vehicle, and to suppress acceleration of the vehicle V due to an operational error of the accelerator pedal 32.

(2) In the vehicle acceleration suppression control method of the present embodiment, the travel direction of the vehicle V is detected, and when the travel direction of the vehicle V is the advancing direction, the acceleration instruction value is suppressed with a low suppression degree, as compared with a case where the travel direction of the vehicle V is the retreating direction.

Thus, when the travel direction of the vehicle V is the advancing direction where the driver easily views the travel direction, the suppression degree of the acceleration instruction value decreases as compared with a case where the travel direction of the vehicle V is the retreating direction in which the driver does not view more easily the advancing direction, to thereby make it possible to reduce deterioration of operability. Further, when the travel direction of the vehicle V is the retreating direction in which the driver does not view more easily than the advancing direction, the suppression degree of the acceleration instruction value increases as compared with a case where the travel direction of the vehicle V is the advancing direction where the driver easily views the travel direction, to thereby make it possible to enhance the acceleration suppression effect of the vehicle V.

As a result, it is possible to suppress deterioration of operability of the vehicle V in parking the vehicle, and to suppress acceleration of the vehicle V due to an operational error of the accelerator pedal 32.

(Modifications)

(1) In the present embodiment, when the travel direction of the vehicle V is the advancing direction, the level of the parking frame certainty degree does not easily increase as compared with a case where the travel direction of the vehicle V is the retreating direction, so that the suppression degree of the acceleration instruction value decreases, but the present disclosure is not limited thereto. That is, for example, when the setting of at least one of the parallelism threshold value, the turning radius threshold value, the first threshold value, and the second threshold value may be changed, so that when the travel direction of the vehicle V is the advancing direction, the level of the parking frame entering certainty degree may not easily increase, as compared with a case where the travel direction of the vehicle V is the retreating direction. Thus, when the travel direction of the vehicle V is the advancing direction, the level of the parking frame entering certainty degree does not easily increase, as compared with a case where the travel direction of the vehicle V is the retreating direction, so that the suppression degree of the acceleration instruction value decreases.

(2) In the present embodiment, when the travel direction of the vehicle V is the advancing direction, the setting moving distance is set to be longer than a case where the travel direction of the vehicle V is the retreating direction, so that the level of the parking frame certainty degree does not easily increase, but the present disclosure is not limited thereto. That is, for example, in the process of determining whether or not the above-described four conditions (C1 to C4) are satisfied, when the line La is cut, and when the travel direction of the vehicle V is the advancing direction, the process is continued using a line of about 4 m obtained by extending a virtual line of about 2 m from the cut line. On the other hand, when the travel direction of the vehicle V is the retreating direction, the process is continued using a line of about 5 m obtained by extending a virtual line of about 3 m from the cut line. Thus, when the travel direction of the vehicle V is the advancing direction, the level of the parking frame certainty degree may not easily increase, as compared with a case where the travel direction of the vehicle V is the retreating direction.

(3) In the present embodiment, the travel direction of the vehicle V is detected using the above-described shift position sensor 20 and shift position calculation unit 10E, but the present disclosure is not limited thereto. That is, for example, a longitudinal acceleration sensor that detects acceleration in the longitudinal direction of the vehicle body (vehicle longitudinal direction) may be provided in the vehicle V, and the travel direction of the vehicle V may be detected based on the acceleration detected by the longitudinal acceleration sensor.

(4) In the present embodiment, the acceleration suppression control start timing and the acceleration suppression control amount are calculated based on the total certainty degree calculated by the total certainty degree calculation unit 40, but the present disclosure is not limited thereto. That is, the acceleration suppression control start timing and the acceleration suppression control amount may be calculated based on the parking frame entering certainty degree calculated by the parking frame entering certainty degree calculation unit 38 and the determination result of whether or not the travel direction of the vehicle V is the advancing direction or the retreating direction. In this case, the acceleration suppression control start timing and the acceleration suppression control amount are calculated by making the parking frame entering certainty degree suitable for an acceleration suppression condition calculation map illustrated in FIG. 23, for example. FIG. 23 is a diagram illustrating a modification example of the present embodiment.

Third Embodiment

Hereinafter, a third embodiment of the disclosure (hereinafter, referred to as "the present embodiment") will be described with reference to the accompanying drawings.

(Configuration)

First, a configuration of a vehicle acceleration suppression device 1 of the present embodiment will be described with reference to FIG. 24, while referring to FIG. 1 to FIG. 23.

Since the vehicle acceleration suppression device 1 of the present embodiment is the same as the above-described first embodiment except for a process performed by the acceleration suppression control content calculation unit 10I, repetitive description may be omitted with respect to processes other than the process performed by the acceleration suppression control content calculation unit 10I.

Further, the vehicle acceleration suppression device 1 of the present embodiment is the same as the above-described first embodiment except for processes performed by the parking frame certainty degree calculation unit 36, the parking frame entering certainty degree calculation unit 38, the total certainty degree calculation unit 40 in the process performed by the acceleration suppression control content calculation unit 10I, and thus, repetitive description may be omitted.

In the above-described process of step S208, the parking frame certainty degree calculation unit 36 of the present embodiment first receives an input of a steering angle signal, determines whether or not the travel state of the vehicle V is a turning state, and sets a setting moving distance according to the determination result. Further, the parking frame certainty degree calculation unit 36 performs a process of determining whether or not the process of step S206 is continuously checked until the moving distance of the vehicle V reaches the setting moving distance after the process of step S206 is started, based on the setting moving distance set according to whether or not the travel state of the vehicle V is the turning state.

Here, as the process of determining whether or not the travel state of the vehicle V is the turning state, for example, an operation amount (rotation angle) from the neutral position of the steering wheel 28 included in the steering angle signal is referenced. Further, it is determined whether or not the referenced rotation angle exceeds a preset turning state determination threshold value (for example, 90°). Further, when the referenced rotation angle exceeds the turning state determination threshold value, it is determined that the vehicle V is in the turning state.

The turning state determination threshold value is not limited to 90°, and for example, may be changed according to specification of the vehicle V, such as braking performance of the vehicle V. Further, for example, the turning state determination threshold value may be changed according to a traffic law or the like of a place (nation or the like) where the vehicle V is traveling.

Here, the process of setting the setting moving distance according to whether or not the travel state of the vehicle V is the turning state is performed with reference to the steering angle signal received from the steering angle calculation unit 10C, for example.

Further, in the present embodiment, as an example, a case where the setting moving distance is set to 2.5 m when it is determined that the travel state of the vehicle V is not the turning state and is set to 1 m when it is determined that the travel state of the vehicle V is the turning state will be described.

The setting moving distance is exemplary, and for example, may be changed according to specification of the vehicle V, such as braking performance of the vehicle V. Further, for example, the setting moving distance may be changed according to a traffic law or the like of a place (nation or the like) where the vehicle V is traveling.

Accordingly, in the present embodiment, in the process of step S208, when the travel state of the vehicle V is the turning state, the level of the parking frame certainty degree is not easily calculated as "level 1", as compared with a case where the travel state of the vehicle V is not the turning state.

Further, in the above-described process of step S314, the parking frame entering certainty degree calculation unit 38 of the present embodiment first determines whether or not the travel state of the vehicle V is the turning state.

When it is determined that the travel state of the vehicle V is not the turning state, a process of calculating the parking frame entering certainty degree as a low level in a non-turning state is performed. On the other hand, when it is determined that the travel state of the vehicle V is the turning state, a process of calculating the parking frame entering certainty degree as a low level in the turning state is performed.

In addition, in the above-described process of step S316, the parking frame entering certainty degree calculation unit 38 first determines whether or not the travel state of the vehicle V is the turning state.

When it is determined that the travel state of the vehicle V is not the turning state, a process of calculating the parking frame entering certainty degree as a high level in the non-turning state is performed. On the other hand, when it is determined that the travel state of the vehicle V is the turning state, a process of calculating the parking frame entering certainty degree as a high level in the turning state is performed.

Further, the total certainty degree calculation unit 40 of the present embodiment performs the same process as that of the above-described parking frame certainty degree calculation unit 36, for example, to perform a process of determining whether or not the travel state of the vehicle V is the turning state.

The total certainty degree calculation unit 40 of the present embodiment receives an input of a parking frame certainty degree signal and a parking frame entering certainty degree signal, and makes a parking frame certainty degree included in the parking frame certainty degree signal and a parking frame entering certainty degree included in the parking frame entering certainty degree signal suitable for a total certainty degree calculation map illustrated in FIG. 24. Further, the total certainty degree calculation unit 40 calculates a total certainty degree based on the parking frame certainty degree and the parking frame entering certainty degree.

FIG. 24 is a diagram illustrating the total certainty degree calculation map used in the present embodiment. Further, in FIG. 24, similarly to FIG. 13, the parking frame certainty degree is represented as "frame certainty degree", and the parking frame entering certainty degree is represented as "entering certainty degree".

Here, the total certainty degree calculation map used by the total certainty degree calculation unit 40 of the present embodiment is different from the total certainty degree calculation map used by the total certainty degree calculation unit 40 of the above-described first embodiment, in which the level of the total certainty f degree actor is changed according to the determination result of whether or not the vehicle V is in the turning state. In FIG. 24, the total certainty degree when it is determined that the vehicle V is not in the turning state is represented as "low level in non-turning state" and "high level in non-turning state" in a unit of "entering certainty degree". In addition, in FIG. 24, the total certainty degree when it is determined that the vehicle V is in the turning state is represented as "low level in turning state" and "high level in turning state" in a unit of "entering certainty degree".

The "low level in non-turning state" corresponds to the process of calculating the parking frame entering certainty degree as the low level in the non-turning state in the above-described process of step S314. Further, the "low level in turning state" corresponds to the process of calculating the parking frame entering certainty degree as the low level in the turning state in the above-described process of step S314.

Similarly, the "high level in non-turning state" corresponds to the process of calculating the parking frame entering certainty degree as the high level in the non-turning state in the above-described process of step S316. Further, the "high level in turning state" corresponds to the process of calculating the parking frame entering certainty degree as the high level in the turning state in the above-described process of step S316.

Further, as illustrated in FIG. 24, the total certainty degree calculation unit 40 of the present embodiment calculates the total certainty degree when it is determined that the vehicle V is in the turning state as a level which is equal to or higher than the total certainty degree when it is determined that the vehicle V is not in the turning state.

As an example of the process of calculating the total certainty degree by the total certainty degree calculation unit 40 of the present embodiment, when the parking frame certainty degree is "level 2" and the parking frame entering certainty degree is "high level in non-turning state", as illustrated in FIG. 24, the total certainty degree is calculated as "low". On the other hand, when the parking frame certainty degree is "level 2" and the parking frame entering certainty degree is "high level in turning state", as illustrated in FIG. 24, the total certainty degree is calculated as "high".

Accordingly, in the present embodiment, when the vehicle V is in the turning state, the total certainty degree is easily calculated as a higher level than a case where the vehicle V is not in the turning state. Thus, in the present embodiment, when the vehicle V is in the turning state, the suppression degree of the acceleration instruction value increases, as compared with a case where the vehicle V is not in the turning state.

(Operation)

Next, an example of the operation performed using the vehicle acceleration suppression device 1 of the present embodiment will be described with reference to FIG. 1 to FIG. 24. With respect to the same operation or the like as that of the above-described first embodiment, repetitive description may be omitted.

In the example of the operation described below, similarly to the above-described first embodiment, an example in which the vehicle V that travels in a parking lot enters a parking frame L0 selected by a driver will be described.

While the vehicle V is traveling, the parking frame certainty degree calculation unit 36 calculates the parking frame certainty degree, and the parking frame entering certainty degree calculation unit 38 calculates the parking frame entering certainty degree. Further, the total certainty degree calculation unit 40 calculates the total certainty degree based on the parking frame certainty degree and the parking frame entering certainty degree.

Further, while the vehicle V is traveling, the acceleration suppression control start timing calculation unit 42 calculates the acceleration suppression control start timing, and the acceleration suppression control amount calculation unit 44 calculates the acceleration suppression control amount, based on the total certainty degree calculated by the total certainty degree calculation unit 40.

Further, when it is determined that the vehicle V enters the parking frame L0 and it is determined that the acceleration suppression control operation condition is established, the acceleration suppression instruction value calculation unit 10J outputs the acceleration suppression instruction value signal to the target throttle valve opening degree calculation unit 10K. Further, the target throttle valve opening degree calculation unit 10K outputs the target throttle valve opening degree signal to the engine controller 12.

Here, in the present embodiment, in the process of calculating the total certainty degree by the total certainty degree calculation unit 40, when the vehicle V is in the turning state, the total certainty degree is easily calculated as a higher level than a case where the vehicle V is not in the turning state.

Thus, in a state where the acceleration suppression control operation condition is established, when the vehicle V is in the turning state, the suppression degree of the acceleration instruction value increases as compared with a case where the vehicle V is not in the turning state.

The above-described steering angle sensor 18 and the steering angle calculation unit 10C correspond to a vehicle turning state detector.

Further, as described above, when the turning state of the vehicle V is not detected, the vehicle acceleration suppression control method of the present embodiment is a method for suppressing the acceleration instruction value depending on the operation amount of the accelerator pedal 32 with a lower suppression degree than a case where the turning state of the vehicle V is detected.

Effects of Third Embodiment

Hereinafter, effects of the present embodiment will be described.

In the present embodiment, the following effects can be achieved, in addition to the effects of the above-described first embodiment.

(1) It is detected whether or not the vehicle V is in the turning state by the steering angle sensor 18 and the steering angle calculation unit 10C. In addition, when the vehicle V is not in the turning state, the acceleration suppression control start timing calculation unit 42, the acceleration suppression control amount calculation unit 44, the acceleration suppression instruction value calculation unit 10J, and the target throttle valve opening degree calculation unit 10K decrease the suppression degree of the acceleration instruction value, as compared with a case where the vehicle V is in the turning state. That is, when the vehicle V is in the turning state, the acceleration suppression control start timing calculation unit 42, the acceleration suppression control amount calculation unit 44, the acceleration suppression instruction value calculation unit 10J, and the target throttle valve opening degree calculation unit 10K increase the suppression degree of the acceleration instruction value, as compared with a case where the vehicle V is not in the turning state.

Thus, when the travel state of the vehicle V is the advancing state where the driver generally intends acceleration, the suppression degree of the acceleration instruction value decreases as compared with a case where the travel state of the vehicle V is the turning state where the driver does not generally intend acceleration as compared with the advancing state, to thereby make it possible to reduce deterioration of operability. Further, when the travel state of the vehicle V is the turning state where the driver does not generally intend acceleration as compared with the advancing state, the suppression degree of the acceleration instruction value increases as compared with the advancing state where the driver generally intends acceleration, to thereby make it possible to enhance the acceleration suppression effect of the vehicle V.

As a result, it is possible to suppress deterioration of operability of the vehicle V in parking the vehicle, and to suppress acceleration of the vehicle V due to an operational error of the accelerator pedal 32.

(2) In the vehicle acceleration suppression control method of the present embodiment, it is detected whether or not the vehicle V is in the turning state, and when the turning state of the vehicle V is not detected, the acceleration instruction value is suppressed with a lower suppression degree than a case where the turning state of the vehicle V is detected.

Thus, when the travel state of the vehicle V is the advancing state where the driver generally intends acceleration, the suppression degree of the acceleration instruction value decreases as compared with a case where the travel state of the vehicle V is the turning state where the driver does not generally intend acceleration as compared with the advancing state, to thereby make it possible to reduce deterioration of operability. Further, when the travel state of the vehicle V is the turning state where the driver does not generally intend acceleration as compared with the advancing state, the suppression degree of the acceleration instruction value increases as compared with the advancing state where the driver generally intends acceleration, to thereby make it possible to enhance the acceleration suppression effect of the vehicle V.

Thus, it is possible to suppress deterioration of operability of the vehicle V during parking, and to suppress acceleration of the vehicle V due to an operational error of the accelerator pedal 32.

(Modifications)

(1) In the present embodiment, when the vehicle V is in the turning state, the total certainty degree is easily calculated as a higher level than a case where the vehicle V is not in the turning state, so that the suppression degree of the acceleration instruction value increases, but the present disclosure is not limited thereto. That is, for example, when the vehicle V is in the turning state, by changing the acceleration suppression control start timing or the acceleration suppression control amount, the suppression degree of the acceleration instruction value may increase as compared with a case where the vehicle V is not in the turning state. Further, for example, when the vehicle V is in the turning state, the parking frame certainty degree or the parking frame entering certainty degree may be easily calculated as a higher level than a case where the vehicle V is not in the turning state, so that the suppression degree of the acceleration instruction value may increase.

(2) In the present embodiment, the turning state determination threshold value is set to the value (for example 90°) corresponding to the rotation angle of the steering wheel 28, but the turning state determination threshold value is not limited thereto. That is, the vehicle V may be configured to include a yaw rate sensor that detects a yaw rate of the vehicle V, and the turning state determination threshold value may be set to a value (for example, 100 [R]) corresponding to the yaw rate of the vehicle V. Further, the vehicle V may be configured to include a turning angle sensor that detects a turning angle of a turning wheel (for example, right front wheel WFR and left front wheel WFL), and the turning state determination threshold value may be set to a value (for example, 6°) corresponding to the turning angle of the turning wheel.

(3) In the present embodiment, the acceleration suppression control start timing and the acceleration suppression control amount are calculated based on the total certainty degree calculated by the total certainty degree calculation unit 40, but the present disclosure is not limited thereto. That is, the acceleration suppression control start timing and the acceleration suppression control amount may be calculated based on the parking frame entering certainty degree calculated by the parking frame entering certainty degree calculation unit 38 and the determination result of whether or not the vehicle V is in the turning state. In this case, the acceleration suppression control start timing and the acceleration suppression control amount are calculated by making the parking frame entering certainty degree suitable for an acceleration suppression condition calculation map illustrated in FIG. 25, for example. FIG. 25 is a diagram illustrating a modification example of the present embodiment.

Further, in a state where the acceleration suppression condition calculation map illustrated in FIG. 25 is used, when the travel state of the vehicle V is the turning state, for example, the acceleration suppression control start timing and the acceleration suppression control amount may be calculated using the acceleration suppression condition calculation map similarly to that illustrated in FIG. 22.

Further, the acceleration suppression control start timing and the acceleration suppression control amount may be calculated based on only the parking frame entering certainty degree calculated by the parking frame entering certainty degree calculation unit 38. In this case, for example, the acceleration suppression control start timing and the acceleration suppression control amount may be calculated using an acceleration suppression condition calculation map illustrated in FIG. 26. FIG. 26 is a diagram illustrating a modification example of the present embodiment.

Fourth Embodiment

Hereinafter, a fourth embodiment of the disclosure (hereinafter, referred to as "the present embodiment") will be described with reference to the accompanying drawings.

(Configuration)

First, a configuration of a vehicle acceleration suppression device 1 of the present embodiment will be described with reference to FIG. 27, while referring to FIG. 1 to FIG. 26.

Since the vehicle acceleration suppression device 1 of the present embodiment is the same as the above-described first embodiment except for a process performed by the acceleration suppression control content calculation unit 10I, repetitive description may be omitted with respect to processes other than the process performed by the acceleration suppression control content calculation unit 10I.

Further, the vehicle acceleration suppression device 1 of the present embodiment is the same as the above-described first embodiment except for processes performed by the acceleration suppression operation condition determination unit 34 and the total certainty degree calculation unit 40 in the process performed by the acceleration suppression control content calculation unit 10I, and thus, repetitive description may be omitted.

In the above-described process of step S106, the acceleration suppression operation condition determination unit 34 of the present embodiment performs a process of determining which one of predetermined plural vehicle speed threshold value ranges the vehicle speed of the vehicle V is suitable for. Further, after the process of step S106 is performed, the process performed by the acceleration suppression operation condition determination unit 34 of the present embodiment progresses to step S108.

In the present embodiment, as an example, as illustrated in FIG. 27, a case where four ranges are set as the plural vehicle speed threshold value ranges will be described. Further, FIG. 27 illustrates a map used in the process performed by the acceleration suppression control content calculation unit 10I of the present embodiment, in which the relationship between the vehicle speed and the control content is illustrated.

Here, the four vehicle speed threshold value ranges include a first vehicle speed range of 0 km/h, a second vehicle speed range of 0 km/h or greater and 15 km/h or less, a third vehicle speed range of greater than 15 km/h and 20 km/h or less, and a fourth vehicle speed range of greater than 20 km/h.

Next, in the above-described process of step S118, the acceleration suppression operation condition determination unit 34 of the present embodiment changes the condition for determining that the vehicle V enters the parking frame based on the vehicle speed threshold value range for which the vehicle speed of the vehicle V is suitable, determined in step S106. In FIG. 27, the condition for determining that the vehicle V enters the parking frame, which serves as a condition for determining whether or not the acceleration suppression control is started, is represented as "control start" in a unit of "control content".

As a specific example of the process of changing the condition for determining that the vehicle V enters the parking frame, when the vehicle speed of the vehicle V is in the first vehicle speed range or the second vehicle speed range, a process of setting the above-described setting value of the condition A as the same value as in the above-described first embodiment is described. Here, the setting value of the condition A includes at least one of the above-described setting steering value, setting time, setting angle, and setting distance. In FIG. 27, a state where the setting value of the condition (A1 to A3) is set as the same value as in the first embodiment is represented as sign "O".

On the other hand, when the vehicle speed of the vehicle V is in the third vehicle speed range or the fourth vehicle speed range, the setting value of the condition A is changed to a value in which it is not easily determined that the vehicle V enters the parking frame, as compared with the first embodiment. This is performed by a process of changing the setting time in the condition A1 to a longer time than the first embodiment, for example. In FIG. 27, a state where the setting value of the condition A is changed to the value in which it is not easily determined that the vehicle V enters the parking frame as compared with the first embodiment is represented as "regulation of control start condition".

Further, in a state where the acceleration suppression control is operated, the acceleration suppression operation condition determination unit 34 of the present embodiment changes a condition for continuing the acceleration suppression control during operation based on the vehicle speed threshold value range for which the vehicle speed of the vehicle V is suitable, determined in step S106. In FIG. 27, the condition for continuing the acceleration suppression control during operation is represented as "control continuation" in a unit of "control content".

As a specific example of the process of changing the condition for continuing the acceleration suppression control during operation, when the vehicle speed of the vehicle V corresponds to a vehicle speed other than the fourth vehicle speed range, the process of continuing the acceleration suppression control during operation is performed. In FIG. 27, a state where the acceleration suppression control during operation is continued is represented as sign "O".

On the other hand, when the vehicle speed of the vehicle V is in the fourth vehicle speed range, for example, a process of changing the setting value of the condition A to the value in which it is not easily determined that the vehicle V enters the parking frame to easily terminate the acceleration suppression control during operation is performed, as compared with the first embodiment. In FIG. 27, a state where the acceleration suppression control during operation is easily terminated is represented as "alleviation of control termination condition".

Further, the total certainty degree calculation unit 40 of the present embodiment performs a process of determining which vehicle speed threshold value range the vehicle speed of the vehicle V is suitable for, similarly to the process performed by the acceleration suppression operation condition determination unit 34 by receiving the input of the vehicle speed calculation value signal. In the process of determining which vehicle speed threshold value range the vehicle speed of the vehicle V is suitable for, performed by the total certainty degree calculation unit 40, the processing result performed by the acceleration suppression operation condition determination unit 34 may be used.

Further, the total certainty degree calculation unit 40 of the present embodiment performs a process of calculating the total certainty degree based on the parking frame certainty degree and the parking frame entering certainty degree, and performs a process of changing the level of the total certainty degree based on the vehicle speed threshold value range for which the vehicle speed of the vehicle V is suitable. In FIG. 27, the process of changing the level of the total certainty degree is represented as "certainty degree" in a unit of "control content".

As a specific example of the process of changing the level of the total certainty degree, when the vehicle speed of the vehicle V is in the first vehicle speed range or the second vehicle speed range, a process of maintaining the level of the total certainty degree calculated based on the parking frame certainty degree and the parking frame entering certainty degree is performed. In FIG. 27, a state where the level of the total certainty degree calculated based on the parking frame certainty degree and the parking frame entering certainty degree is maintained is represented as sign "−".

On the other hand, when the vehicle speed of the vehicle V is in the third vehicle speed range, if the acceleration suppression control is being operated, a process of maintaining the level of the total certainty degree calculated based on the parking frame certainty degree and the parking frame entering certainty degree is performed. In FIG. 27, a state where the level of the total certainty degree while the acceleration suppression control is being operated is maintained is represented as "maintain certainty degree during control".

Further, when the vehicle speed of the vehicle V is the third vehicle speed range, if the acceleration suppression control is not operated, a process of decreasing (for example, by one step) the level of the total certainty degree calculated based on the parking frame certainty degree and the parking frame entering certainty degree is performed. In FIG. 27, a state where the level of the total certainty degree is decreased in a state where the acceleration suppression control is not operated is represented as "decrease of certainty degree level during non-control".

Further, when the vehicle speed of the vehicle V is in the fourth vehicle speed range, a process of decreasing (for example, by one step) the level of the total certainty degree calculated based on the parking frame certainty degree and the parking frame entering certainty degree is performed, regardless of whether or not the acceleration suppression control is operated. In FIG. 27, a state where the level of the total certainty degree is decreased regardless of whether or not the acceleration suppression control is operated is represented as "uniform decrease of certainty degree level".

Accordingly, in the present embodiment, as the vehicle speed of the vehicle V is high, the total certainty degree is easily calculated as a low level. Thus, in the present embodiment, as the vehicle speed of the vehicle V is low, the acceleration instruction value is suppressed with a high suppression degree.

(Operation)

Next, an example of the operation performed using the vehicle acceleration suppression device 1 of the present embodiment will be described with reference to FIG. 1 to FIG. 27. With respect to the same operation or the like as that of the above-described first embodiment, repetitive description may be omitted.

In the example of the operation described below, similarly to the above-described first embodiment, an example in which the vehicle V that travels in a parking lot enters a parking frame L0 selected by a driver will be described.

While the vehicle V is traveling, the parking frame certainty degree calculation unit 36 calculates the parking frame certainty degree, and the parking frame entering certainty degree calculation unit 38 calculates the parking frame entering certainty degree. Further, the total certainty degree calculation unit 40 calculates the total certainty degree based on the parking frame certainty degree and the parking frame entering certainty degree.

Further, while the vehicle V is traveling, the acceleration suppression control start timing calculation unit 42 calculates the acceleration suppression control start timing, and the acceleration suppression control amount calculation unit 44 calculates the acceleration suppression control amount, based on the total certainty degree calculated by the total certainty degree calculation unit 40.

Further, when it is determined that the vehicle V enters the parking frame L0 and it is determined that the acceleration suppression control operation condition is established, the acceleration suppression instruction value calculation unit 10J outputs the acceleration suppression instruction signal to the target throttle valve opening degree calculation unit 10K. Further, the target throttle valve opening degree calculation unit 10K outputs the target throttle valve opening degree signal to the engine controller 12.

Here, in the present embodiment, in the process of calculating the total certainty degree by the total certainty degree calculation unit 40, as the vehicle speed of the vehicle V is high, the total certainty degree is easily calculated as a low level.

Thus, in a state where the acceleration suppression control operation condition is established, as the vehicle speed of the vehicle V is lower, the acceleration instruction value is suppressed with a higher suppression degree.

The above-described vehicle wheel speed sensor 16 and vehicle speed calculation unit 10B correspond to a vehicle speed detector.

Further, as described above, as the vehicle speed of the vehicle V is higher, the vehicle acceleration suppression control method of the present embodiment is a method for suppressing the acceleration instruction value depending on the operation amount of the accelerator pedal 32 with a lower suppression degree.

Effects of Fourth Embodiment

Hereinafter, effects of the present embodiment will be described.

In the present embodiment, the following effects can be achieved, in addition to the effects of the above-described first embodiment.

(1) The vehicle speed of the vehicle V is detected by the vehicle wheel speed sensor 16 and the vehicle speed calculation unit 10B. In addition, as the vehicle speed of the vehicle V is higher, the acceleration suppression control start timing calculation unit 42, the acceleration suppression control amount calculation unit 44, the acceleration suppression instruction value calculation unit 10J, and the target throttle valve opening degree calculation unit 10K suppress the acceleration instruction value with a lower suppression degree. That is, as the vehicle speed of the vehicle V is lower, the acceleration suppression control start timing calculation unit 42, the acceleration suppression control amount calculation unit 44, the acceleration suppression instruction value calculation unit 10J, and the target throttle valve opening degree calculation unit 10K suppress the acceleration instruction value with a higher suppression degree.

Thus, when the vehicle speed of the vehicle V is high and there is a high possibility that the driver does not intend parking of the vehicle V, the suppression degree of the acceleration instruction value decreases as compared with a case where the vehicle speed of the vehicle V is low and there is a high possibility that the driver intends parking of the vehicle V. Thus, it is possible to reduce deterioration of operability. Further, when the vehicle speed of the vehicle V is low and there is a high possibility that the driver intends parking of the vehicle V, the suppression degree of the acceleration instruction value increases as compared with a case where the vehicle speed of the vehicle V is high and there is a high possibility that the driver intends parking of the vehicle V. Thus, it is possible to enhance the acceleration suppression effect of the vehicle V.

As a result, it is possible to suppress deterioration of operability of the vehicle V in parking the vehicle, and to restrict acceleration of the vehicle V due to an operational error of the accelerator pedal 32.

(2) In the vehicle acceleration suppression control method of the present embodiment, as the vehicle speed of the vehicle V is higher, the acceleration instruction value is suppressed with a lower suppression degree.

Thus, when the vehicle speed of the vehicle V is high and there is a high possibility that the driver does not intend parking of the vehicle V, the suppression degree of the acceleration instruction value decreases as compared with a case where the vehicle speed of the vehicle V is low and there is a high possibility that the driver intends parking of the vehicle V. Thus, it is possible to reduce deterioration of operability. Further, when the vehicle speed of the vehicle V is low and there is a high possibility that the driver intends parking of the vehicle V, the suppression degree of the acceleration instruction value increases as compared with a case where the vehicle speed of the vehicle V is high and there is a high possibility that the driver does not intend parking of the vehicle V. Thus, it is possible to enhance the acceleration suppression effect of the vehicle V.

As a result, it is possible to suppress deterioration of operability of the vehicle V in parking the vehicle, and to suppress acceleration of the vehicle V due to an operational error of the accelerator pedal 32.

(Modifications)

(1) In the present embodiment, as the vehicle speed of the vehicle V is higher, the total certainty degree is easily calculated as a lower level, so that the suppression degree of the acceleration instruction value decreases, but the present disclosure is not limited thereto. That is, for example, the acceleration suppression control start timing or the acceleration suppression control amount may be changed, so that as the vehicle speed of the vehicle V is higher, the suppression degree of the acceleration instruction value may decrease. Further, for example, as the vehicle speed of the vehicle V is higher, the parking frame certainty degree or the parking frame entering certainty degree may be easily calculated as a lower level, so that the suppression degree of the acceleration instruction value may decrease.

(2) In the present embodiment, four ranges are set as the plural vehicle speed threshold value ranges, but the present disclosure is not limited thereto. As the plural vehicle speed threshold value ranges, two ranges, three ranges, or five or more ranges may be set. Further, the setting speed of each vehicle speed threshold value range is not limited to the above-described speed, and for example, may be changed and set according to specification of the vehicle V such as braking performance of the vehicle V.

Hereinbefore, the description has been made with reference to a limited number of embodiments, but the scope of the present disclosure is not limited thereto, and includes modifications of each embodiment based on the disclosure which are obvious to those skilled in the art.

The invention claimed is:

1. A vehicle acceleration suppression device that suppresses acceleration of a vehicle depending on an operation amount of a driving force instruction element that instructs a driving force by operation of a driver to perform a suppression control of the driving force, the vehicle acceleration suppression device comprising:
   a driving force operation amount detector configured to detect a driving force operation amount which is the operation amount of the driving force instruction element;
   an acceleration controller configured to control acceleration of the vehicle depending on the driving force operation amount detected by the driving force operation amount detector;
   a peripheral environment recognizer configured to recognize a peripheral environment of the vehicle based on detection information of a peripheral environment recognition sensor provided in the vehicle;
   a vehicle travel state detector configured to detect a travel state of the vehicle; a vehicle speed detector configured to detect a speed of the vehicle;
   a parking frame entering certainty degree calculation unit configured to set a parking frame entering certainty degree indicating a degree of certainty that the vehicle enters a parking frame based on the environment recognized by the peripheral environment recognizer and the travel state detected by the vehicle travel state detector; and
   an acceleration suppression unit configured to suppress the acceleration controlled by the acceleration controller based on the parking frame entering certainty degree set by the parking frame entering certainty degree calculation unit and the vehicle speed detected by the vehicle speed detector,
   wherein the acceleration suppression unit is configured to set a suppression degree of the acceleration to decrease, as the vehicle speed detected by the vehicle speed detector increases.

2. The vehicle acceleration suppression device according to claim 1, wherein the acceleration suppression unit delays an acceleration suppression control start timing which is a timing when the suppression of the acceleration controlled by the acceleration controller starts to decrease the suppression degree of the acceleration.

3. The vehicle acceleration suppression device according to claim 2, wherein the acceleration suppression unit decreases an acceleration suppression control amount which is a control amount for suppressing the acceleration controlled by the acceleration controller to decrease the suppression degree of the acceleration.

4. The vehicle acceleration suppression device according to claim 1, wherein the acceleration suppression unit decreases an acceleration suppression control amount which is a control amount for suppressing the acceleration controlled by the acceleration controller to decrease the suppression degree of the acceleration.

5. A vehicle acceleration suppression method for suppressing acceleration of a vehicle depending on an operation amount of a driving force instruction element that instructs a driving force by operation of a driver to perform a suppression control of the driving force, the vehicle acceleration suppression method comprising: detecting a driving force operation amount which is the operation amount of the driving force instruction element, a travel state of the vehicle, and a speed of the vehicle; recognizing a peripheral environment of the vehicle;
   setting a parking frame entering certainty degree indicating a degree of certainty that the vehicle enters a parking frame based on the recognized environment and the detected travel state; and suppressing acceleration of the vehicle depending on the detected driving force operation amount at a suppression degree of the acceleration that decreases, as the detected vehicle speed increases.

* * * * *